(12) United States Patent
Wang et al.

(10) Patent No.: US 12,535,179 B2
(45) Date of Patent: Jan. 27, 2026

(54) CONTROL METHOD BASED ON IMAGE CAPTURING APPARATUS, CONTROL METHOD AND APPARATUS FOR GIMBAL

(71) Applicant: SZ DJI TECHNOLOGY CO., LTD., Guangdong (CN)

(72) Inventors: Xieping Wang, Guangdong (CN); Zhendong Wang, Guangdong (CN); Zhiyuan Lou, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 249 days.

(21) Appl. No.: 18/215,871

(22) Filed: Jun. 29, 2023

(65) Prior Publication Data

US 2023/0341079 A1    Oct. 26, 2023

Related U.S. Application Data

(63) Continuation of application No. PCT/CN2021/135818, filed on Dec. 6, 2021.

(30) Foreign Application Priority Data

Dec. 30, 2020  (WO) ................ PCT/CN2020/141400

(51) Int. Cl.
*F16M 11/20*    (2006.01)
*G03B 17/12*    (2021.01)
(Continued)

(52) U.S. Cl.
CPC .......... *F16M 11/205* (2013.01); *G03B 17/12* (2013.01); *G06V 10/25* (2022.01); *H04N 23/66* (2023.01);
(Continued)

(58) Field of Classification Search
CPC ...... F16M 11/205; G03B 17/12; G06V 10/25; G06V 2201/07; G06V 10/94; H04N 23/66;
(Continued)

(56) References Cited

U.S. PATENT DOCUMENTS

2019/0378423 A1* 12/2019 Bachrach ................ H04L 67/12

FOREIGN PATENT DOCUMENTS

CN    103019024 A    4/2013
CN    104616322 A    5/2015
(Continued)

OTHER PUBLICATIONS

English translation of CN 108259703 A (Year: 2018).*
(Continued)

*Primary Examiner* — Shahbaz Nazrul
(74) *Attorney, Agent, or Firm* — ANOVA LAW GROUP, PLLC

(57) ABSTRACT

A method of controlling a gimbal may comprise obtaining a capturing position of a target object in a captured image, the capturing position being determined by means of an image capturer, the image capturer being a camera having a manual lens or an automatic lens, and the image capturer being communicatively connected to the gimbal; determining, based on the capturing position, control parameters for a following operation on the target object; and controlling the gimbal according to the control parameters to achieve the following operation of the target object.

20 Claims, 18 Drawing Sheets

Obtain the shooting parameters determined by the image capturing apparatus, wherein the image capturing apparatus is a camera with a manual lens or an automatic lens, and the shooting parameters can be used to adjust the captured image captured by the image capturing apparatus. — S101

Determine the control parameters based on the shooting parameters. — S102

Correspondingly control at least one of the gimbal and the auxiliary apparatus based on the control parameters, wherein the gimbal is used to support the image capturing apparatus and/or the auxiliary apparatus, and the auxiliary apparatus is used to assist the image capturing apparatus in the corresponding shooting. — S103

(51) Int. Cl.
*G06V 10/25* (2022.01)
*H04N 23/66* (2023.01)
*H04N 23/695* (2023.01)
*H04N 25/768* (2023.01)

(52) U.S. Cl.
CPC ......... *H04N 23/695* (2023.01); *H04N 25/768* (2023.01); *G06V 2201/07* (2022.01)

(58) Field of Classification Search
CPC .. H04N 23/695; H04N 25/768; H04N 23/617; H04N 23/61; H04N 23/672; H04N 23/673; G05D 3/12; G06T 7/70
See application file for complete search history.

(56) References Cited

FOREIGN PATENT DOCUMENTS

| | | | |
|---|---|---|---|
| CN | 204859351 U | 12/2015 | |
| CN | 107295244 A | 10/2017 | |
| CN | 108259703 A | 7/2018 | |
| CN | 108323192 A * | 7/2018 | ........... F16M 11/048 |
| CN | 108475075 A | 8/2018 | |
| CN | 109688323 A | 4/2019 | |
| CN | 112055158 A | 12/2020 | |
| CN | 112073641 A | 12/2020 | |
| CN | 112616019 A | 4/2021 | |
| JP | 2004-015516 A | 1/2004 | |
| JP | 2017-034320 A | 2/2017 | |
| WO | WO-2020037610 A1 * | 2/2020 | |

OTHER PUBLICATIONS

English translation of WO 2020037610 A1 (Year: 2020).*
International Search Report and Written Opinion mailed on Sep. 6, 2021, received for PCT Application PCT/CN2020/141400, filed on Dec. 30, 2020, 15 pages including English Translation.
International Search Report and Written Opinion mailed on Mar. 2, 2022, received for PCT Application PCT/CN2021/135818, filed on Dec. 6, 2021, 11 pages including English Translation.

* cited by examiner

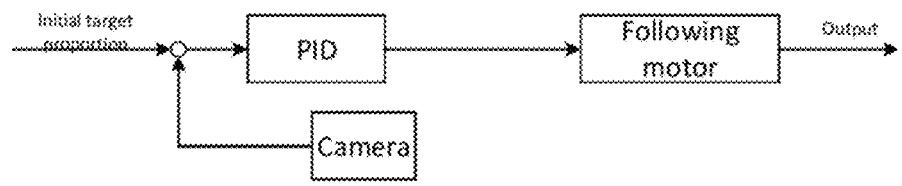
Fig. 11
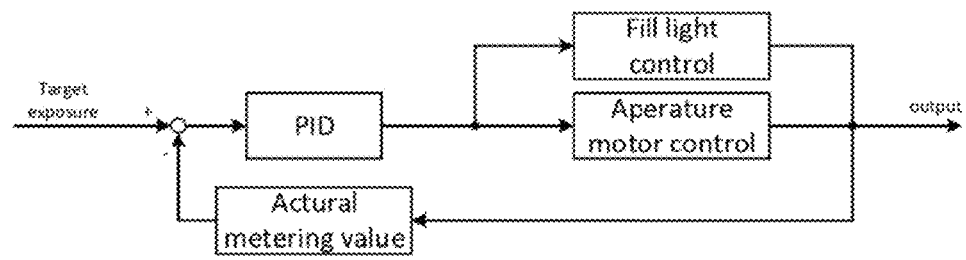
Fig. 12
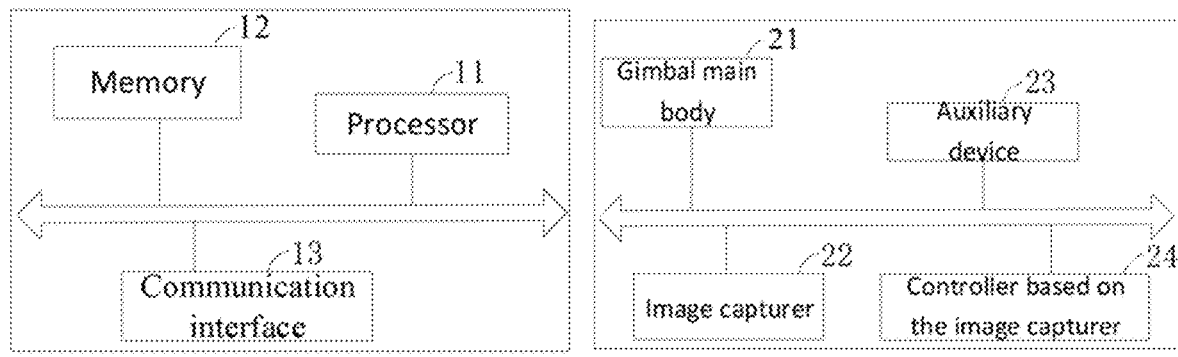
Fig. 13
Fig. 14

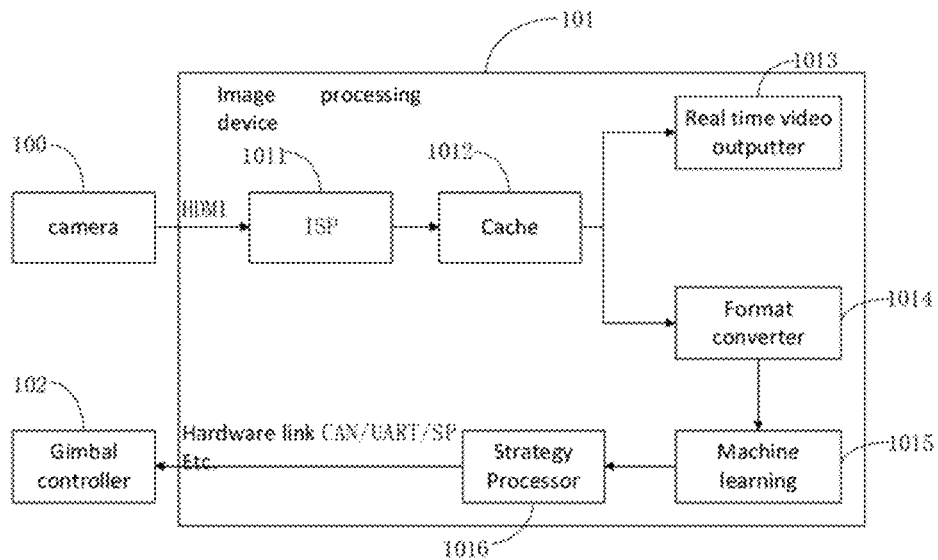

Fig. 15

The capturing position of the target object in the captured image is obtained, the capturing position is determined by the image capturing apparatus, the image capturing apparatus is a camera with a manual lens or an automatic lens, and the image capturing apparatus is communicatively connected to the gimbal. — S1601

Based on the capturing position, determine the control parameters used to perform the following operation on the target object. — S1602

The gimbal is controlled according to the control parameters to achieve the following operation of the target object. — S1603

Fig. 16

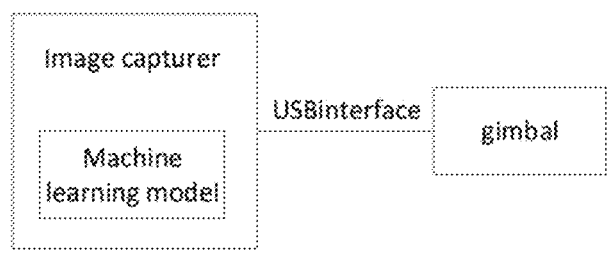

Fig. 17

Determine the delay time corresponding to the capturing position, the delay time is used to indicate the length of time required for the gimbal to acquire the capturing position via the image capturing apparatus. — S2501

Based on the delay time and the capturing position, the current position prediction value corresponding to the capturing position is determined. — S2502

Fig. 25

Based on the capturing position, the previous position prediction, the exposure time and the previous reception time, the movement speed corresponding to the target object is determined. — S2601

The product value between the movement speed and the delay time is determined as the position adjustment value corresponding to the capturing position. — S2602

Fig. 26

The product value between the movement speed and the delay time is determined as the position adjustment value corresponding to the capturing position. — S2701

Based on the position deviation, determine the control parameters used to perform the following operation on the target object. — S2702

Fig. 27

Get the following mode corresponding to the gimbal, the following mode includes any one of the following: single-axis following mode, two-axis following mode, full following mode. — S2801

Based on the current position prediction value and the following mode, determine the control parameters used to perform the following operation on the target object. — S2802

Fig. 28

CONTROL METHOD BASED ON IMAGE CAPTURING APPARATUS, CONTROL METHOD AND APPARATUS FOR GIMBAL

CROSS-REFERENCE TO RELATED APPLICATIONS

The present application is a continuation of International Application No. PCT/CN2021/135818, filed Dec. 6, 2021, which claims priority to PCT/CN2020/141400, filed Dec. 30, 2020, the entire contents of each being incorporated herein by reference in its entirety.

TECHNICAL FIELD

The present disclosure relates to the field of movable platform technology, and in particular to a control method based on an image capturing apparatus, a control method and apparatus for a gimbal.

BACKGROUND

With rapid development of science and technology, the application field of the gimbal is more and more extensive, especially the gimbal can be widely used in the field of shooting. For example, if a camera is set on the gimbal, the camera can transmit, for example, image information to the gimbal through the picture transmission module on the gimbal, so that the gimbal can make corresponding control based on the image information, such as tracking. Alternatively, in order to achieve, for example, focusing function for the camera with manual lens, it usually needs to obtain, for example, depth information to achieve focusing with the help of additional accessories, which not only requires relatively high performance of the gimbal, but also adds extra cost.

SUMMARY

One embodiment of the present disclosure provides a method of controlling a gimbal, which may comprise obtaining a capturing position of a target object in a captured image, the capturing position being determined by means of an image capturer, the image capturer being a camera having a manual lens or an automatic lens, and the image capturer being communicatively connected to the gimbal; determining, based on the capturing position, control parameters for a following operation on the target object; and controlling the gimbal according to the control parameters to achieve the following operation of the target object.

One embodiment of the present disclosure provides a control apparatus for a gimbal, comprising: a memory for storing a computer program; a processor for running the computer program stored in the memory to implement: obtaining a capturing position of a target object in a captured image, the capturing position being determined by means of an image capturer, the image capturer being a camera having a manual lens or an automatic lens, and the image capturer being communicatively connected to the gimbal; determining, based on the capturing position, control parameters for a following operation on the target object; and controlling the gimbal according to the control parameters to achieve the following operation of the target object.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

FIG. 11 is a schematic diagram of the principle of consistent display of the control target in the screen provided by the application embodiment of the present disclosure.

FIG. 12 is a schematic diagram of yet another image capture apparatus based control method provided by an application embodiment of the present disclosure; and FIG. 13 is a schematic diagram of the structure of a control apparatus based on an image capturing apparatus provided by an embodiment of the present disclosure.

FIG. 14 is a schematic diagram of the structure of a gimbal provided by an embodiment of the present disclosure; and FIG. 15 shows a schematic diagram of the structure of the gimbal system provided in the prior art.

FIG. 16 is a flow diagram of a control method for a gimbal provided by an embodiment of the present disclosure; and FIG. 17 is a schematic diagram of a structure of a communication connection between a gimbal and an image capturing apparatus provided by an embodiment of the present disclosure.

FIG. 25 is a schematic diagram of the process provided by embodiments of the present disclosure for calculating the predicted value of the current position corresponding to said capturing position; and FIG. 26 is a schematic diagram of a process for determining a position adjustment value corresponding to said capturing position based on said capturing position, said exposure time, said delay time, said previous reception time, and said previous position prediction value, as provided by embodiments of the present disclosure; and FIG. 27 is a schematic diagram I of a process for determining control parameters for following operations on said target object based on said current position prediction values, as provided by embodiments of the present disclosure FIG. 28 is a schematic diagram II of a process for determining control parameters for following operations on said target object based on said current position prediction values, as provided by embodiments of the present disclosure.

DETAILED DESCRIPTION

Figure 1:
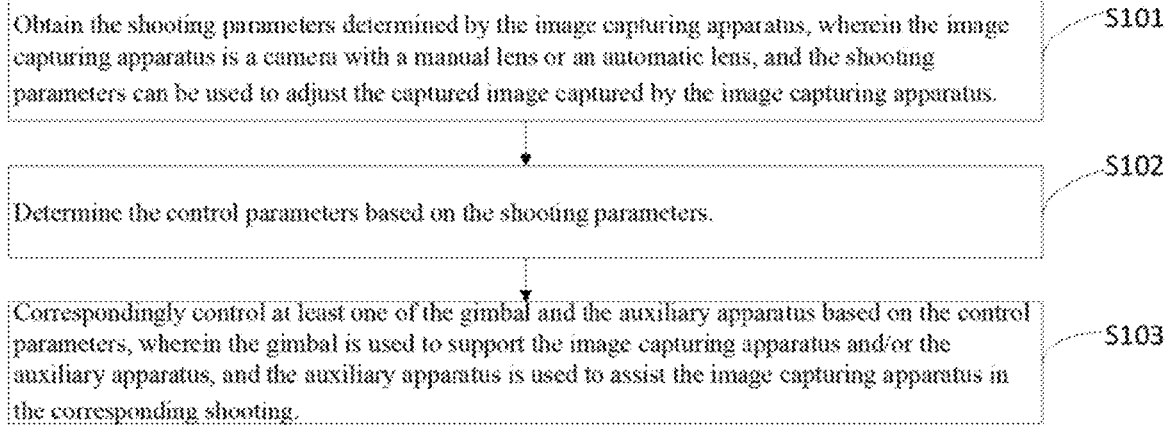
FIG. 1 is a schematic flow diagram of a control method based on an image capturing apparatus provided by an embodiment of the present disclosure.

In order to make the purpose, technical solutions and advantages of the embodiments of the present disclosure clearer, the technical solutions in some embodiments of the present disclosure will be described clearly and completely below in conjunction with the accompanying drawings, and it is clear that embodiments described are a part of the embodiments of the present disclosure, and not all of them. Based on the embodiments in the present disclosure, all other embodiments obtained by a person of ordinary skill in the art without making creative labor fall within the scope of protection of the present disclosure.

Unless otherwise defined, all technical and scientific terms used herein have the same meaning as commonly understood by those skilled in the art belonging to the present disclosure. The terms used herein in the specification of the present disclosure are for the purpose of describing specific embodiments only and are not intended to limit the disclosure.

In order to be able to understand the specific implementation process of the technical solutions in this embodiment, relevant technology is described below.

With rapid development of science and technology, people's demand for portable cameras is getting higher and higher, and the size of cameras is also developing towards the trend of miniaturization. At the same time of the continuous miniaturization of the camera, the demand for the intelligence of the camera is also getting higher and higher. The degree of camera intelligence can be achieved through the camera's built-in 3A algorithm, 3A can specifically include: Auto Focus (AF), Auto Exposure (AE) and Auto White Balance (AWB). Among them, the autofocus operation, auto exposure (aperture) operation are dependent on the lens built-in motor and micro-controller to achieve, which will make the size of the lens larger. Furthermore, the above-mentioned automatic lens is more expensive, thus making the use of automatic lens group relatively limited. Consequently, the manual lens was born.

For manual lenses, manual lenses are usually purely mechanical apparatus, therefore, manual lenses have the advantage of affordability. In terms of size, as manual lenses save the built-in motor and microprocessor, thus making the space occupied by manual lenses become a little smaller. In addition, for manual lenses, the use of external motors (instead of built-in motors) can also achieve the focus, exposure (iris) functions, such as: through the USB connection to the camera's Phase Detection Auto-focus (PDAF), or Contrast Detection Auto Focus (CDAF), and then use the PDAF information and CDAF for closed-loop control of the external motor to achieve focus/following operation. Similarly, the overexposure/underexposure status of the camera is obtained, and the exposure function can be realized by adjusting the aperture. Similarly, the external control module can also obtain the camera metering data via USB, and the control module controls the color temperature and light intensity of an external fill light according to the metering information to achieve the function of external exposure control.

In addition, Hitchcock Dolly zoom is a way to control the size of the subject to remain the same and the background to achieve zoom in/out, which can be achieved by zooming while moving the camera. For cameras that can support the function of intelligent focus following and are able to frame any object in the camera, the size of the frame will change with the size of the object. For the manual lens, users can control the manual lens to achieve Dolly zoom through manual operation. But the above-mentioned operation of the lens for the user, the control is difficult, and Dolly zoom effect can not be guaranteed.

In general, the above technology has the following defects: (1) the traditional autofocus lens is expensive, use of lens group is more restricted; (2) manual lens can not control the autofocus and aperture of the automatic exposure adjustment; (3) manual control Dolly zoom way of transporting the lens is more difficult to manipulate; (4) in some working conditions, there is a camera stabilization and gimbal stabilization interfering with each other; (5) limited by the hardware, there is an upper limit to the manual exposure operation, and the brightness can only be increased by increasing the sensitivity ISO, which will reduce the quality of the picture.

In order to solve the above technical problems, one embodiment of the present disclosure provides a control method based on an image capturing apparatus, a control method and an apparatus for a gimbal, the control method based on the image capturing apparatus may include: acquiring shooting parameters determined by the image capturing apparatus, the shooting parameters may include: focus information, zoom information, etc., the shooting parameters being able to be used to adjust the captured image captured by the image capturing apparatus, and/or, for determined based on user expectations and can be used to achieve a predetermined shooting function of the image capturing apparatus; after the shooting parameters are obtained, the shooting parameters can be analyzed and processed to determine control parameters, and then at least one of the gimbal and the auxiliary apparatus can be controlled accordingly based on the control parameters, wherein the gimbal is used to support the image capturing apparatus and/or the auxiliary apparatus, and the auxiliary apparatus is used to assist the image capture. For example, the above-mentioned auxiliary apparatus can be used to assist the image capturing apparatus to achieve a follow focus shooting operation, a zoom shooting operation or a fill light shooting operation, etc.

The technical solution provided by this embodiment, by obtaining the shooting parameters determined by the image capturing apparatus, determining the control parameters based on said shooting parameters, and controlling at least one of the gimbal and the auxiliary equipment based on said control parameters, thus effectively realizes the direct access to the shooting parameters determined by the image capturing apparatus without any equipment (detection equipment, auxiliary equipment, etc.), reducing the cost of data processing. In addition, after obtaining the shooting parameters, at least one of the gimbals and the auxiliary equipment can be controlled based on the shooting parameters, thus realizing effective control of the gimbal without manual operation by the user, ensuring a good experience for the user, further improving the practicality of the method, and facilitating the promotion and application in the market.

Some embodiments of an image capturing apparatus based control method, a control method of a gimbal and an apparatus of the present disclosure are described in detail below in conjunction with the accompanying drawings. The following embodiments and the features in the embodiments can be combined with each other without conflict between the embodiments.

FIG. 1 is a flow diagram of a control method based on an image capturing apparatus provided by an embodiment of the present disclosure; with reference to the accompanying FIG. 1, this embodiment provides a control method based on an image capturing apparatus. Wherein, the image capturing apparatus can be provided on the movable platform, specifically, the image capturing apparatus is removably connected to the movable platform, i.e., the user can install the image capturing apparatus on the movable platform according to the use requirements, or, remove the image capturing apparatus from the movable platform so that the image capturing apparatus can be independent of the movable platform. The above-mentioned movable platform can include: handheld gimbal, airborne gimbal, unmanned aerial vehicle, unmanned vehicle, unmanned boat, mobile robot and other passive mobile apparatuses or mobile apparatuses with power system, and the image capturing apparatus can include at least one of the following: camera with manual lens, camera with automatic lens, cell phone, video camera and other apparatuses with shooting function. In order to facilitate the understanding of the description and highlight the effect of the realization of the present technical solution, the gimbal is used as an example of a movable platform, and the image capturing apparatus is set on the gimbal, and the image capturing apparatus can be communicatively connected to the movable platform. Among them, when the image capturing apparatus is a camera, its lens can be detachably connected to its body to adapt to different shooting scenes and achieve different shooting effects.

Based on the above structure, the execution subject of the image capturing apparatus based control method provided in this embodiment can be an image capturing apparatus based control apparatus, and it is understood that the image capturing apparatus based control apparatus can be implemented as software, or a combination of software and hardware. It can be integrated in any of the gimbal, image capturing apparatus, and auxiliary apparatus, or can be independent of any of them, and this application embodiment is illustrated with the execution subject being the gimbal as an example. Optionally, the method may include:

Step S101: Obtain the shooting parameters determined by the image capturing apparatus, wherein the image capturing apparatus is a camera with a manual lens or an automatic lens, and the shooting parameters can be used to adjust the captured image captured by the image capturing apparatus.

Step S102: Determine the control parameters based on the shooting parameters.

Step S103: correspondingly control at least one of the gimbals and the auxiliary apparatus based on the control parameters, wherein the gimbal is used to support the image capturing apparatus and/or the auxiliary apparatus, and the auxiliary apparatus is used to assist the image capturing apparatus in the corresponding shooting.

The specific implementation principles of each of these steps are described in detail below.

Step S101: Obtain the shooting parameters determined by the image capturing apparatus, wherein the image capturing apparatus is a camera with a manual lens or an automatic lens, and the shooting parameters can be used to adjust the captured image captured by the image capturing apparatus.

wherein, during the image capturing operation of the image capturing apparatus, the control apparatus can obtain, through the image capturing apparatus, the shooting parameters, which can include at least one of the following: focus information, zoom information, fill light information, information on the percentage of the preset object in the image, anti-shake information, etc., and in some examples, the focus information can include the capturing position, and the above-mentioned shooting parameters can be used to adjust the image captured by the image capturing apparatus, and/or, based on user expectations and can be used to implement preset capture functions of the image capturing apparatus.

For example, when the shooting parameters are preset object proportion information in the image, the composition of the captured image by the image capturing apparatus can be adjusted by the above-mentioned shooting parameters, and in some examples, the lens operation of Hitchcock Dolly zoom can be realized; When the shooting parameters are focus information, follow focus parameters, fill light information or anti-shake information, the image capturing apparatus can perform focus shooting operations, follow focus shooting operations, fill light shooting operations, anti-shake shooting operations, and the like.

In addition, this embodiment does not limit the specific way of obtaining the shooting parameters. In some examples, obtaining the shooting parameters determined by the image capturing apparatus may include: obtaining the sensing information of the sensor of the non-image sensor of the image capturing apparatus, analyzing and processing said sensing information to obtain the shooting parameters, when the obtaining of the shooting parameters is not dependent on the captured image acquired by the image capturing apparatus built-in. In some examples, acquiring the shooting parameters determined by the image capturing apparatus may comprise: acquiring the captured image captured by the image capturing apparatus, analyzing and processing the captured image to obtain the shooting parameters, when the shooting parameters are obtained by analyzing and processing the image captured by the image capturing apparatus. In further examples, obtaining the shooting parameters determined by the image capturing apparatus may include obtaining the captured image captured by the image capturing apparatus, obtaining the execution operation input by the user to the captured image, and obtaining the shooting parameters based on the execution operation and the captured image. The shooting parameters can be obtained by the user according to the needs of the image input collected by the image capturing apparatus, that is, the shooting parameters are determined based on the user's expectations. In different application scenarios, different shooting parameters can be determined based on different application requirements.

In some embodiments, obtaining the shooting parameters determined by the image capturing apparatus may include: establishing a wireless communication link with the image capturing apparatus based on a wireless communication apparatus, wherein the wireless communication apparatus is provided to the gimbal or auxiliary apparatus; and obtaining the shooting parameters through the wireless communication link. That is, the control apparatus may obtain the shooting parameters determined by the image capturing apparatus based on the communication with the gimbal or the auxiliary apparatus and with the help of the wireless communication link between the gimbal or the auxiliary apparatus and the image capturing apparatus.

The above wireless communication apparatus may include at least one of any of the following: Bluetooth module, proximity wireless communication module, wireless local area network wifi module.

For example, when the wireless communication apparatus includes a Bluetooth module, the image capturing apparatus has a Bluetooth communication connection function, and a wireless communication link can be established between the control apparatus and the image capturing apparatus through the Bluetooth module, and after the image capturing apparatus obtains the shooting parameters, the control apparatus can obtain the shooting parameters through the established wireless communication link, wherein the Bluetooth module can be set on the gimbal or the auxiliary apparatus.

Similarly, when the wireless communication apparatus includes a wifi module, the image capturing apparatus has a wifi connection function, and a wireless communication link can be established between the control apparatus and the image capturing apparatus through the wifi module, and after the image capturing apparatus obtains the shooting parameters, the control apparatus can obtain the shooting parameters through the established wireless communication link, wherein the wifi module can be set on the gimbal or auxiliary equipment.

When the wireless communication apparatus includes a proximity wireless communication module, at this time, when the control apparatus is in close contact with the image capturing apparatus, the control apparatus can establish a wireless communication link with the image capturing apparatus by the proximity wireless communication module, and after the image capturing apparatus obtains the shooting parameters, the control apparatus can obtain the shooting parameters through the established wireless communication link, wherein the proximity wireless communication module can be set on the gimbal or auxiliary equipment.

When the wireless communication apparatus includes a Bluetooth module and a proximity wireless communication module, the control apparatus can communicate wirelessly with the image capturing apparatus through the Bluetooth module and the proximity wireless communication module, wherein the proximity wireless communication module is used to obtain information for achieving a Bluetooth connection.

When the wireless communication apparatus includes a wifi module and a proximity wireless communication module, the control apparatus can communicate wirelessly with the image capturing apparatus through the wifi module and the proximity wireless communication module, wherein the proximity wireless communication module is used to obtain information for achieving a wifi connection.

When the wireless communication apparatus includes a Bluetooth module and a wifi module, the control apparatus can communicate wirelessly with the image capturing apparatus via the Bluetooth module and the wifi module, wherein one of them can be selected for data transmission under different bandwidth requirements, or, the Bluetooth module is used to obtain information for achieving a wifi connection.

Step S102: Determine the control parameters based on the shooting parameters.

Optionally, the auxiliary equipment can include at least one of the following: focus motor, zoom motor, fill light equipment, etc. When setting the auxiliary equipment on the gimbal, the auxiliary equipment can be detachably connected to the gimbal, i.e., the user can install the auxiliary equipment on the gimbal according to the usage demand, or the auxiliary equipment can be detached from the gimbal so that the auxiliary equipment can be independent of the gimbal. When the gimbal is provided with the auxiliary apparatus and the image capturing apparatus, the gimbal is used to adjust the spatial position of the image capturing apparatus and the auxiliary apparatus, and at this time, the gimbal can be communicatively connected to the image capturing apparatus and the auxiliary apparatus respectively. In addition, for the auxiliary apparatus and the image capturing apparatus, the image capturing apparatus can be mechanically coupled with the auxiliary apparatus, and the mechanical coupling can include: direct connection, connection through a connecting member, etc. Specifically, the image capturing apparatus and the auxiliary apparatus can be detachably connected, i.e., the image capturing apparatus can be connected with the auxiliary apparatus according to the use demand, or the image capturing apparatus and the auxiliary apparatus can be detached, so that the image capturing apparatus and the auxiliary apparatus can be detached. So that the image capturing apparatus and the auxiliary equipment are independent of each other.

Optionally, in order to achieve accurate control of the gimbal, after obtaining the shooting parameters, the shooting parameters can be analyzed and processed so that the control parameters can be determined, this embodiment does not limit the specific implementation of determining the control parameters, and the technical person in the field can set them according to the specific application scenario or application requirements. In some examples, there is a pre-set mapping relationship between the shooting parameters and the control parameters. In some examples, the mapping relationship between the shooting parameters and the control parameters is pre-set, and the control parameters corresponding to the shooting parameters are determined based on the mapping relationship. In yet other examples, a pre-trained machine learning model is obtained, and the shooting parameters are input to the machine learning model, so that the control parameters output by the machine learning model can be obtained.

Step S103: correspondingly control at least one of the gimbals and the auxiliary apparatus based on the control parameters, wherein the gimbal is used to support the image capturing apparatus and/or the auxiliary apparatus, and the auxiliary apparatus is used to assist the image capturing apparatus in the corresponding shooting.

Since the control parameter is used to control the gimbal and/or the auxiliary apparatus, after the control parameter is obtained, the corresponding control operation can be performed on at least one of the gimbals and the auxiliary apparatus based on the control parameter. For example: when the control parameter includes anti-shake information, the gimbal can be controlled based on the anti-shake information to achieve the corresponding stabilization operation. In some examples, after obtaining the control parameter, the auxiliary apparatus can be controlled based on the control parameter, for example: when the control parameter includes a parameter related to the zoom motor, the zoom motor can be controlled based on the parameter related to the zoom motor, so that the zoom adjustment operation can be realized; when the control parameter includes a parameter related to the focus motor, the focus motor can be controlled based on the parameter related to the focus motor. When the control parameter includes a parameter related to the focus motor, a corresponding control operation can be performed on the focus motor based on the parameter related to the focus motor, so that a focus adjustment operation can be realized; when the control parameter includes fill light information, a corresponding control operation can be performed on the fill light apparatus based on the fill light information, so that a fill light operation can be realized. In some further examples, after obtaining the control parameters, the gimbal and the auxiliary equipment can be controlled based on the control parameters, for example: when the control parameters include anti-shake information, the gimbal and/or the image capturing apparatus with the anti-shake control unit can be controlled based on the anti-shake information.

Based on the above description, it is clear that the shooting parameters can be obtained by the controller within the image capturing apparatus, which is different from the image information. That is, the shooting parameters are not obtained by analysis and processing of the gimbal or auxiliary apparatus or other control apparatus based on image information or data collected by other apparatuses, and in some usage scenarios, the gimbal or auxiliary apparatus or other control apparatus based on image capturing apparatus can achieve the corresponding control without obtaining image information or data collected by other apparatuses.

The control method based on the image capturing apparatus provided in this embodiment, by obtaining the shooting parameters determined by said image capturing apparatus, determining the control parameters based on said shooting parameters, and controlling at least one of the gimbal and the auxiliary apparatus accordingly based on said control parameters, thus effectively realizing the direct access to the shooting parameters determined by the image capturing apparatus without utilizing any equipment, thereby reducing data processing costs. In addition, after obtaining the shooting parameters, it is possible to control at least one of the gimbals and auxiliary equipment based on the shooting parameters, thus realizing effective control of the gimbal without manual operation by the user, thereby ensuring a good experience for the user, further improving the practicality of the method, and facilitating the promotion and application in the market.

It can be understood that the image capturing apparatus can be another electronic apparatus other than a camera that can capture images when the control parameters are used to control the auxiliary apparatus accordingly, without any specific limitation here.

On the basis of the above embodiment, for the image capturing apparatus, the image capturing apparatus can be a camera including a manual lens, at this time, the shooting parameters determined by the image capturing apparatus can be used to adjust the captured image collected by the image capturing apparatus. It should be noted that when different auxiliary apparatuses are configured on the gimbal, different auxiliary apparatuses can correspond to different shooting parameters, so that the shooting parameters determined by the image capturing apparatus and the auxiliary apparatuses can achieve different adjustment operations on the captured image.

In some examples, for manual lenses, although the image capturing apparatus cannot achieve autofocus, but with the support of the image sensor in the image capturing apparatus (e.g. (Complementary Metal-Oxide-Semiconductor (CMOS) sensor), it is possible to obtain the phase focus information of a specified area by the user clicking on the display of the image capturing apparatus. The phase focus information of the specified area can be obtained by clicking on the display of the image capturing apparatus, and then the phase-focus ring position curve can be obtained by means of calibration, and then the follow focus ring position can be calculated directly according to the calibration curve, so that the auxiliary equipment, such as the follow focus motor, can be controlled to rotate the target focus ring position. That is, the manual lens can achieve fast focus. Alternatively, the CDAF function can be achieved by an auxiliary apparatus, such as a follow focus motor, by obtaining the contrast information of the above specified area. Thus, when the auxiliary apparatus includes a follow focus motor for adjusting the follow focus ring of the image capturing apparatus, obtaining the shooting parameters determined by the image capturing apparatus in this embodiment may include: obtaining the focusing information determined by the image capturing apparatus, wherein the focusing information may include at least one of the following: phase focusing PDAF information and contrast focusing CDAF information.

For the image capturing apparatus, the image capturing apparatus can correspondingly have different aperture application modes. For example, the aperture application mode can include large aperture mode and small aperture mode, and the large aperture mode refers to the operating mode in which the aperture value is greater than the set aperture threshold, and the small aperture mode can refer to the operating mode in which the aperture value is less than or equal to the preset aperture threshold. In the different aperture application modes, the accuracy of PDAF and CDAF is not consistent, for example, in the small aperture mode, the PDAF accuracy is limited, then different focusing information can be used to achieve the autofocus operation. Therefore, in order to be able to ensure the accuracy and reliability of the autofocus operation, with reference to the attached FIG. 2, the present embodiment provides an implementation of obtaining the focusing information. Optionally, obtaining the focusing information determined by the image capturing apparatus may include:

Step S201: Determine the aperture application mode corresponding to the image capturing apparatus.

Among them, for the image capturing apparatus, different aperture application modes can correspond to different ranges of aperture values, so that in the process of the image capturing apparatus, the aperture application mode corresponding to the image capturing apparatus can be determined by obtaining the aperture value corresponding to the image capturing apparatus. Alternatively, different aperture application modes can correspond to different display signs (including: indicators, icons displayed in the display interface, etc.), and the aperture application mode corresponding to the image capturing apparatus can be determined by the sign information.

Of course, the skilled person in the field can also use other ways to determine the aperture application mode corresponding to the image capturing apparatus, as long as the accuracy and reliability of the determination of the aperture application mode can be ensured, and will not be repeated here.

Step S202: Based on the aperture application mode, at least one of the phase focus information and contrast focus information determined by the image capturing apparatus is obtained.

After the aperture application mode is obtained, the aperture application mode can be analyzed and processed so that at least one of the phase focus information and the contrast focus information determined by the image capturing apparatus can be obtained, i.e., in different application scenarios, the user can obtain different focus information according to the usage requirements or design requirements. In some examples, when the phase focus information can be accurately obtained, the phase focus information determined by the image capturing apparatus can be obtained through the aperture application mode. In other examples, when the contrast focus information can be accurately obtained, the contrast focus information determined by the image capturing apparatus can be obtained through the aperture application mode. In some examples, the phase focus information determined by the image capturing apparatus can be obtained through the aperture application mode, and in some examples, the phase focus information determined by the image capturing apparatus can be obtained through the aperture application mode, and in some examples, the phase focus information determined by the image capturing apparatus can be obtained through the image capturing apparatus. In some examples, phase focusing information and contrast focusing information determined by the image capturing apparatus can be obtained through the image capturing apparatus.

In some examples, according to the aperture application mode, obtaining at least one of phase focus information and contrast focus information determined by the image capturing apparatus may comprise: obtaining contrast focus information determined by the image capturing apparatus when the aperture application mode is a first mode, or, obtaining phase focus information and contrast focus information determined by the image capturing apparatus, wherein the aperture value corresponding to the first mode is less than or equal to the set aperture threshold; and/or, when the aperture application mode is a second mode, the phase focus information determined by the image capturing apparatus is obtained, wherein the aperture value corresponding to the second mode is greater than the set aperture threshold.

Optionally, the aperture application mode of the image capture apparatus can include a first mode and a second mode. Since the aperture value corresponding to the first mode is less than or equal to the set aperture threshold, the first mode can be called the small aperture mode, and the aperture value corresponding to the second mode is greater than the set aperture threshold, so the second mode can be called the large aperture mode. When the image capturing apparatus is in the first mode, the accuracy of the phase focus information PDFA is limited at this time, so in order to achieve accurate focus operation, then the phase focus information and contrast focus information determined by the image capturing apparatus can be acquired to achieve fast auto-focus operation by the phase focus information and contrast focus information. When the image capturing apparatus is in the second mode, the phase focus information PDFA at this time can be directly focused on the target, i.e., the phase focus information can be used to achieve an accurate focus operation, so that the phase focus information can be determined by the image capturing apparatus.

In this embodiment, by determining the aperture application mode corresponding to the image capturing apparatus, and then acquiring at least one of the phase focus information and contrast focus information determined by the image capturing apparatus according to the aperture application mode, different focus information can be determined when the image capturing apparatus works in different aperture application modes, thus ensuring the flexibility and reliability of acquiring focus information. In turn, the accuracy of focusing operation based on the focus information is improved.

Further to the above description, when the auxiliary apparatus includes a follow focus motor, controlling at least one of the gimbals and the auxiliary apparatus based on the control parameters may include: controlling the follow focus motor based on the control parameters to achieve the follow focus operation of the image capturing apparatus.

Figure 3:
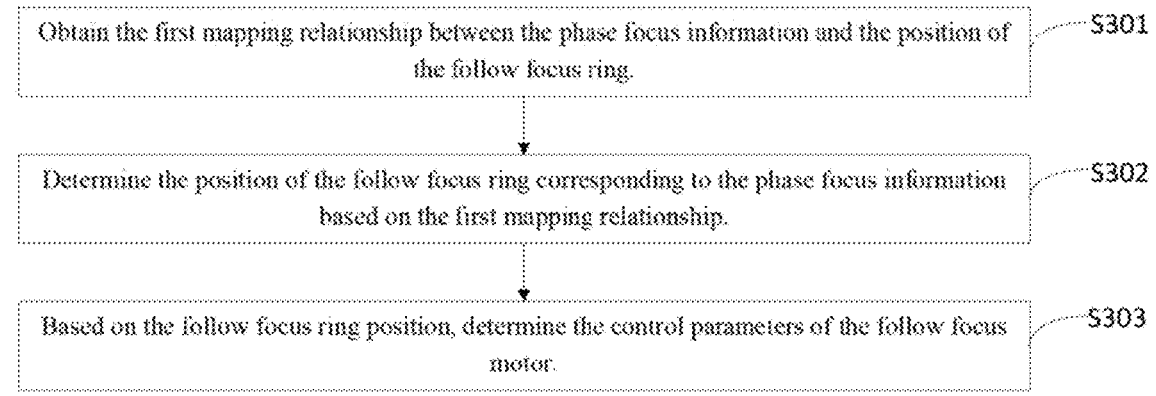
FIG. 3 is a schematic diagram of the process for determining control parameters based on said shooting parameters provided by embodiments of the present disclosure.

In some embodiments, when the auxiliary apparatus includes a follow focus motor and can obtain the focus information determined by the image capturing apparatus, in order to achieve control of the follow focus motor, the focus information can be analyzed and processed to obtain control parameters corresponding to the focus information, and then the follow focus motor can be controlled based on the control parameters. It should be noted that since the focus information can include phase focus information and/or contrast focus information, when obtaining the control parameters corresponding to the focus information, different focus information can correspond to different data processing strategies. Therefore, in order to ensure the accuracy and reliability of obtaining the control parameters, when the focus information includes phase focus information, this embodiment provides an implementation of obtaining the control parameters. Optionally, referring to the attached FIG. 3, determining the control parameters based on the shooting parameters in this embodiment may include:

Step S301: Obtain the first mapping relationship between the phase focus information and the position of the follow focus ring.

Step S302: Determine the position of the follow focus ring corresponding to the phase focus information based on the first mapping relationship.

Step S303: Based on the follow focus ring position, determine the control parameters of the follow focus motor.

Among them, when the auxiliary apparatus includes a follow focus motor, the image capturing apparatus can be configured with a corresponding follow focus ring, and the follow focus ring is marked with a plurality of follow focus ring positions, which are used to realize the control operation of the follow focus motor. Specifically, the follow focus ring position can control the follow focus motor to drive the gear connected to the follow focus ring to achieve the focusing operation. To enable accurate control of the follow focus motor, a first mapping relationship between the phase focus information and the follow focus ring position can be obtained, either directly from the manufacturer of the image capturing apparatus, alternatively, through a pre-calibration operation, which is used to identify a one-to-one relationship between the phase focus information and the follow focus ring position.

After the first mapping relationship is obtained, the phase focus information can be analyzed based on the first mapping relationship to determine the follow focus ring position corresponding to the phase focus information, and then the control parameters of the follow focus motor can be determined based on the determined follow focus ring position. The control parameters can include at least one of the following: rotation stroke, rotation speed, rotation direction, etc. In some examples, a mapping relationship between the follow focus ring position and the control parameters is pre-configured, and the control parameters of the follow focus motor can be determined based on the mapping relationship and the follow focus ring position. In other examples, a machine learning model is pre-trained to analyze the follow focus ring position, and the follow focus ring position is input to the machine learning model so that the control parameters of the follow focus motor output by the machine learning model can be obtained.

Figure 4:
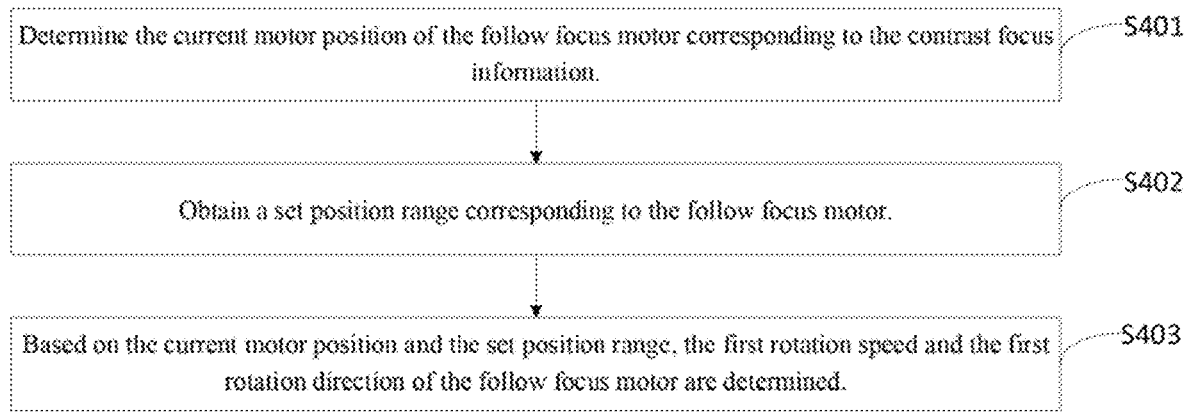
FIG. 4 is a schematic diagram of another process for determining control parameters based on said shooting parameters provided by embodiments of the present disclosure.

In this embodiment, when the focus information includes phase focus information, the first mapping relationship between the phase focus information and the position of the follow focus ring is obtained, and the position of the follow focus ring corresponding to the phase focus information is determined based on the first mapping relationship, and the control parameters of the follow focus motor are determined based on the position of the follow focus ring, thus effectively ensuring the accuracy and reliability of determining the control parameters of the follow focus motor. The control parameters of the follow focus motor are determined based on the position of the follow focus ring.

Where the focus information includes contrast focus information, this embodiment provides an implementation for obtaining control parameters. Optionally, with reference to the attached FIG. 4, determining control parameters based on shooting parameters in this embodiment may include:

Step S401: Determine the current motor position of the follow focus motor corresponding to the contrast focus information.

After obtaining the contrast focus information, the contrast focus information can be analyzed and processed. Specifically, the mapping relationship between the contrast focus information and the motor position is set in advance, and the current motor position corresponding to the contrast focus information can be determined through the above mapping relationship, thus effectively ensuring the accuracy and reliability of determining the current motor position.

Step S402: Obtain a set position range corresponding to the follow focus motor.

In order to achieve accurate and reliable control of the follow focus motor, it is possible to obtain a set position range corresponding to the follow focus motor, which is used to identify the interval in which the motor is capable of normal motion, it is understood that different follow focus motors can correspond to the same or different set position ranges. In some examples, the set position range may be a pre-configured parameter stored in a preset area, where the set position range of the follow focus motor can be obtained by accessing the preset area. In some examples, the set position range can be obtained by a calibration operation, for example, when the image capturing apparatus is a camera, obtaining the set position range corresponding to the follow focus motor can include: obtaining the nearest and farthest ends of the lens of the camera, wherein the nearest and farthest ends of the lens are used to limit the changing focal range of the lens. Generally, the nearest and farthest ends of the lens can be the mechanical limits corresponding to the lens. In general, the nearest end can correspond to the mechanical lower limit of the lens, and the farthest end can correspond to the mechanical upper limit of the lens. After obtaining the nearest end and the farthest end of the lens of the camera, the first motor position corresponding to the nearest end and the second motor position corresponding to the farthest end are obtained; the set position range is determined based on the first motor position and the second motor position, and the above-mentioned set position range is the position range in which the motor can operate consisting of the first motor position as the lower limit position and the second motor position as the upper limit position, i.e. The follow focus motor can move freely within the range constituted by the first motor position and the second motor position, thus effectively achieving that the set position range corresponding to the follow focus motor can be accurately and effectively obtained.

It should be noted that the order of execution of step S402 and step S401 in this embodiment is not limited to the above-described order, but can be set by a person skilled in the art according to specific application scenarios or application requirements, for example, step S402 can be executed before step S401, or step S402 can be executed simultaneously with step S401.

Step S403: Based on the current motor position and the set position range, the first rotation speed and the first rotation direction of the follow focus motor are determined.

After the current motor position and the set position range are obtained, the current motor position and the set position range can be analyzed to determine the first rotation speed and the first rotation direction of the follow focus motor. In some examples, a machine learning model for analyzing the current motor position and the set position range is pre-trained, and the current motor position and the set position range are input into the machine learning model so that the first rotation speed and the first rotation direction of the follow focus motor can be obtained. In some other examples, determining the first rotation speed and the first rotation direction of the follow focus motor based on the current motor position and the set position range may include: obtaining a first distance and a second distance between the current motor position and the upper limit and the lower limit of the set position range, respectively; and determining the first rotation speed and the first rotation direction of the follow focus motor based on the first distance and the second distance.

Optionally, after the set position range is obtained, the upper limit value and the lower limit value corresponding to the set position range can be determined, and after the upper limit value and the lower limit value are obtained, the first distance between the current motor position and the upper limit value, and the second distance between the current motor position and the lower limit value can be obtained. After the first distance and the second distance are obtained, the first distance and the second distance can be analyzed and processed. After obtaining the first distance and the second distance, the first distance and the second distance can be analyzed to determine the first rotation speed and the first rotation direction of the follow focus motor.

In some examples, determining the first rotation speed and the first rotation direction of the follow focus motor based on the first distance and the second distance may include: comparing the first distance with the second distance, if the first distance is greater than the second distance, then the travel of the follow focus motor toward the lower limit is less than the travel toward the upper limit, and since the focus operation may require more travel of the follow focus motor, the first rotation direction can be determined as the direction toward the upper limit. Therefore, the first rotation direction can be determined as the direction closer to the upper limit, and the first rotation speed of the follow focus motor can be determined based on the first distance. When the first distance is less than the second distance, the first rotation direction can be determined as the direction toward the lower limit, and then the first rotation speed of the follow focus motor can be determined based on the second distance. If the first distance is equal to the second distance, the first rotation direction can be determined as the direction toward the lower limit or toward the upper limit, and then the first rotation speed of the follow focus motor can be determined based on the first distance or the second distance.

Figure 4A:
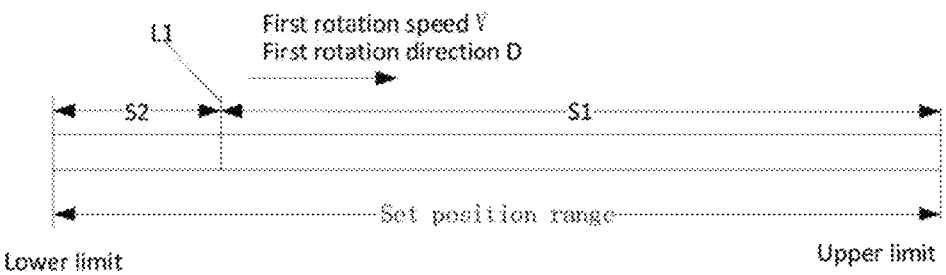
FIG. 4a shows a schematic diagram for determining the first direction of rotation of the follow focus motor provided by an embodiment of the present disclosure.

For example 1, referring to the attached FIG. 4a, the current motor position is L1, L1 is located in the set position range, and then the first distance S1 between L1 and the upper limit value and the second distance S2 between L1 and the lower limit value can be obtained, and since S1>S2, the first rotation direction D of the follow focus motor can be determined as the direction toward the upper limit value, and the first rotation speed V of the follow focus motor can be determined based on S1. The first rotation speed V of the follow focus motor can be determined based on S1, thus effectively achieving accurate and reliable determination of the first rotation speed and the first rotation direction of the follow focus motor.

Figure 4B:
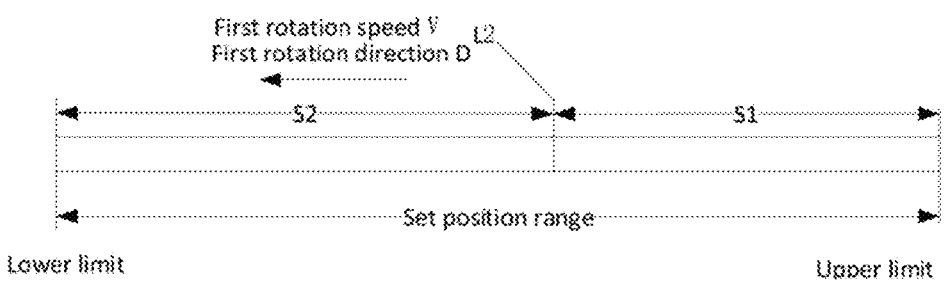
FIG. 4b is a schematic diagram of an alternative way of determining the first direction of rotation of the follow focus motor provided by embodiments of the present disclosure.

For example 2, referring to FIG. 4b, the current motor position is L2, and L2 is within the set position range, and then the first distance S1 between L2 and the upper limit value and the second distance S2 between L2 and the lower limit value can be obtained, and since S2>S1, the first rotation direction D of the follow focus motor can be determined as the direction toward the lower limit value, and the first rotation speed V of the follow focus motor can be determined based on S2. The first rotation speed V of the follow focus motor can be determined based on S2, thus effectively achieving accurate and reliable determination of the first rotation speed and the first rotation direction of the follow focus motor.

Figure 4C:
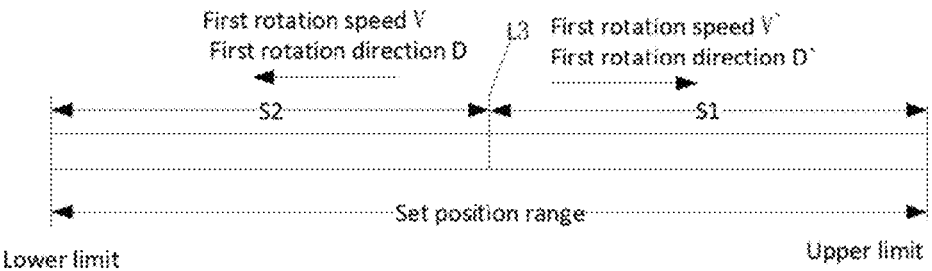
FIG. 4c shows a further schematic view of determining the first direction of rotation of the follow focus motor provided by embodiments of the present disclosure.

For example, referring to FIG. 4c, the current motor position is L3 and L3 is within the set position range, and then the first distance S1 between L3 and the upper limit value and the second distance S2 between L3 and the lower limit value can be obtained, and since S2=S1, the first rotation direction D of the follow focus motor can be determined as the direction toward the lower limit value, and the first rotation speed V of the follow focus motor can be determined based on S2, or the first rotation direction D' of the follow focus motor can be determined as the direction toward the upper limit value, and the first rotation speed V' of the follow focus motor can be determined based on S1. The first rotation direction D' of the follow focus motor can be determined as the direction toward the upper limit value, and the first rotation speed V' of the follow focus motor can be determined based on S1, thus effectively achieving an accurate and reliable determination of the first rotation speed and the first rotation direction of the follow focus motor.

It should be noted that after controlling the movement of the follow focus motor based on the first rotation speed and the first rotation direction, the current motor position corresponding to the follow focus motor will change so that a new current motor position can be obtained, and for the new current motor position, the first rotation speed and the first rotation direction can be redetermined in the above-mentioned manner, so that when the follow focus motor is used for the focusing operation. The control parameters (e.g., the first rotation speed and the first rotation direction) obtained during the process of not adjusting to the focusing state can be updated in real time, so that the stability and reliability of the focusing operation can be ensured. Specifically, after determining the first rotation speed and the first rotation direction of the follow focus motor, the follow focus motor can be controlled to move based on the first rotation speed and the first rotation direction to realize the automatic focus operation. In some examples, in order to ensure stable operation of the autofocus operation, the method in this embodiment can also include: updating the set position range based on the current motor position to obtain the updated position range; adjusting the first rotation speed to obtain the second rotation speed based on the updated position range and the position after the motor rotation, and the second rotation speed is smaller than the first rotation speed.

In the process of controlling the movement of the follow focus motor based on the first rotation speed and the first rotation direction, the first rotation speed may be changed in real time based on the position of the follow focus motor movement. Specifically, after the current motor position is obtained, the set position range can be updated based on the current motor position, so that the updated position range can be obtained. In some examples, one boundary value of the updated position range may be the current motor position, and another boundary value may be an upper or lower limit value, i.e., the updated position range is less than the set position range, specifically a portion of the set position range.

In the process of controlling the movement of the follow focus motor based on the first rotation speed and the first rotation direction, the current motor position of the follow focus motor will be continuously changed, i.e., the follow focus motor changes from the current motor position to the motor rotation position. Specifically, the specific implementation and process of "obtaining the second rotation speed based on the updated position range and the motor rotation position" is the same as the above-mentioned "determining the first rotation speed and the first rotation direction of the follow focus motor based on the current motor position and the set position range". The specific way and process of "determining the first rotation speed and the first rotation direction of the follow focus motor based on the current motor position and the set position range" is similar to the above-mentioned, which can be referred to the above-mentioned, and will not be repeated here. It should be noted that since the updated position range is smaller than the set position range, the determined second rotation speed is smaller than the first rotation speed, i.e., the rotation speed of the follow focus motor decreases when the follow focus motor is controlled for focusing operation.

In addition, for the follow focus motor, a speed threshold is pre-configured to identify the normal operation of the follow focus motor. When the operating speed of the follow focus motor is less than or equal to the speed threshold, the follow focus motor can perform normal operation; when the operating speed of the follow focus motor is greater than the speed threshold, the normal operation of the follow focus motor cannot be guaranteed. Therefore, in order to ensure the stable operation of the auto-focusing operation, after the first rotation speed is obtained, the first rotation speed can be analyzed and compared with the speed threshold, and when the first rotation speed is greater than the speed threshold, it means that the determined first rotation speed is larger and cannot ensure the normal operation of the follow focus motor, therefore, the first rotation speed can be updated to the speed threshold to control the follow focus motor based on the speed threshold. Therefore, the first rotation speed can be updated to be the speed threshold to control the movement of the follow focus motor based on the speed threshold. If the first rotation speed is less than or equal to the speed threshold, then the determined first rotation speed is within the normal speed range, and therefore, the follow focus motor can be controlled based on the first rotation speed.

In this embodiment, by determining the current motor position of the follow focus motor corresponding to the contrast focusing information, obtaining the set position range corresponding to the follow focus motor, and then determining the first rotation speed and the first rotation direction of the follow focus motor based on the current motor position and the set position range, the accuracy and reliability of determining the first rotation speed and the first rotation direction corresponding to the follow focus motor are effectively ensured. In addition, when controlling the follow focus motor based on the first rotation direction and the first rotation speed, the focus operation can be achieved quickly and stably, which further improves the stability and reliability of the method.

In the related technology, when using the follow focus motor for focusing operation, the follow focus motor is engaged with the follow focus ring of the camera, and the follow focus motor and the camera are carried on the gimbal, for example, which also carries a depth detection apparatus, such as a time of flight TOF sensor, and the depth detection apparatus can provide the depth information of an area or an object within the sensing range of the camera, and can feed this information directly or indirectly to the follow focus motor. The depth detection apparatus can provide the depth information of an area or an object within the sensing range of the camera, and can feed this information directly or indirectly to the follow focus motor, which can drive the follow focus ring to rotate based on the depth information, so as to realize the focusing operation of an area or an object within the sensing range of the camera. In this way, it is not necessary to use an additional depth detection apparatus to realize the focusing operation, but can reuse the original function of the camera, which reduces the cost in the above application scenario and can effectively realize the focusing operation.

In other examples, for the auxiliary apparatus, it may include not only a follow focus motor but also a zoom motor, specifically, when the auxiliary apparatus includes a zoom motor for adjusting the zoom ring of the image capturing apparatus, obtaining the shooting parameters determined by the image capturing apparatus in this embodiment may include: obtaining the zoom information corresponding to the captured image.

Among them, during the operation of the image capturing apparatus, the captured image can be obtained through the image capturing apparatus, and then the captured image is analyzed and processed to obtain the zoom information corresponding to the captured image. Optionally, the zoom information can be obtained through the zoom controller. After obtaining the zoom information, the zoom motor can be controlled based on the zoom information to realize the zoom operation of the image capturing apparatus. At this time, controlling at least one of the gimbals and the auxiliary apparatus based on the control parameters can include: controlling the zoom motor based on the control parameters to realize the zoom operation of the image capturing apparatus.

Figure 5:
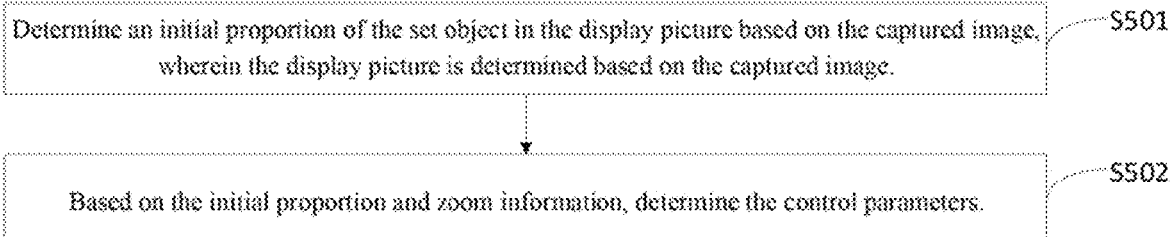
FIG. 5 is a schematic diagram of yet another process for determining control parameters based on said shooting parameters provided by embodiments of the present disclosure.

Optionally, when the auxiliary apparatus includes a zoom motor and can obtain the zoom information determined by the image capturing apparatus, in order to achieve control of the follow focus motor, the zoom information can be analyzed and processed to obtain control parameters corresponding to the zoom information, and then the zoom motor can be controlled based on the control parameters, wherein the zoom information is used to adjust the zooming ability of the camera lens, and different zoom information can correspond to different focal length information. Under the control of different focal length information, the subject is displayed in the image in different sizes. In some examples, referring to the attached FIG. 5, the control parameters determined based on the shooting parameters in this embodiment may include:

Step S501: Determine an initial proportion of the set object in the display picture based on the captured image, wherein the display picture is determined based on the captured image.

During the operation of the image capturing apparatus, the captured image can be acquired by the image capturing apparatus, and the acquired captured image can include the set object, which can be: a person, an animal, a plant, a building, a vehicle, etc. After the captured image is acquired, the captured image can be analyzed and processed to determine the initial proportion of the set object in the display picture. The initial proportion is used to identify the display size of the set object in relation to the display picture.

It is noted that the display picture is determined based on the captured image, and the size of the display picture may be the same as or different from the size of the captured image. Specifically, the display picture may be at least a portion of the captured image. For example, after acquiring a captured image, if the content included in the captured image is relatively large and the user is interested in only a part of the captured image, the user can determine the image area including the part of interest in the captured image as the display picture based on the demand; if the content included in the captured image is relatively small, the entire area of the captured image can be directly determined as the display picture.

In addition, this embodiment does not limit the specific way to determine the initial proportion of the set object in the display picture, and the technical person in the field can set it according to the specific application scenario or application requirements. For example, after acquiring the captured image, the set object and the display picture can be determined based on the user's input operation, and then the initial proportion of the set object in the display picture can be determined based on the determined set object and the display picture. The initial proportion of the set object on the display picture can be determined based on the set object and the display picture. In other examples, determining the initial proportion of the set object in the display picture based on the acquired image may include: obtaining the object size characteristics of the set object and the picture size characteristics of the display picture; and determining the initial proportion based on the object size characteristics and the screen size characteristics.

Optionally, after acquiring the captured image, the set object and display picture can be identified in response to the execution operation input by the user, or, alternatively, the set object and display picture can be identified by the target recognition algorithm, e.g., object 1, object 2, and object 3 are included in the captured image, and since the proportion of object 3 in the entire captured image is larger than the proportion of the other two objects in the captured image, the Object 3 can be identified as the set object based on the target recognition algorithm. After the set object and the display picture are acquired, the object size characteristics of the set object and the picture size characteristics of the display picture can be acquired based on the capturing image, where the object size characteristics can include at least one of the following: object length size, object width size, object area size; correspondingly, the picture size characteristics of the display picture can include at least one of the following: picture length size, picture width size, picture area size.

Wherein, obtaining the object size characteristics of the set object may include: identifying the contour information of the set object by an object recognition algorithm or a machine learning model, and determining the object size characteristics of the set object based on the contour information. Alternatively, obtaining the object size characteristics of the set object may include obtaining an identification frame corresponding to the set object, which may be a pre-defined rectangular frame, a square frame, a circular frame, etc., and determining the object size characteristics of the set object by the identification frame. In some cases, the object size of the set object can be displayed after the identification frame or contour information is obtained in order to make the user more intuitively aware of the object size characteristics of the set object.

After obtaining the object size feature and the picture size feature, the object size feature and the picture size feature can be analyzed and processed to determine the initial proportion. Since the object size feature and the picture size feature can have various expressions, the initial proportion can be determined in various ways. In some examples, when the object size feature includes an object length dimension and the picture size feature includes a picture length dimension, the determination of the initial proportion based on the object size feature and the picture size feature in this embodiment may include: determining the ratio between the object length dimension and the picture length dimension, as the initial proportion.

For example, when the object length is TL and the picture length is FL, the initial proportion P can be TL/FL or FL/TL, and since the object needs to be displayed on the display picture, TL<FL, it can be seen that when P=TL/FL, the obtained P is a value greater than 0 and less than 1; when P=FL/TL, the obtained P is a value greater than 1. Of course, the skilled person in the field can also use other implementations to obtain the initial proportion, for example, the initial proportion P can be TL/(FL−TL) or (FL−TL)/TL, in which case P can be a value greater than 1 or less than 1.

In other examples, where the object size feature includes an object width dimension and the picture size feature includes a picture width dimension, determining the initial proportion based on the object size feature and the picture size feature in this embodiment may include: determining the ratio between the object width dimension and the picture width dimension, as the initial proportion.

For example, when the object width is TW and the picture width is FW, the initial proportion P can be TW/FW or FW/TW, and since the set object needs to be displayed on the picture, TW<FW, it can be seen that when P=TW/FW, the obtained P is a value greater than 0 and less than 1; when P=FW/TW, the obtained P is a value greater than 1. Of course, the skilled person in the field can also use other implementations to obtain the initial proportion, for example, the initial proportion P can be TW/(FW−TW) or (FW−TW)/TW, where P can be a value greater than 1 or less than 1.

In yet further examples, where the object size feature includes the object area size and the picture size feature includes the picture area size, determining the initial proportion based on the object size feature and the picture size feature in this embodiment may include: determining the ratio between the object area size and the picture area size as the initial proportion.

For example, when the object area size is TS and the picture area size is FS, the initial proportion P can be TS/FS or FS/TS, and since the set object needs to be displayed in the display picture, TS<FS, it can be seen that when P=TS/FS, the obtained P is a value greater than 0 and less than 1; when P=FS/TS, the obtained P is a value greater than 1. Of course, the person skilled in the art can also use other implementations to obtain the initial proportion, for example, the initial proportion P can be TS/(FS−TS) or (FS−TS)/TS, where P can be a value greater than 1 or less than 1.

It should be noted that the way to determine the initial proportion of the set object in the display picture is not limited to the above-mentioned statement, but the person skilled in the art can also use other ways to obtain the initial proportion of the set object in the display picture, as long as it can ensure the accuracy and reliability of obtaining the initial proportion of the set object in the display picture, which will not be repeated here.

Step S502: Based on the initial proportion and zoom information, determine the control parameters.

After the initial proportion and zoom information are obtained, the initial proportion and zoom information can be analyzed and processed to determine the control parameters. In some examples, a machine learning model for determining the control parameters is pre-trained, and after the initial proportion and zoom information are obtained, the initial proportion and zoom information can be input into the machine learning model so that the control parameters output by the machine learning model can be obtained. In other examples, determining the control parameters based on the initial proportion and the zoom information may include: obtaining a second mapping relationship between the range of motion travel of the zoom motor and the zoom travel, and a third mapping relationship between the motion direction of the zoom motor and the zoom direction; and determining, based on the initial proportion, the zoom information, the second mapping relationship, and the third mapping relationship, the motion travel parameters corresponding to the zoom motor and the motion direction are determined based on the initial proportion, zoom information, the second mapping relationship and the third mapping relationship.

Wherein, for the zoom motor, a second mapping relationship between the range of motion travel and the zoom travel and a third mapping relationship between the motion direction and the zoom direction are pre-calibrated, and the above-mentioned second mapping relationship is used to identify a one-to-one correspondence between the motion travel and the zoom value of the zoom motor, and the third mapping relationship is used to identify a one-to-one correspondence between the motion direction and the zoom direction of the zoom motor. The second mapping relationship and the third mapping relationship can be stored in the preset area or the preset apparatus, and the second mapping relationship and the third mapping relationship can be obtained by accessing the preset area or the preset apparatus, so that the control parameters corresponding to the zoom motor can be obtained accurately based on the second mapping relationship and the third mapping relationship.

After obtaining the second mapping relationship and the third mapping relationship, the initial proportion, the zoom information, the second mapping relationship and the third mapping relationship can be analyzed and processed to determine the motion travel parameters and motion direction corresponding to the zoom motor, which are the control parameters used to control the zoom motor, thus effectively achieving accurate and reliable capturing of control parameters.

In this embodiment, when the auxiliary apparatus includes a zoom motor and can acquire the zoom information determined by the image capturing apparatus, the initial proportion of the set object in the display screen is determined through the image capturing, and then the control parameters are determined based on the initial proportion and the zoom information, and the said control parameters can include the motion stroke parameters and motion direction corresponding to the zoom motor, effectively realizing an accurate and reliable determination of the control parameters of the zoom motor. The control parameters are determined accurately and reliably, and then it is easy to control the zoom motor based on the control parameters to realize the zoom operation of the image capturing apparatus and the lens transport operation of Hitchcock.

In the related technology, when the zoom motor is used to perform the zoom operation, the zoom motor is engaged with the zoom ring of the camera, and the zoom motor and the camera are carried on the gimbal, for example, which also carries a depth detection apparatus, such as a time-of-flight TOF sensor, and the depth detection apparatus can provide the depth information of an area or an object within the sensing range of the camera, and can feed the information directly or indirectly to the zoom motor. The zoom motor can drive the zoom ring to rotate based on the depth information, thus realizing the zoom operation of a certain area or an object within the sensing range of the camera. In this way, it is not necessary to use an additional depth detection apparatus to realize the zoom operation, but can reuse the original function of the camera, which reduces the cost in the above application scenario and can effectively realize the zoom operation.

In some examples, for the auxiliary apparatus, it may include not only the follow focus motor, zoom motor, but also the fill light apparatus (e.g., fill light), specifically, when the auxiliary apparatus includes the fill light apparatus for the fill light operation of the image capturing apparatus, the obtaining of the shooting parameters determined by the image capturing apparatus in this embodiment may include: obtaining the light detection information determined by the image capturing apparatus.

Wherein, during the operation of the image capture apparatus, light detection information can be obtained by the image capture apparatus, which can include at least one of the following: exposure intensity, light color. In some examples, the image capturing apparatus may perform an identification table analysis, such as white balance detection, on the captured image to obtain the associated light detection. In some examples, the captured image is obtained by the image capturing apparatus, and the captured image is analyzed and processed to obtain the light detection information.

After the light detection information is obtained, the fill light apparatus can be controlled based on the light detection information to achieve the fill light operation of the image capturing apparatus, at which time the control of at least one of the gimbals and the auxiliary apparatus based on the control parameters can include: controlling the fill light apparatus based on the control parameters to achieve the fill light operation of the image capturing apparatus.

Figure 6:
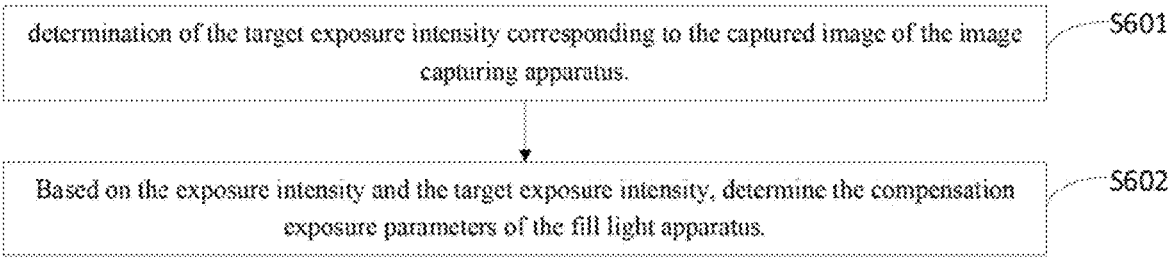
FIG. 6 is a schematic diagram of another process for determining control parameters based on said shooting parameters provided by embodiments of the present disclosure.

It should be noted that since the light detection information may include exposure intensity and/or light color, when obtaining control parameters corresponding to the light detection information, different light detection information may correspond to different data processing strategies, therefore, in order to ensure accurate and reliable capturing of control parameters, when the light detection information includes exposure intensity, this embodiment provides an implementation of obtaining control parameters, specifically, with reference to the attached FIG. 6, the control parameters determined based on the shooting parameters in this embodiment may include.

Step S601: determination of the target exposure intensity corresponding to the captured image of the image capturing apparatus.

Step S602: Based on the exposure intensity and the target exposure intensity, determine the compensation exposure parameters of the fill light apparatus.

The target exposure intensity corresponding to the captured image of the image capturing apparatus can be determined during the operation of the image capturing apparatus in order to achieve an exposure balancing operation to ensure the image quality and effect of the captured image of the image capturing apparatus, which can be pre-specified. Optionally, the user can configure the target exposure intensity based on the environmental information of the image capturing apparatus. Different environmental information can be configured with different target exposure intensities; or, the target exposure intensity can be automatically determined by the display quality of the captured image.

After obtaining the target exposure intensity, the exposure intensity and the target exposure intensity can be analyzed and processed to determine the compensation exposure parameter of the fill light apparatus, the compensation exposure parameter is the control parameter corresponding to the fill light apparatus, after obtaining the compensation exposure parameter, the fill light apparatus can be controlled based on the compensation exposure parameter to achieve the exposure balance operation of the image capturing apparatus. In some examples, the compensation exposure parameter can be a parameter determined by the difference between the target exposure intensity and the exposure intensity, or, the compensation exposure parameter can be a parameter determined by the ratio between the exposure intensity and the target exposure intensity.

Figure 7:
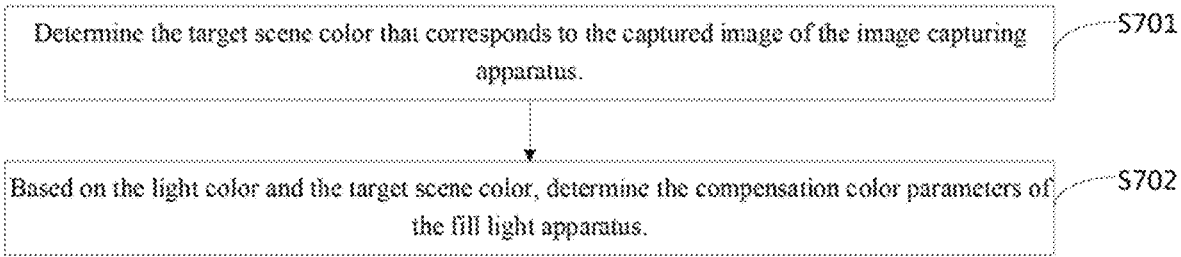
FIG. 7 is a schematic diagram of a further process for determining control parameters based on said shooting parameters provided by embodiments of the present disclosure.

In this embodiment, when the light detection information includes exposure intensity, the target exposure intensity corresponding to the captured image of the image capturing apparatus is determined, and the compensation exposure parameters of the fill light apparatus are determined based on the exposure intensity and the target exposure intensity, and then the fill light apparatus can be controlled based on the determined compensation exposure parameters, so that the exposure balancing operation of the image capturing apparatus can be realized, thus ensuring the quality and effect of the image quality and the effect of the images captured by the image capturing apparatus are thus ensured, which effectively improves the practicality of the method.

Where the light detection information includes light colors (e.g., various colors such as red, orange, yellow, green, blue, indigo, violet, etc.), this embodiment provides yet another way of implementing the capturing of control parameters, specifically, with reference to the attached FIG. 7, the determination of control parameters based on shooting parameters in this embodiment may include.

Step S701: Determine the target scene color that corresponds to the captured image of the image capturing apparatus.

Step S702: Based on the light color and the target scene color, determine the compensation color parameters of the fill light apparatus.

Among them, in the process of working of the image capture apparatus, in order to achieve the white balance of the captured scene, so as to ensure the picture quality and effect of the image captured by the image capture apparatus, the target scene color corresponding to the captured image of the image capture apparatus can be determined, and the target scene color can be pre-specified, specifically, the user can configure the target scene according to the environmental information in which the image capture apparatus is located. Specifically, the user can configure the target scene color based on the environmental information in which the image capture apparatus is located, and different environmental information can be configured with different target scene colors; or, the target scene color can be automatically determined by the display quality of the captured image.

After obtaining the target scene color, the light color and the target scene color can be analyzed and processed to determine the compensation color parameter of the fill light apparatus, which is the control parameter corresponding to the fill light apparatus, and after obtaining the compensation color parameter, the fill light apparatus can be controlled based on the compensation color parameter to achieve the white balance operation of the shooting scene corresponding to the image capturing apparatus. In some examples, the compensation color parameter can be a parameter determined by the difference between the target scene color and the light color, or, the compensation color parameter can be a parameter determined by the ratio between the light color and the target scene color.

In this embodiment, when the light detection information includes the light color, the target scene color corresponding to the captured image of the image capturing apparatus is determined, and the compensation color parameter of the fill light apparatus is determined based on the light color and the target scene color, and then the fill light apparatus can be controlled based on the determined compensation color parameter, so that the white balance operation of the scene corresponding to the image capturing apparatus can be realized. This ensures the quality and effect of the images captured by the image capturing apparatus, which effectively improves the practicality of the method.

In this way, there is no need to use an additional light detection apparatus to achieve the fill light operation in this application, but the original function of the camera can be reused, reducing the cost in the above application scenario, and the fill light operation can be effectively achieved.

In some examples, for an image capturing apparatus, the image capturing apparatus may include an optical element and an image sensor, and the optical element is used to reduce diffraction of light passing through its interior. For example, the optical element can be a diffractive optical element (DOE) or a light baffle, etc. When the optical element is a light baffle, the optical element can be a light baffle with a through-hole in the center, and the image sensor is provided in the imaging surface of the image capturing apparatus to receive the image light after the optical element reduces diffraction to generate the captured image. The image sensor can be a Charge-coupled Apparatus (CCD) image sensor or a Complementary Metal Oxide Semiconductor (CMOS) image sensor.

In addition, the image capturing apparatus may include not only the optical element and the image sensor, but also the anti-shake control unit, which in some examples may include a lens optical stabilization OIS unit and/or a body stabilization IBIS unit that can compensate for the shake of at least one of the optical elements and the image sensor in the image capturing apparatus based on the shooting parameters to adjust the captured image captured by the image capturing apparatus.

When the image capturing apparatus includes an anti-shake control unit, the anti-shake control operation of the gimbal can be performed based on the anti-shake control unit. In this case, obtaining the shooting parameters determined by the image capturing apparatus in this embodiment can include obtaining the anti-shake information determined by the anti-shake control unit set in the image capturing apparatus, and the anti-shake information is determined based on the position change information of the image capturing apparatus.

In the process of image capturing apparatus work, because the image capturing apparatus is set on the gimbal, the user can adjust the position of the image capturing apparatus by adjusting the attitude of the gimbal based on the use demand or design demand, and when the position of the image capturing apparatus changes, the anti-shake control unit in the image capturing apparatus can come to different anti-shake information according to the position change information of the image capturing apparatus.

Optionally, since the anti-shake information is determined based on the position change information of the image capturing apparatus, in order to ensure the accuracy and reliability of the determination of the anti-shake information, it is necessary to accurately obtain the position change information of the image capturing apparatus, at this time, in order to accurately obtain the position change information of the image capturing apparatus, for the gimbal and the image capturing apparatus supported by the gimbal, the image capturing apparatus may be provided with a first position sensor, which is used to detect the position change information, and/or, the gimbal may be provided with a second position sensor, which is used to detect the position change information, and the position change information is also used to adjust the spatial position of the image capturing apparatus, that is, the sensing information of the second position sensor may be used not only to determine the anti-shake information, but also to stabilization operation of the image capturing apparatus.

After obtaining the anti-shake information, the gimbal can be controlled based on the anti-shake information, at this time, the control of at least one of the gimbals and the auxiliary apparatus based on the control parameters can include: controlling the gimbal based on the control parameters to achieve the stabilization operation of the gimbal.

Optionally, when the auxiliary apparatus includes an anti-shake control unit and can obtain the anti-shake information determined by the anti-shake control unit set in the image capturing apparatus, in order to realize control of the gimbal, the anti-shake information can be analyzed and processed to obtain control parameters corresponding to the anti-shake information, and then the gimbal can be controlled based on the control parameters, so that the image quality and effect of the image acquired by the image capturing apparatus can be guaranteed. Display quality and effect of the image captured by the image capturing apparatus are improved further improving the practicality of the method.

Wherein, when the anti-shake control unit includes a lens optical anti-shake OIS unit and a body anti-shake IBIS unit, in order to improve the stability and reliability of controlling the gimbal, the method in this embodiment may include: detecting the communication connection status between the image capturing apparatus and the gimbal, and when the image capturing apparatus is communicatively connected to the gimbal, i.e., the image capturing apparatus is applied to the gimbal, then the IBIS unit set on the gimbal can be activated When the image capture apparatus is disconnected from the gimbal, i.e., the image capturing apparatus is detached from the gimbal, the optical anti-shake OIS unit of the lens corresponding to the image capturing apparatus can be activated to realize the anti-shake operation through the OIS unit.

Figure 8:
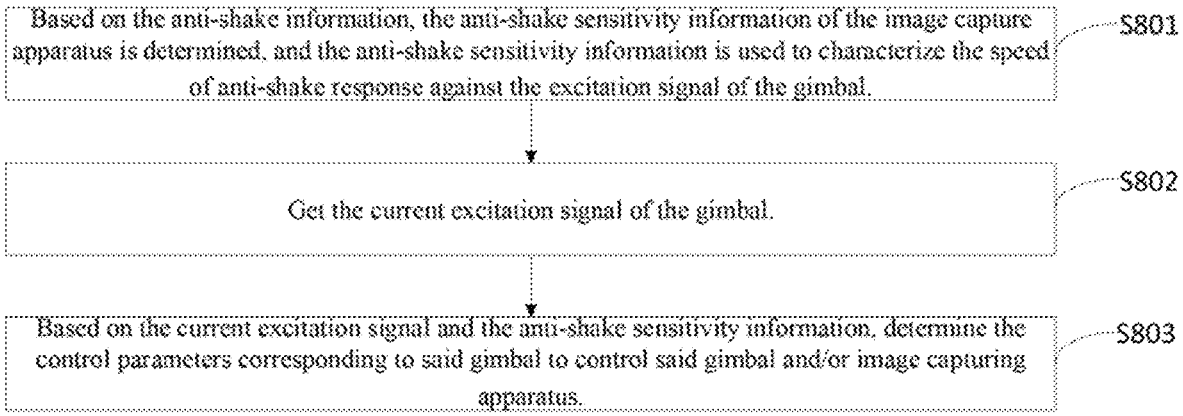
FIG. 8 is a schematic diagram of a further process for determining control parameters based on said shooting parameters provided by embodiments of the present disclosure.

Since the stabilization of the gimbal and the anti-shake operation inside the image capturing apparatus may interfere, which can reduce the quality and effectiveness of the anti-shake, this embodiment provides a way to determine control parameters for implementation, specifically, with reference to the attached FIG. 8, the determination of control parameters based on shooting parameters in this embodiment may include:

Step S801: Based on the anti-shake information, the anti-shake sensitivity information of the image capture apparatus is determined, and the anti-shake sensitivity information is used to characterize the speed of anti-shake response against the excitation signal of the gimbal.

After obtaining the anti-shake information, the anti-shake information can be analyzed and processed to determine the anti-shake sensitivity information of the image capturing apparatus. In some examples, determining the anti-shake sensitivity information of the image capturing apparatus based on the anti-shake information can include: obtaining the mapping relationship between the anti-shake information and the anti-shake sensitivity information, using the mapping relationship and the anti-shake information to determine the anti-shake sensitivity information of the image capturing apparatus. In other examples, based on the anti-shake information, determining the anti-shake sensitivity information of the image capturing apparatus may include: obtaining a machine learning model for analyzing and processing the anti-shake information, inputting the anti-shake information to the machine learning model so that the anti-shake sensitivity information of the image capturing apparatus can be obtained, the anti-shake sensitivity information being used to characterize the speed of this anti-shake response to the excitation signal of the gimbal, specifically when the anti-shake sensitivity information is large, it means that the anti-shake response to the excitation signal (i.e., the input signal) of the gimbal is faster; when the anti-shake sensitivity information is small, it means that the anti-shake response to the excitation signal of the gimbal is slower. For example, the excitation signal of the gimbal is 15 HZ excitation signal, when the anti-shake sensitivity information is larger, it means that the anti-shake response speed with the excitation signal of the gimbal is faster at this time; when the anti-shake sensitivity information is smaller, it means that the anti-shake response speed with the excitation signal of the gimbal is slower at this time.

Step S802: Get the current excitation signal of the gimbal.

Among them, for the body anti-shake IBIS unit set on the gimbal, the body anti-shake IBIS unit can be based on an excitation signal for anti-shake operation, and in different application scenarios, the excitation signal obtained by the body anti-shake IBIS unit can correspond to different frequency information, and the anti-shake operation and anti-shake effect of the body anti-shake IBIS unit are related to the frequency corresponding to the excitation signal. Therefore, in order to accurately obtain the control parameters corresponding to the anti-shake information, the current excitation signal of the gimbal can be obtained, and the current excitation signal is used to control the normal operation of the gimbal and the body anti-shake IBIS unit on the gimbal, specifically, the current excitation signal can be the control signal configured by the user based on the application scenario or application requirements or the default control signal. In some examples, the current excitation signal can be 10 HZ excitation signal, 5 HZ excitation signal, 15 HZ excitation signal or 20 HZ excitation signal and so on.

Step S803: Based on the current excitation signal and the anti-shake sensitivity information, determine the control parameters corresponding to said gimbal to control said gimbal and/or image capturing apparatus.

After obtaining the current excitation signal and the anti-shake sensitivity information, the current excitation signal and the anti-shake sensitivity information can be analyzed and processed, and the control parameters corresponding to the gimbal can be determined, and in some examples, based on the current excitation signal and the anti-shake sensitivity information, determining the control parameters corresponding to said gimbal can include: based on the anti-shake sensitivity information, determining the current sensitivity; and generating control parameters corresponding to the gimbal when the current sensitivity is greater than or equal to the sensitivity threshold.

Among them, after obtaining the anti-shake sensitivity information and the current excitation signal, the anti-shake sensitivity information and the current excitation information can be analyzed and processed to determine the current sensitivity corresponding to the current excitation signal. After the current sensitivity is obtained, the current sensitivity can be analyzed and compared with the sensitivity threshold, and when the current sensitivity is less than the sensitivity threshold, it means that the image capturing apparatus at this time has a slow anti-shake response to the excitation signal of the gimbal, that is, if the anti-shake suppression operation is carried out based on the lens optical anti-shake OIS unit included in the image capturing apparatus, a better anti-shake suppression effect can be obtained. Therefore, there is no need to generate control parameters corresponding to the gimbal, i.e., the anti-shake suppression operation is performed by the lens optical anti-shake OIS unit included in the image capturing apparatus.

When the current sensitivity is greater than or equal to the sensitivity threshold, it means that the image capturing apparatus at this time has a faster anti-shake response to the excitation signal of the gimbal, i.e., if the anti-shake suppression operation is performed based on the lens optical anti-shake OIS unit included in the image capturing apparatus, a better anti-shake suppression effect cannot be obtained, therefore, the body anti-shake IBIS unit on the gimbal can be used to perform the anti-shake suppression operation. In order to be able to achieve the anti-shake control operation, the control parameters corresponding to the gimbal can be generated. In some examples, generating control parameters corresponding to the gimbal may include: performing an inhibit operation on the current excitation signal to obtain an inhibited signal, and the inhibited signal is a control parameter corresponding to the gimbal.

Specifically, the anti-shake operation can be effectively suppressed through the gimbal, at this time, in order to avoid the anti-shake control unit in the image capturing apparatus to affect the effect of anti-shake operation on the gimbal, then the current excitation signal of the gimbal can be suppressed operation, so that the post-inhibition signal can be obtained. The post-inhibition signal is the control parameter corresponding to the gimbal, so that the anti-shake quality and effect of the gimbal can be ensured.

In further examples, determining control parameters corresponding to the gimbal based on the current excitation signal and the anti-shake sensitivity information may include: determining a current sensitivity corresponding to the current excitation signal based on the anti-shake sensitivity information; generating control parameters corresponding to the image capturing apparatus when the current sensitivity is greater than or equal to the sensitivity threshold, to control the anti-shake control unit based on the control parameters corresponding to the image capturing apparatus.

After the anti-shake sensitivity information and the current excitation signal are obtained, the anti-shake sensitivity information and the current excitation information can be analyzed and processed to determine the current sensitivity corresponding to the current excitation signal. After the current sensitivity is obtained, the current sensitivity can be analyzed and compared with the sensitivity threshold, and when the current sensitivity is greater than or equal to the sensitivity threshold, it means that the image capturing apparatus at this time has a faster anti-shake response to the excitation signal of the gimbal, that is, if the anti-shake suppression operation is carried out based on the lens optical anti-shake OIS unit included in the image capturing apparatus, it is not possible to obtain a better response. Therefore, it is not necessary to perform anti-shake suppression through the OIS unit. In order to ensure that it is not necessary to perform the anti-shake suppression operation by the OIS unit, it is possible to generate control parameters corresponding to the image capturing apparatus and control the anti-shake control unit based on the control parameters corresponding to the image capturing apparatus. In some examples, generating control parameters corresponding to the image capture apparatus may include: generating stop operation parameters corresponding to the anti-shake control unit, with the stop operation parameters being control parameters corresponding to the image capture apparatus. Specifically, when the anti-shake operation is sufficiently suppressed by the gimbal, at this time, in order to avoid the influence of the image capturing apparatus on the anti-shake operation, then the stop-run parameters corresponding to the anti-shake control unit can be generated, and the stop-run parameters are the control parameters corresponding to the image capturing apparatus, so that the anti-shake quality and effect of the gimbal can be ensured.

In this embodiment, the anti-shake sensitivity information of the image capturing apparatus is determined based on the anti-shake information, the current excitation signal of the gimbal is obtained, and the control parameters are determined based on the current excitation signal and the anti-shake sensitivity information, thus effectively ensuring the accuracy and reliability of the determination of the control parameters, which also avoids the degradation of the quality and effect of the acquired images due to the shaking operation, and further improves the practicality of the method.

Figure 9:
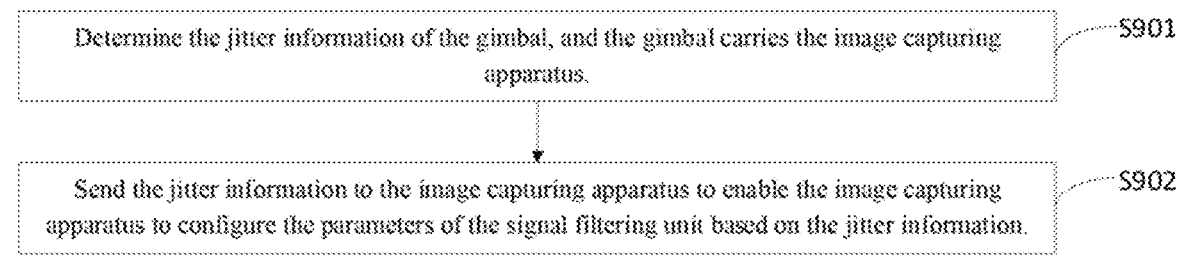
FIG. 9 shows a flow diagram of another control method based on an image capturing apparatus provided by an embodiment of the present disclosure.

During the operation of the gimbal, the gimbal may jitter due to external factors (e.g., the user's posture in operating the gimbal, such as pace speed, pace frequency, user jitter conditions, etc., vibration factors of the body used to carry the gimbal, etc.), which may include at least one of the following: jitter in the translational direction (direction parallel to the preset plane), jitter in the vertical direction (direction perpendicular to the preset plane). Since the gimbal carries the image capture apparatus, the jitter of the gimbal can affect the quality of the images captured by the image capture apparatus, which in turn can affect the mirroring effect of the gimbal. Specifically, in order to ensure the mirroring effect of the gimbal, within the image capturing apparatus can be referred to a signal filtering unit, specifically, with reference to the attached FIG. 9, this embodiment provides a process for configuring the signal filtering unit, and the method in this embodiment can also include.

Step S901: Determine the jitter information of the gimbal, and the gimbal carries the image capturing apparatus.

In order to enable the parameter configuration operation of the signal filter unit, the jitter information of the gimbal can be determined. In some examples, the gimbal can be equipped with an inertial measurement unit, and in this case, determining the jitter information of the gimbal can include: identifying the user step frequency through the inertial measurement unit to obtain the step frequency information, and since there is a pre-configured mapping relationship between the step frequency information and the jitter information of the gimbal, it is possible to use the mapping relationship to determine the jitter information of the gimbal. In some further examples, an environment sensor and an inertial measurement unit can be provided on the gimbal, and the environment information where the gimbal is located and the user's step frequency information are obtained through the environment sensor and the inertial measurement unit, and the environment information and the step frequency information are analyzed and processed to obtain the jitter information of the gimbal.

Step S902: Send the jitter information to the image capturing apparatus to enable the image capturing apparatus to configure the parameters of the signal filtering unit based on the jitter information.

Wherein, since the signal filtering unit of the image capturing apparatus is used to process the user's step frequency information to reduce or eliminate the gimbal jitter caused by the user's step frequency information, in order to better ensure the quality and effect of the gimbal operation, after obtaining the jitter information, the jitter information can be sent to the image capturing apparatus, and after the image capturing apparatus obtains the jitter information, the image capturing apparatus can configure the parameters of the signal filter unit based on the jitter information, so that the configured signal filter unit can better process the user's step frequency information to reduce or eliminate the jitter of the gimbal caused by the user's step frequency information.

In some examples, the image capturing apparatus can configure the signal filter unit based on the jitter information: the image capturing apparatus can analyze the jitter information, determine the user's step frequency information, determine the parameter information corresponding to the signal filter unit based on the user's step frequency information, and then configure the signal filter unit based on the parameter information, and the configured signal filter unit can reduce or eliminate the jitter of the gimbal caused by the user's step frequency information.

In this embodiment, by determining the jitter information of the gimbal, and then sending the jitter information to the image capturing apparatus, so that the image capturing apparatus can configure the signal filtering unit based on the jitter information, thus effectively realizing the configuration operation of the signal filtering unit in the image capturing apparatus based on the determined jitter information, which is conducive to ensuring that the signal filtering unit can better process the user's step frequency information based on the signal filtering unit, so as to reduce or eliminate the jitter caused by the user's step frequency information. This helps to ensure that the signal filtering unit can better process the user's step frequency information to reduce or eliminate the jitter of the gimbal caused by the user's step frequency information.

In some examples, for the shooting parameters, the shooting parameters may be determined based on the captured image and user expectations and can be used to implement a preset shooting function of the image capturing apparatus, wherein the preset shooting function may include a focus shooting operation, an intelligent follow operation, and the like. When the preset shooting function is the smart follow operation, the image capturing apparatus may be communicatively connected to the gimbal, and, the acquiring the shooting parameters determined by the image capturing apparatus in this embodiment may include: acquiring the capturing position of the target object in the captured image. Specifically, the captured image is acquired by the image capturing apparatus, and the captured image is later analyzed and processed to obtain the capturing position of the target object in the captured image. After the capturing position is obtained, the capturing position can be analyzed and processed to obtain control parameters, and in some examples, determining the control parameters based on the shooting parameters can include: determining control parameters for performing a following operation on the target object based on the capturing position.

Wherein, the mapping relationship between the capturing position and the control parameters used to achieve the following operation on the target object is pre-configured, and the control parameters used to perform the following operation on the target object can be determined based on the above mapping relationship and the capturing position.

After the control parameters are obtained, the gimbal and/or the auxiliary apparatus can be controlled based on the control parameters, and in some examples, the corresponding control of at least one of the gimbal and the auxiliary apparatus based on the control parameters can include: controlling the gimbal according to the control parameters to achieve a following operation of the target object. It is to be noted that the realization manner and the realization effect of the above steps in this embodiment are similar to the realization manner and the realization effect corresponding to the following attached FIGS. 16-FIG. 18, which can be referred to the content of the following statement, and will not be repeated herein; the technical solution in this embodiment effectively realizes that the target object can be followed operation stably, and further improves the practicality of the method.

The following specific application examples are provided below to highlight the technical solutions provided in this embodiment.

In application example 1, the camera may include a manual lens, a sensor, and an external focus motor, and the sensor may include: a sensor capable of supporting phase focus operation, and a sensor that does not support phase focus operation. If the sensor can support phase focus operation, the external focus motor can obtain phase detection auto focus (PDAF) information through the communication interface (e.g., USB interface) of the sensor, specifically, when the image capturing operation is performed through the manual lens, the user can obtain the specified area by clicking on the display area. And then you can get the PDAF information corresponding to the specified area. After obtaining the PDAF information, the pre-calibrated phase-focus ring position curve can be obtained, and the focus ring position can be calculated directly based on the phase-focus ring position curve and PDAF information, so that the external focus motor can be controlled to rotate to the target focus ring position based on the focus ring position, which can realize the fast focus operation of the lens.

Since PDAF information is in-camera information, in some instances, PDAF information is not easy to obtain, in some instances, PDAF information can be obtained by cooperating with camera manufacturers. If the sensor does not support phase focusing operation, the external motor can obtain the contrast focusing information (Contrast Detection Auto Focus, CDAF for short) by getting the contrast information of the focusing area, so that the contrast focusing function can be realized.

Figure 10:
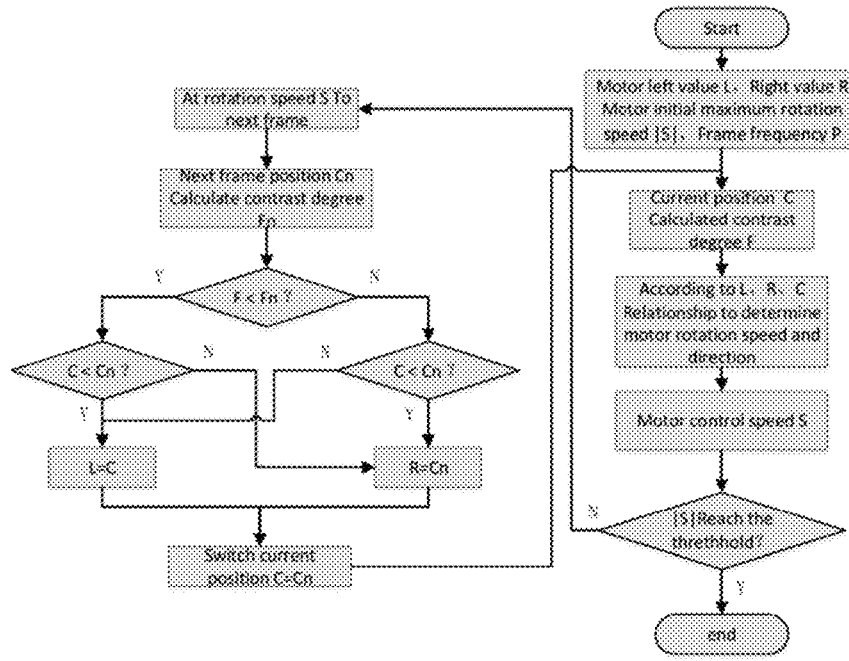
FIG. 10 is a schematic diagram of the flow of an autofocus method provided by an application embodiment of the present disclosure.

Specifically, with reference to the accompanying FIG. 10, the autofocus method in this application embodiment may include the steps of Step 1: The external focus motor gets to the mechanical limits of the manual lens by way of calibration.

Among them, the mechanical limits include the proximal position and the distal position, which are the left value L and the right value R. It should be noted that the proximal position can correspond to the minimum focal length value and the distal position can correspond to the maximum focal length value.

Step 2: Obtain the current position C of the external focus motor and calculate the contrast F of the focus area at the current position C (between L and R).

Step 3: Based on the current position C, proximal position L and distal position R of the external focus motor, the speed and focus direction of the external focus motor are calculated.

Since the initial state requires a decision on the focusing direction of the manual lens (distal direction or proximal direction), the speed of the external motor can be calculated in order to avoid that the next frame position is outside the range of L and R corresponding to the motor. Specifically, in order to obtain accurate CDAF information, the excitation signal can be obtained, which corresponds to a frequency information, so that the time information corresponding to the frequency information can be obtained, and then determine the distance between the current position C and the proximal position L and the distal position R. Based on the distance information and the above-mentioned time information, the speed of the external focusing motor can be determined (positively correlated with the focusing speed). It should be noted that, in order to ensure the stability of the focusing operation, a maximum motor speed can be pre-configured during the movement of the external focusing motor, and the motor speed used to control the movement of the external focusing motor is less than or equal to the maximum motor speed.

Step 4: Control the movement of the external focus motor based on the speed and focus direction to obtain the updated position C' of the external focus motor.

Step 5: Determine the update speed S and update the focus direction for calculating the external focus motor based on the updated position C'.

Step 6: Check if the update speed S reaches the convergence threshold.

Step 7: When the update speed S reaches the convergence threshold, the focus operation is achieved; when the update speed S does not reach the convergence threshold, the next image frame is acquired based on the update speed S.

Step 8: If the next frame does not satisfy the focusing condition, the contrast Fn of the diagonal area on the new position Cn of the motor is calculated.

Step 9: By judging the magnitude of the values of Fn and F, determine whether the focus point corresponding to the current position is clearer.

Step 10: Update the left and right values according to the comparison result, go back to calculating the focus direction and speed, and repeat until the speed meets the end condition, thus realizing the contrast focus (CDAF) operation.

Specifically, when F<Fn, then compare the size of C and Cn, and update the left value L to C when C<Cn; when C>Cn, then update the right value R to Cn; when F>Fn, then compare the size of C and Cn, and update the right value R to Cn when C<Cn; when C>Cn, then update the left value L to C, thus the operation of updating the left and right values is realized. After narrowing the range of the left and right values of the focus, further fine focusing can be achieved by reducing the motor speed, and so on repeatedly until the speed meets the end condition, thus realizing the contrast focus (CDAF) operation.

It should be noted that during the camera operation, the camera can include large aperture mode and small aperture mode. Since the accuracy of the obtained PDAF information is limited in large aperture mode (aperture value greater than or equal to the preset threshold), fast autofocus can be achieved by combining PDAF information with CDAF information. In the small aperture mode (aperture value less than the preset threshold), the accuracy of the obtained PDAF information is higher, so the fast autofocus operation can be achieved directly by PDAF information.

The technical solution provided by this application example effectively solves the problem that the manual lens in the prior art cannot achieve autofocus, and, furthermore, can ensure the stable operation of the autofocus operation, further improving the practicality of the method.

Application example 2, this application embodiment provides a method of automatic Hitchcock Dolly Zoom effect based on camera information, as Dolly Zoom requires the camera to be configured with a zoomable lens. In order to be able to achieve the Hitchcock transport mirror operation, when the confirmation of the intelligent following target, it is necessary to follow the frame selected intelligent following target operation, the shooting apparatus can move back and forth, in the lens Focal length remains unchanged, the proportion of the intelligent following target in the picture will change (far greater than the near small). Dolly Zoom can be achieved by controlling the zoom in order to keep the proportion of the smart following target in the screen. Specifically, the method can include the following steps:

Step S21: Calibrate the movement travel range of the zoom motor according to the camera zoom range.

Among them, for the zoom lens or electronic zoom, because the zoom lens or electronic zoom are corresponding to the zoom range, therefore, the zoom motor needs to be calibrated in advance for the zoom range, so that the correspondence between the lens travel and zoom motor travel can be obtained, so as to prevent damage to the camera lens caused by exceeding the zoom range during the zooming operation.

Step S22: Calibrate the movement direction of the zoom motor.

Among them, since the movement direction of the zoom motor depends on the mutual installation relationship between the mechanical structure and the zoom lens, the relationship between the movement direction and zoom direction (zoom in and zoom out) needs to be calibrated in advance, and the relationship between the above-mentioned calibrated movement direction and zoom direction enables the user to know whether the display picture will increase or decrease in the process of controlling the movement of the motor. or decrease the effect.

Step S23: Frame the intelligent following target and record the proportion of the initial frame selected target in the screen.

After the following target is framed, the proportion of the initial framed target in the screen can be recorded. Specifically, the proportion of the initial framed target in the screen can be determined by three indicators separately or jointly: (1) the proportion of the frame length of the intelligent following target to the screen length; (2) the proportion of the frame width of the intelligent following target to the screen width; (3) the proportion of the frame area of the intelligent following target to the screen area. Among them, the ratio of width is relatively stable and reliable.

Step S24: The proportion of the initial frame selection target in the screen is used to control the follow focus motor so as to control displaying the target in the screen consistently.

In the process of the shooter moving relative to the subject, the initial target proportion of the follow focus motor or electronic zoom output can be calculated in real time, based on the initial target proportion to control the target to be displayed in the screen consistently. Specifically, as shown in FIG. 11, the camera obtains the display screen, obtains the initial target proportion based on the display screen, and inputs the initial target proportion to the Proportional, Integral, Differential (PID) control unit, so that the PID control unit can generate the control signal corresponding to the follow focus motor based on the initial target proportion. The PID control unit can generate the control signal corresponding to the focus motor based on the initial target proportion, and then control the focus motor based on the control signal to ensure that the target is displayed consistently on the screen during the movement of the focus motor.

The technical solution provided by this application example effectively solves the problem that the manual control of Dolly zoom's mirror operation method in the prior art is more difficult to manipulate, and, it can ensure the quality and effect of Dolly zoom's mirror operation, further improving the practicality of the method.

Application example 3, the gimbal can be set with Gimbal Image Stabilization (GIS), for the gimbal and the camera carried by the gimbal, usually, in order to avoid the shooter's hand shake to cause the picture blurred or unclear, the camera will be set with optical image stabilization control unit (OIS). However, due to the limitation of physical size, the range of movement of OIS is usually small, and when the shake amplitude is large, the shake of the picture cannot be suppressed by OIS alone, while the movement range of Gimbal Image Stabilization (GIS) is large, and it can overcome the shake of large amplitude under the posture very well, at this time. The GIS on the gimbal image stabilization unit alone can suppress the jitter of the picture. However, since the OIS of the camera and the GIS of the gimbal are usually designed separately by the camera manufacturer and the gimbal manufacturer, the GIS and OIS may interfere with each other in the process of anti-shake control, i.e., the anti-shake effect of OIS combined with GIS is worse than that of OIS alone or GIS alone.

Based on the above, this application embodiment provides a control method based on camera anti-shake OIS combined with gimbal anti-shake, the control method can be based on the gimbal can get the OIS information inside the camera, the interference situation of anti-shake to carry out the corresponding circumvention operation, specifically, the method can include the following steps.

Step 31: Obtain the camera OIS information, and test the OIS sensitivity function through the camera OIS information.

When the camera has OIS, the camera can be controlled to turn on the OIS, and then the gimbal can be swept under the control of the set frequency excitation signal, where the set frequency excitation signal can include any of the following: 1 Hz excitation signal, 2 Hz excitation signal, 5 Hz excitation signal, 10 Hz excitation signal or 20 Hz excitation signal, etc. The camera's captured image corresponding to the different excitation signals can be obtained, and the OIS sensitivity function of the camera at different excitation signals can be known.

Step 32: Get the current excitation signal of the gimbal.

Step 33: Determine whether the current excitation signal has sufficient rejection at the set frequency corresponding to the OIS sensitivity function.

Step 34: If the current excitation signal is not sufficiently suppressed at the set frequency corresponding to the OIS sensitivity function, it means that the OIS in the camera alone cannot sufficiently suppress the jitter situation of the gimbal or the image capturing apparatus, and then the stabilization operation can be performed by the GIS on the gimbal, or, the stabilization operation can be performed by combining the OIS in the camera and the GIS on the gimbal.

Step 35: If the current excitation signal has sufficient suppression capability at the set frequency corresponding to the OIS sensitivity function, it means that the OIS in the camera alone can sufficiently reduce the effect of jitter on the image captured by the camera, at this time, the GIS on the gimbal can be turned off for anti-shake operation; or, the excitation signal of the gimbal can be suppressed, so that the post suppression signal can be obtained, and then the gimbal can be controlled based on the suppressed signal, and then the anti-shake operation can be performed only by the OIS in the camera.

It should be noted that the OIS in the camera can also be filtered for the user's jitter. Specifically, in many application scenarios of handheld gimbal, the user's walking step frequency may affect the stable display of the screen, and the gimbal is a three-axis gimbal. Because the three-axis gimbal can only carry out posture stabilization operation, but can not filter the interference in the direction of flat motion, at this time. The camera can set the parameters of the signal filter based on the recognized step information. After the parameters are configured, the signal filter in the camera can filter the signal in the direction of panning, which can reduce or eliminate the jitter of the gimbal caused by the user's step information.

The technical solution provided by this application embodiment can solve the problem of anti-shake interference by fusing camera gyroscope sensor information, so as to effectively ensure the effect of increasing stability to the gimbal and camera, thus contributing to improving the display quality and display effect of the images captured through the camera, and thus ensuring the practicality of the control method.

Application example 4, for the gimbal and the camera supported by the gimbal, during the operation of the gimbal and the camera, in a low light environment, the camera usually uses the automatic adjustment of ISO to achieve the overall picture exposure balance. But after the ISO is high to a certain extent, it will lead to the increase of noise and deterioration of image quality. In order to solve the above problems, this application embodiment provides a method for automatically adjusting aperture as well as external light exposure to achieve exposure balance. Specifically, the method may include the following steps.

Step 41: The actual metering value is obtained through the camera.

Step 42: Determine the target exposure value that corresponds to the camera.

Step 43: The actual metering value and the target exposure value are input to the PID unit so that the control parameters corresponding to the fill light and the aperture motor can be generated.

Specifically, as shown in FIG. 12, after obtaining the actual metering value and the target exposure value, the actual metering value and the target exposure value can be input to the PID control unit, so that the PID control unit can generate control signals corresponding to the fill light and the aperture motor based on the actual metering value and the target exposure value, and then the fill light and the aperture motor can be controlled based on the control signals, so as to ensure the quality and effectiveness of the image capturing operation.

Step 44: Control operation of the fill light and the aperture motor based on the control parameters to achieve the fill light operation.

Which for manual lenses, the camera's aperture priority exposure mode can not directly control the lens aperture size through the mount, as the technical solution in this application can be achieved by controlling an external motor to achieve the operation of adjusting the exposure value, its implementation of a simple PID closed-loop controller. In the same case, when the aperture is opened to the maximum, it is also possible to increase the external light by adding an external fill light to make the exposure balanced.

The technical solution provided by this application embodiment, through external light control, solves the problem of ISO not fixed in manual gear mode, further improves the practicality of this control method, and is conducive to the promotion and application of the market.

In addition, this embodiment provides a focus control method, the focus control method may be performed by a focus control apparatus, the focus control apparatus may be implemented as software, or a combination of software and hardware, and in particular, the focus control method may be applied to a gimbal, wherein the gimbal is used to support an image capturing apparatus and an auxiliary apparatus, the auxiliary apparatus may include a follow focus motor for adjusting the follow focus ring of the image capturing apparatus, specifically, the focus control method in this embodiment may include focus motor for adjusting the focus ring of the image capture apparatus. Specifically, the focus control method in this embodiment may include:

Step S1001: obtaining the focus information determined by the image capturing apparatus.

Step S1002: determining the control information corresponding to the focusing motor based on the focusing information.

Step S1003: Control the focus motor based on the control information to achieve the follow focus operation of the image capturing apparatus.

It is to be noted that the specific manner of implementation and the effect of implementation of the above steps in this embodiment are similar to the specific manner of implementation and the effect of implementation of the method shown in FIGS. 1-4 and FIGS. 10-12 in the above embodiment, and the part not described in detail in this embodiment can be referred to the relevant description of the embodiment shown in FIGS. 1-4 and FIGS. 10-12.

In addition, this embodiment provides a zoom control method, the execution subject of the zoom control method can be a zoom control apparatus, the zoom control apparatus can be implemented as software, or a combination of software and hardware, specifically, the zoom control method can be applied to a gimbal, when the gimbal is used to support an image capturing apparatus and an auxiliary apparatus, the auxiliary apparatus can include a zoom motor for adjusting the zoom of the image capturing apparatus. A zoom motor for adjusting the zoom ring of the image capturing apparatus, specifically, the zoom control method in this embodiment may include:

Step S1101: Obtain the captured image captured by the image capture apparatus and the zoom information corresponding to the captured image.

Step S1102: Based on the captured image and zoom information, determine the control parameters of the zoom motor.

Step S1103: The zoom motor is controlled based on the control parameters to achieve the zoom operation of the image capturing apparatus.

It is to be noted that the specific manner of implementation and the effect of implementation of the above steps in this embodiment are similar to the specific manner of implementation and the effect of implementation of the method shown in FIGS. 1, 5, and 10-12 of the above embodiment, and the parts not described in detail in this embodiment can be referred to the relevant descriptions of the embodiments shown in FIGS. 1, 5, and 10-12.

In addition, this embodiment provides a fill light control method, the execution subject of the fill light control method may be a fill light control apparatus, the fill light control apparatus may be implemented as software, or a combination of software and hardware, specifically, the fill light control method may be applied to a gimbal, when the gimbal is used to support an image capturing apparatus and an auxiliary apparatus, the auxiliary apparatus may include a fill light apparatus for performing a fill light apparatus for fill light operation, specifically, the fill light control method in this embodiment may include:

Step S1201: Obtain the light detection information determined by the image capturing apparatus.

Step S1202: Based on the light detection information, determine the control parameters corresponding to the fill light apparatus.

Step S1203: Control the light filling apparatus based on the control parameters to achieve the light filling operation of the image capturing apparatus.

It is to be noted that the specific manner of implementation and the effect of implementation of the above steps in this embodiment are similar to the specific manner of implementation and the effect of implementation of the method shown in FIGS. 1, 6-7, and 10-12 in the above embodiment, and the part not described in detail in this embodiment can be referred to the relevant description of the embodiment shown in FIGS. 1, 6-7, and 10-12.

In addition, this embodiment provides an anti-shake control method, the anti-shake control method can be performed by the anti-shake control apparatus, the anti-shake control apparatus can be implemented as software, or a combination of software and hardware, when the specific implementation, the anti-shake control method can be applied to the gimbal, at this time, the gimbal is used to support the image capturing apparatus, the gimbal can be provided with the body anti-shake IBIS unit, and the image capturing apparatus includes an anti-shake control unit, and the anti-shake control unit can include: a lens optical anti-shake OIS unit, and the anti-shake control unit can compensate for shake based on shooting parameters for at least one of the optical elements and the image sensor in the image capture apparatus to adjust the captured image captured by the image capturing apparatus; specifically, the anti-shake control method in this embodiment can include:

Step S1301: Obtain the anti-shake information determined by the anti-shake control unit set in the image capturing apparatus, and the anti-shake information is determined based on the position change information of the image capturing apparatus.

Step S1302: Determine the current excitation signal of the gimbal.

Step S1303: Based on the current excitation signal and anti-shake information, determine the control parameters.

Step S1304: Control the gimbal based on the control parameters to achieve the stabilization operation of the gimbal.

In some examples, the method in this embodiment may also include: detecting the communication connection status between the image capturing apparatus and the gimbal, and when the image capturing apparatus is communicatively connected to the gimbal, i.e., the image capturing apparatus is applied to the gimbal, the IBIS unit set on the gimbal may be activated to realize the anti-shake operation through the IBIS unit; When the image capturing apparatus is disconnected from the gimbal, the optical anti-shake OIS unit of the lens corresponding to the image capturing apparatus can be activated to achieve anti-shake operation through the OIS unit.

It is to be noted that the specific manner of implementation and the effect of implementation of the above steps in this embodiment are similar to the specific manner of implementation and the effect of implementation of the method shown in FIGS. 1 and 8-12 in the above embodiment, and the part not described in detail in this embodiment can be referred to the relevant description of the embodiment shown in FIGS. 1 and 8-12.

FIG. 13 is a schematic diagram of the structure of an image capturing apparatus based control apparatus provided by an embodiment of the present disclosure; with reference to the accompanying FIG. 13, this embodiment provides an image capturing apparatus based control apparatus, the image capturing apparatus based control apparatus for performing the image capturing apparatus based control method shown in FIG. 1 above, specifically, the image capturing apparatus based control apparatus may comprise:

Memory 12 for storing computer programs;

Processor 11 for running a computer program stored in memory 12 to implement:

capturing of the shooting parameters determined by the image capturing apparatus, the shooting parameters being able to be used to adjust the captured image acquired by the image capturing apparatus.

determination of control parameters based on shooting parameters.

The corresponding control of at least one of the gimbal and the auxiliary apparatus is based on the control parameters, wherein the gimbal is used to support the image capture apparatus and/or the auxiliary apparatus, and the auxiliary apparatus is used to assist the image capturing apparatus in the corresponding shooting.

Wherein, the structure of the control apparatus based on the image capturing apparatus may also include a communication interface 13 for the electronic apparatus to communicate with other apparatus or communication networks.

The apparatus shown in FIG. 13 performs the method of the embodiment shown in FIGS. 1-12. For parts not described in detail in this embodiment, reference is made to the relevant description of the embodiment shown in FIGS. 1-12. The execution process and technical effects of the technical solution are described in the embodiment shown in FIGS. 1-12 and will not be repeated here.

Further, embodiments of the present disclosure provide a computer readable storage medium, the storage medium being a computer readable storage medium, the computer readable storage medium having program instructions stored therein, the program instructions being used to implement the image capturing apparatus based control method of FIGS. 1-12 above.

FIG. 14 is a schematic diagram of the structure of a gimbal provided by an embodiment of the present disclosure; with reference to the accompanying FIG. 14, this embodiment provides a gimbal that may include:

a gimbal main body 21.

the image capture apparatus based control apparatus 24 of FIG. 13 above is provided on the gimbal main body 21.

The principle and technical effect of the implementation of the gimbal in this embodiment is similar to the principle and technical effect of the implementation of the control apparatus based on the image capturing apparatus, as described in the embodiment shown in FIG. 13, and will not be repeated here.

In some examples, referring to the attached FIG. 14, the gimbal in this embodiment may further comprise:
Image capturing apparatus 22, provided on the gimbal body 21.
an auxiliary apparatus 23, set on the gimbal main body 21, for assisting the image capturing apparatus 22 to carry out the corresponding shooting.

The principle and technical effect of the implementation of the gimbal in this embodiment is similar to the principle and technical effect of the implementation of the control apparatus based on the image capturing apparatus, as described in the embodiment shown in FIG. 13, and will not be repeated here.

On the other hand, with the rapid development of science and technology, the use of digital cameras, SLR cameras for video shooting operations more and more users, and then the gimbal as an auxiliary video shooting tool has also been more widely used. But the gimbal is not only limited to the process of video shooting to stabilize the anti-shake, and can also be expanded to more other methods of operation, thus helping to ensure that the user's video shooting experience effect.

In the process of video shooting, how to ensure that the subject (target object) remains in a fixed position in the video composition (composition position) has become a key issue that relies on the technical nature of the photographer's shooting. With the development of Artificial Intelligence (AI) technology, it has become possible to identify the position of the subject in the picture. In addition, the gimbal can perform stabilization operations, but also control the camera for rotational movement, the combination of the two to achieve a closed loop, you can achieve the intelligent following of the subject operation. In the process of intelligent following operation for a certain target object, in order to ensure the quality and effect of intelligent following operation, the following two points are more important: first, how to get the position information of the subject in the picture; second, how to control the movement of the gimbal to keep the subject in the composition position, such as the center of the picture.

In the related art, the method to control the intelligent following with the third party camera is mainly to introduce an image processing apparatus (including the following image signal processing apparatus) in the gimbal, and the image processing apparatus can get the real-time image of the camera through the High Definition Multimedia Interface (HDMI) or other interfaces. The image processing apparatus can get the real-time image of the camera through the High Definition Multimedia Interface (HDMI) or other interfaces, and input the real-time image into the AI machine learning unit (software implementation) to get the real-time position of the object to be photographed in the third-party camera.

Optionally, as shown in FIG. 15, a camera 100 is used as an image capturing apparatus, for example, and the camera 100 is used as a third-party load, which can be connected to an image signal processing (Image Signal Processing, or ISP) apparatus via an HDMI interface, and the image signal processing apparatus can include: an ISP module 1011, a cache 1012, a real-time video output. The above-mentioned ISP module 1011 can analyze and process the received images and transfer the processed image data to the cache 1012 for caching. The image data cached by the cache 1012 can not only be output in real time by the real-time video output 1013, but also can be converted to a format using the format converter 1014, so that the image data after the format conversion operation can be input to the machine learning model 1015 for machine learning operation to identify the subject to be followed set by the user. After identifying the subject to be followed, the control parameters of the gimbal can be determined in accordance with the strategy by the strategy processor 1016, and then the gimbal controller 102 can control the gimbal based on the control parameters of the gimbal to realize that the gimbal can perform intelligent following operation on the subject to be followed.

However, the above technical solutions have the following problems: there is a large delay in the video signal obtained from the HDMI interface transmission, which directly leads to the effect of following the operation becomes poor, and the length of delay corresponding to the HDMI interface of different cameras is different, which leads to algorithmically difficult to normalize the processing.

In addition, with the rise of short video, camera manufacturers have also launched their own automatic following algorithms, but camera manufacturers' following algorithms are used for focal point following, but the basic principle is: to obtain the position of the subject in the picture, which means that camera manufacturers are able to calculate the real-time image so that they can obtain the real-time position of the subject without generating the delay caused by HDMI transmission video to the image signal processing apparatus on the side of the gimbal to process the image to get the real-time position of the subject caused by the delay, and, in the use of the internal calculation of the camera to get the coordinate information of the object to be followed in a relatively high time efficiency.

When using a third-party camera for following operation, usually the more accurate the target coordinate position of the identified subject is, the better. However, this also easily leads to a point-skipping situation in the coordinates of the subject being followed by the third-party camera, for example, when switching from human gimbal and shoulder following to face following or from face following to human eye following, it is obviously the same person, but the coordinates used for following will change, thus leading to Jumping point problem.

To summarize, the intelligent following methods in the related art suffer from the following shortcomings.
(1) When using the gimbal connected with camera communication for intelligent following operation, although the real-time position of the followed object can be calculated by the image processing module, it will increase the development cost of additional AI machine learning algorithm and the hardware design cost.
(2) When transmitting the image to the image processing module on the gimbal side through HDMI interface, due to a series of image processing by the image processing module, the delay time corresponding to the gimbal obtaining the real-time position of the followed object is relatively large, and the larger the delay time is, the worse the effect of following operation on the followed object is; when the delay time reaches a bottleneck, the target following operation cannot even be realized.
(3) The delay corresponding to the HDMI interface of different cameras is not the same, the difference is relatively large, and it is difficult to do normalization in the algorithm.

(4) When using a third-party camera for intelligent following operation, the coordinates of the following frame are prone to jump for the following frame used to limit the followed object, and the existing following algorithm cannot solve such problems.

In order to solve at least one of the above technical problems, this embodiment provides a control method, an apparatus, a movable platform and a storage medium for a gimbal. Wherein, the control method determines control parameters for following operation of the target object by acquiring the capturing position of the target object in the capturing image, and determines control parameters for following operation of the target object based on the capturing position; and then controls the gimbal according to the control parameters so that following operation of the target object can be realized. Since the capturing position is determined by the image capturing apparatus and the gimbal can directly acquire the capturing position determined by the image capturing apparatus, and the gimbal can acquire the capturing position directly through the image capturing apparatus, which effectively reduces the delay time corresponding to the capturing position acquired by the gimbal through the image capturing apparatus, thus solving the problem of poor following effect due to the large delay time, further ensuring the quality and effect of the gimbal following operation, and effectively improving the stability and reliability of the use of the method.

Some embodiments of the control method, apparatus, removable platform and storage medium of a gimbal of the present disclosure are described in detail below in conjunction with the accompanying drawings. The following embodiments and the features in the embodiments can be combined with each other without conflict between the embodiments.

FIG. 16 is a flow schematic diagram of a control method of a gimbal provided by an embodiment of the present disclosure; FIG. 17 is a structural schematic diagram of a gimbal communicatively connected to an image capturing apparatus provided by an embodiment of the present disclosure; Referring to the accompanying FIGS. 16-17, this embodiment provides a control method of a gimbal, wherein the gimbal is communicatively connected to an image capturing apparatus, and it is understood that an image capturing apparatus is a apparatus having image capturing capability and image processing capability, for example, a camera, a video camera, other apparatuses having image capturing capability and image processing capability, and the like. In some examples, the gimbal may be provided with a communication serial bus USB interface, and the USB interface is used for wired communication connection with the image capture apparatus, i.e., the gimbal is communicatively connected to the image capturing apparatus via the USB interface. In specific applications, when the gimbal transmits the position data of the followed object with the image capturing apparatus through the USB interface, the delay time corresponding to the position data of the followed object transmitted between the gimbal and the image capturing apparatuses relatively short because no additional image signal processing apparatus is required on the gimbal side. For example, when the gimbal transmits the position data of the followed object to the image capturing apparatus through the HDMI interface, the delay time corresponding to the position data of the followed object is t1; when the gimbal transmits the position data of the followed object to the image capturing apparatus through the USB interface, the delay time corresponding to the position data of the followed object is t2, where t2<t1 or t2<<t1.

It can be understood that the communication connection between the gimbal and the image capturing apparatus is not limited to the above-limited implementation, but the technical person in the field can also set up according to the specific application needs and application scenarios, such as wireless communication, or can ensure that the corresponding delay time is relatively short when the gimbal and the image capturing apparatus carry out data transmission, which will not be repeated here.

It should be noted that in the other ways of communication connection between the gimbal and the image capturing apparatus other than using HDMI interface, in addition to the above-mentioned position data of the followed object, other data, such as control commands, image data, etc. can be transmitted, which can be designed according to the needs and adaptability, and no specific limitation is made here.

Further, the subject of the execution of the control method of the gimbal may be a control apparatus of the gimbal. It is understood that the control apparatus can be implemented as software, or a combination of software and hardware; when the control apparatus executes the control method of the gimbal, the problem of poor following effect due to the relatively long delay generated by transmitting data through the interface can be solved, and thus the quality and effect of following operation on the target object can be ensured. Specifically, the method may include:

Step S1601: The capturing position of the target object in the captured image is obtained, the capturing position is determined by the image capturing apparatus, the image capturing apparatus is a camera with a manual lens or an automatic lens, and the image capturing apparatus is communicatively connected to the gimbal.

Step S1602: Based on the capturing position, determine the control parameters used to perform the following operation on the target object.

Step S1603: The gimbal is controlled according to the control parameters to achieve the following operation of the target object.

The process of implementing each of these steps is described in detail below.

Step S1601: The capturing position of the target object in the captured image is obtained, and the capturing position is determined by the image capturing apparatus.

Among them, the image capturing apparatus may be provided on the gimbal for image capturing operation, and after acquiring the capturing image, the image capturing apparatus may analyze and process the captured image to determine the capturing position of the target object in the captured image. Specifically, the capturing position of the target object in the captured image may include: the location of the key point corresponding to the target object in the captured image, or, the coverage area corresponding to the target object in the captured image, etc.

It is understood that the capturing position can be obtained by the image capturing apparatus by directly sampling the pixels of the image, or it can be obtained by using the sampling results of the pixels of the image for processing, such as if the target object corresponds to a following frame, and after obtaining the position of the vertex of the following frame in the captured image and the size of the following frame, the center position of the following frame can be determined using the vertex and the size of the following frame, and the center position is used as the sampling position of the target object in the captured image.

It is noted that when the target object corresponds to a follow frame, the capturing position may be determined or characterized based on information about the position of the follow frame in the captured image. For example, if the user selects an object on the display of the image capturing apparatus, a follow frame that frames at least part of the object is generated.

After obtaining the capturing position of the target object in the captured image, then the capturing position of the target object in the captured image can be actively or passively transmitted to the gimbal through the USB interface, so that the gimbal can obtain the capturing position of the target object in the captured image.

Step S1602: Based on the capturing position, determine the control parameters used to perform the following operation on the target object.

After the capturing position is obtained, the capturing position can be analyzed to determine the control parameters for following the target object, which can include at least one of the following: attitude information, angular velocity information, acceleration information, control bandwidth, etc.

In this regard, since the capturing position is determined by the image capturing apparatus, and it takes some time for the capturing apparatus to transmit to the gimbal, and thus there is a certain delay time for the gimbal to obtain the capturing position directly through the image capturing apparatus, when determining the control parameters, it is necessary to analyze the capturing position in conjunction with the delay time corresponding to the capturing position to be able to accurately determine the control parameters for the performing the following operation on the target object. In some examples, determining the control parameters for following the target object based on the capturing position may include: calculating a current position prediction value corresponding to the capturing position; and determining the control parameters for following the target object based on the current position prediction value.

Figure 18:
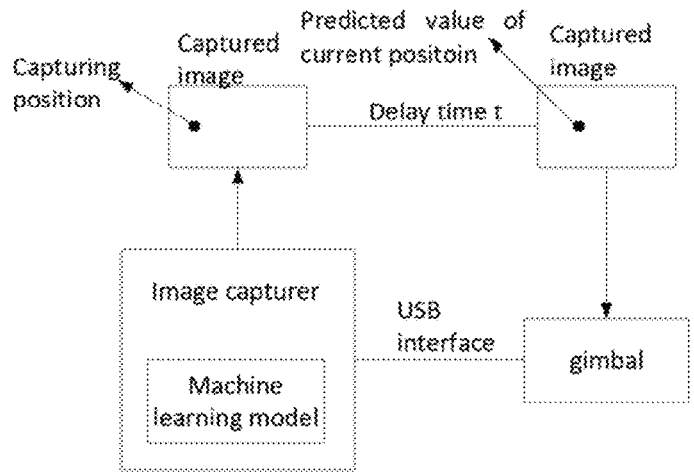
FIG. 18 shows a schematic diagram of obtaining the capturing position of the target object in the capturing image provided by an embodiment of the present disclosure.

Optionally, as shown in FIG. 18, after the image capturing apparatus acquires the captured image, the captured image can be analyzed and processed so that the capturing position of the target object in the captured image can be obtained, and the capturing position of the target object in the captured image can be transmitted to the gimbal. Since it takes some time for the image capturing apparatus to acquire the capturing position and for the capturing position to be transmitted to the gimbal, there is also a certain delay time for the gimbal to acquire the capturing position directly from the image transmission capturing apparatus. In order to reduce the degree of influence of the delay time on the intelligent following operation, the current position prediction value corresponding to the capturing position can be calculated based on the above delay time. It is understood that the current position prediction value is a different position from the capturing position.

After obtaining the current position prediction, the current position prediction can be analyzed and processed to determine the control parameters for following the target object. The current position prediction is determined by considering the delay time corresponding to the transmission of the collected position, thus effectively ensuring the accuracy and reliability of the control parameters.

Step S1603: The gimbal is controlled according to the control parameters to achieve the following operation of the target object.

After obtaining the control parameters, the gimbal can be controlled based on the control parameters, so that the target object can be followed.

As the above analysis shows, in the related technology, the capturing position is calculated by the gimbal side, and the gimbal side needs to set up additional map transmission module and image signal processing apparatus to obtain the captured image of the image capturing apparatus and be able to analyze and process the captured image and perform the following operation. However, in this application, the image signal processing function of the image capturing apparatus is reused, so that not only the gimbal side can realize the following operation of the target object without the additional signal processing apparatus, but also the following operation of the target object can be realized without setting up the map transmission module; at the same time, in the process of data transmission, the bandwidth required for the transmission of the captured image is much larger than the bandwidth required for the transmission of the capturing position, thus the transmission data can be reduced to a certain extent. Therefore, the reduction of transmission data can reduce the time delay of the following operation to a certain extent, thus effectively improving the efficiency and accuracy of following the target object.

It can be understood that in the scenario where the capturing position is obtained directly from the image capturing apparatus, the gimbal side can also be provided with a map transmission module to be able to display the captured image on the gimbal side, and an image signal processing apparatus can also be provided to adapt to different image capturing apparatuses, such as adapting to certain image capturing apparatuses from which the capturing position cannot be obtained.

Wherein, when the image capturing apparatus is provided with an image signal processing apparatus, the processing capability may be due to the image signal processing apparatus on the gimbal side. In some embodiments, it may be that the recognition capability of the machine learning model of the image capturing apparatus is due to the recognition capability of the machine learning model of the gimbal. Based on this, in the case where the transmission data from the image capturing apparatus to the gimbal side is reduced and the recognition capability of the image capturing apparatus is due to the recognition capability of the gimbal, if the gimbal needs to perform a following operation, it is necessary that the motor in the gimbal can be rotated accordingly to achieve a following operation by adjusting the position of the image capturing apparatus, then it can be seen that the data transmission time 1 from the image capturing apparatus to the controller of the gimbal is correspondingly. The data transfer time 1 from the image capturing apparatus to the controller of the gimbal is shortened accordingly, and the data transfer time 2 from the controller of the gimbal to the motor of the gimbal is also shortened accordingly because there is no need to wait for the identification of the capturing apparatus on the side of the gimbal, thus reducing the data transfer time at both nodes and reducing the time delay of the gimbal to realize the function of following operation.

In some embodiments, the gimbal can correspond to different motion states when following the target object, for example, the gimbal can be in uniform motion, uniform acceleration motion, uniform deceleration motion, etc. In order to ensure the quality and efficiency of the following operation of the target object, the different motion states of the gimbal can correspond to different control strategies. Specifically, the control of the gimbal according to the control parameters can include: obtaining the motion state of the gimbal corresponding to the target object; controlling the gimbal based on the motion state of the gimbal and the control parameters.

In some embodiments, the motion state of the gimbal may be determined based on the motion state of the target object, for example, the gimbal may be in uniform motion if the target object is in uniform motion; the gimbal may be in uniform acceleration if the target object is in uniform acceleration; and the gimbal may be in uniform deceleration if the target object is in uniform deceleration.

In some embodiments, the motion state of the gimbal is related to the following duration, e.g., it may be uniformly accelerated when initially following, and it may also be related to the following state, e.g., it may be uniformly accelerated when the following target is lost.

Among them, when following the target object using the gimbal, the motion state of the gimbal corresponding to the target object can be obtained. Specifically, this embodiment does not limit the specific way to obtain the motion state of the gimbal corresponding to the target object, and the technical person in the field can set it according to the specific application needs and design needs, for example: obtaining multiple frames of captured images by the image capturing apparatus, analyzing and processing the multiple frames of captured images to determine the movement speed corresponding to the gimbal, determining the motion state of the gimbal corresponding to the target object based on the movement speed. The motion state of the gimbal corresponding to the target object is determined based on the motion speed, and the motion state of the gimbal may include one of the following: uniform acceleration motion, uniform deceleration motion, uniform speed motion, etc. Alternatively, an inertial measurement unit may be provided on the gimbal, and the motion state of the gimbal corresponding to the target object is obtained by the inertial measurement unit, etc. After the motion state of the gimbal is obtained, the gimbal can be controlled based on the motion state of the gimbal and the control parameters to achieve the following operation of the target object, thus effectively improving the quality and efficiency of the following operation of the target object.

The control method of the gimbal provided in this embodiment, by acquiring the capturing position of the target object in the captured image, and then determining the control parameters for the following operation of the target object based on the capturing position, and controlling the gimbal according to the control parameters, can realize the following operation of the target object. Among them, since the capturing position is determined by the image capturing apparatus, and the gimbal can acquire the capturing position directly through the image capturing apparatus, this effectively reduces the delay time corresponding to the capturing position acquired by the gimbal through the image capturing apparatus, thus solving the problem of poor following effect caused by the relatively large delay time, further ensuring the quality and effect of the following operation on the target object, and effectively The stability and reliability of the method are improved.

Figure 19:
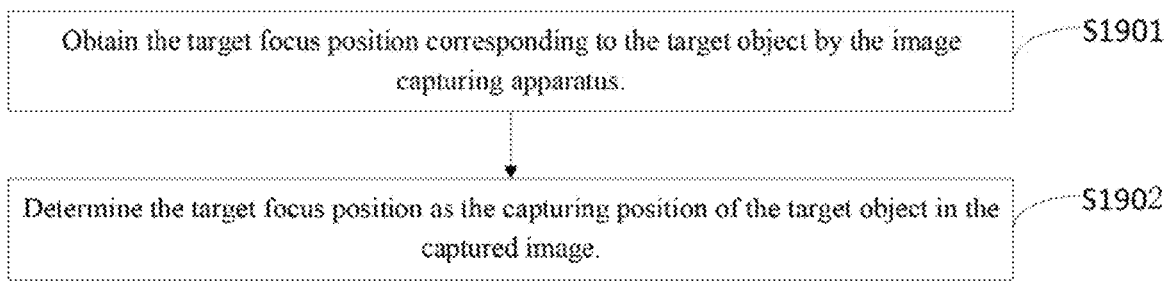
FIG. 19 is a schematic diagram of a process for obtaining the capturing position of a target object in a capturing image provided by an embodiment of the present disclosure.

FIG. 19 is a schematic diagram of a process for obtaining the capturing position of a target object in an capturing image provided by an embodiment of the present disclosure; based on the above embodiment, and with continued reference to the accompanying FIG. 19, this embodiment provides an implementation of obtaining the capturing position of a target object in an captured image, specifically, obtaining the capturing position of a target object in an captured image in this embodiment may include.

Step S1901: Obtain the target focus position corresponding to the target object by the image capturing apparatus.

Step S1902: Determine the target focus position as the capturing position of the target object in the captured image.

In the related art, when following operation is performed by a gimbal or drone equipped with an image capturing apparatus, the focusing operation of the image capturing apparatus and the following operation of the gimbal or drone are two completely independent operations. The quality and effect of the following operation cannot be guaranteed.

Among them, it can be understood that when using the UAV for following operation, there can be an image capturing apparatus mounted on the UAV through the gimbal, then the control parameters of the UAV and/or the gimbal can be adjusted to achieve the following operation.

Therefore, in order to avoid the above-mentioned problem of not being able to adjust the following object of the gimbal or the drone in a timely manner based on the change of the focusing object when the focusing object corresponding to the image capturing apparatus changes, this embodiment provides a technical solution in which the focusing operation of the image capturing apparatus and the following operation of the gimbal or the drone are associated operations. Specifically, for the field of camera technology, in the capturing of the capturing position of the target object in the captured image through the image capturing apparatus, and the focus point of the image capturing apparatus for the target object is different from the capturing position, so that when the gimbal is controlled to follow the target object based on the capturing position, it is easy to make the target object obtained through the image capturing apparatus appear defocused. Therefore, in order to avoid the defocusing of the target object for the following operation, when obtaining the capturing position of the target object in the captured image, the target focus position corresponding to the target object can be obtained through the image capturing apparatus, and it is understood that the above target focus position can be the focus position selected by the user or the focus position automatically identified.

After obtaining the target focus position corresponding to the target object, the target focus position can be directly determined as the capturing position of the target object in the capturing image, so that the focus position corresponding to the target object is consistent with the capturing position of the target object in the captured image, which effectively avoids the situation of defocusing the target object.

In other examples, after obtaining the target focus position corresponding to the target object, determining the target focus position as the capturing position of the target object in the captured image may include: obtaining a predetermined area range corresponding to the target focus position, and determining the predetermined area range directly as the capturing position of the target object in the captured image with the target object. Among them, the preset area range corresponding to the target focus position may be at least a part of the coverage area corresponding to the target object in the captured image, and includes the target focus position, at which time the focus position corresponding to the target object is substantially the same as the capturing position of the target object in the captured image, so that the defocusing of the target object can also be avoided.

In this embodiment, the target focus position corresponding to the target object is obtained by the image capturing apparatus, and then the target focus position is determined as the capturing position of the target object in the captured image, thus effectively realizing that the focus position corresponding to the target object and the capturing position of the target object in the captured image are basically the same, and thus the defocusing of the target object can be effectively avoided, further improving the quality and effect of the following operation on the target object.

From the above analysis, it can be seen that in the related technology, the focusing and following operations regarding the target object are two independent operations, i.e., on the image capturing apparatus side, the focusing can be performed based on the analysis of the capturing image to get the target focusing position of the target object, and on the gimbal side, the following can be performed based on the analysis of the capturing image to get the real-time position deviation of the target object. In other words, the controller of the image capturing apparatus and the controller of the gimbal side perform image analysis processing separately, which not only increases the consumption of computational resources, but also may lead to the problem of jumping points due to inconsistency in image analysis processing. However, in the present application, since the target focus position is used to realize the following operation, the image analysis processing capability of the image capturing apparatus is reused and the jump point problem is solved.

Figure 20:
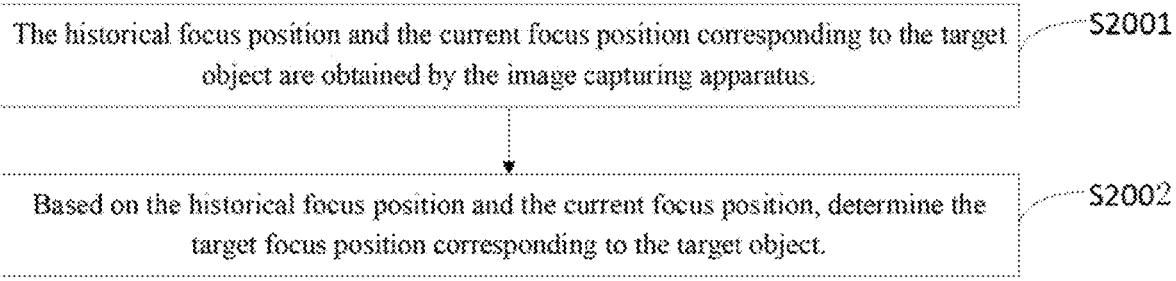
FIG. 20 is a schematic diagram of a process for obtaining a target focus position corresponding to said target object through an image capturing apparatus provided by an embodiment of the present disclosure.

FIG. 20 is a schematic diagram of the process of acquiring a target focus position corresponding to a target object through an image capturing apparatus provided by an embodiment of the present disclosure; on the basis of the above embodiment, and with continued reference to the accompanying FIG. 20, the present embodiment provides an implementation of acquiring a target focus position, specifically, the acquiring of a target focus position corresponding to a target object through an image capturing apparatus in the present embodiment may include:

Step S2001: The historical focus position and the current focus position corresponding to the target object are obtained by the image capturing apparatus.

Step S2002: Based on the historical focus position and the current focus position, determine the target focus position corresponding to the target object.

Among them, when using the image capturing apparatus for image capturing operation of the target object, because the target object may be in a moving state, for example, the target object is in a uniform speed moving state, uniform acceleration moving state, uniform deceleration moving state, etc., and the different moving states of the target object may easily make the focus position corresponding to the image capturing operation change. In this case, in order to ensure the accuracy and reliability of obtaining the target focus position corresponding to the target object, the historical focus position and the current focus position corresponding to the target object can be obtained by the image capturing apparatus, and it is understood that the historical focus position refers to the focus position corresponding to the historical image frame obtained by the image capturing apparatus, and the current focus position refers to the focus position corresponding to the current image frame obtained by the image capturing apparatus. The current focus position is the focus position corresponding to the current image frame obtained by the image capturing apparatus.

After the historical focus position and the current focus position are obtained, then the historical focus position and the current focus position can be analyzed and processed to determine the target focus position corresponding to the target object. In some examples, determining a target focus position corresponding to the target object based on the historical focus position and the current focus position may include: determining a historical object site corresponding to the historical focus position and a current object site corresponding to the current focus position; and determining a target focus position corresponding to the target object based on the historical object site and the current object site.

When a plurality of frames corresponding to the target object are acquired by the image capturing apparatus, a plurality of focus positions (including the historical focus position and the current focus position) corresponding to the plurality of frames can be determined, and the plurality of focus positions corresponding to the plurality of frames can be the same or different. After the above multiple focus positions are obtained, the historical image corresponding to the historical focus position and the current image corresponding to the current focus position can be determined, and then the historical image can be analyzed and processed based on the historical focus position to determine the historical object part corresponding to the historical focus position. Specifically, the historical image can be analyzed and processed using the predetermined image recognition algorithm to determine the target object outline and the target object type located in the historical image, and then the correspondence between the historical focus position and the target object outline and the target object type located in the historical image can be determined, so as to determine the historical object part corresponding to the historical focus position. Similarly, the current image can also be analyzed and processed based on the current focus position to determine the current object part corresponding to the current focus position. After obtaining the historical object part and the current object part, the historical object part and the current object part can be analyzed to determine the target focus position corresponding to the target object.

Specifically, after the image capturing apparatus acquires the captured image, an image recognition algorithm or a pre-trained machine learning model can be used to analyze the captured image to identify at least one object included in the captured image and the area where the object is located. After a plurality of focus positions are acquired, the focus positions can be determined and compared with the area where the object is located, and when several focus positions are part of the area where an object is located, it can be determined that several of the above focus positions correspond to the same object. When several focus positions are part of the area where different objects are located, it can be determined that several focus positions correspond to different objects. In determining that certain focus positions correspond to the same object, it is possible to determine the distance information between any two focus positions mentioned above, and when the distance information is less than or equal to a preset threshold, it is possible to determine that the two focus positions mentioned above correspond to the same part of the same object, and when the distance information is greater than the preset threshold, it is possible to determine that the two focus positions mentioned above correspond to different parts of the same object.

Of course, the person skilled in the art can also use other ways to determine whether certain focus positions correspond to the same target object, and to determine whether certain focus positions correspond to the same part of the same target object, which will not be repeated here.

After obtaining the historical focus position and the current focus position, it can be determined whether the historical focus position and the current focus position correspond to the same target object, and when the historical focus position and the current focus position correspond to the same target object, it can be determined whether the historical focus position and the current focus position correspond to the same part of the same object. After the above information is determined, then the above information can be transmitted to the gimbal, so that the gimbal can carry out the following control operation based on the above information, and thus ensure the quality and effect of the intelligent following operation.

It can be understood that there can be a corresponding mapping relationship between the focus position and the focus object, and the focus part of the focus object, and the respective attribute information, which can have a corresponding identification, and the mapping relationship and the attribute information can be sent to the gimbal via the image capturing apparatus, so that the gimbal can make a corresponding judgment based on the information, and make a corresponding execution strategy.

In some examples, determining the target focus position corresponding to the target object based on the historical object part and the current object part may include: obtaining the relative position information between the historical object part and the current object part when the historical object part and the current object part are different parts of the same target object; adjusting the current focus position based on the relative position information to obtain the target focus position corresponding to the target object. The target focus position is adjusted based on the relative position information to obtain the target focus position corresponding to the target object.

After obtaining the history object part and the current object part, the history object part and the current object part can be analyzed and processed, and if the history object part and the current object part are different parts of the same target object, it means that the history image and the current image are following different parts of the same target object, for example, the history object part in the history image frame is the eye of person A, and the current object part in the current image frame is the shoulder of person A. For example, the historical object in the history image frame is the eye of person A, while the current object in the current image frame is the shoulder of person A. In this case, in order to avoid jitter due to the change of the focus position, the relative position information between the historical object part and the current object part can be obtained, for example, the relative position information between the eyes of Person A and the shoulders of Person A. After obtaining the relative position information, the current focus position can be adjusted based on the relative position information to obtain the target focus position corresponding to the target object. position.

Optionally, adjusting the current focus position based on the relative position information to obtain a target focus position corresponding to the target object may include: adjusting the current focus position based on the relative position information to obtain a target focus position corresponding to the target object when the relative position information is greater than or equal to a predetermined threshold; determining the current focus position as a target focus position corresponding to the target object when the relative position information is less than the predetermined threshold; and determining the current focus position as a target focus position corresponding to the target object when the relative position information is less than the predetermined threshold. If the relative position information is smaller than the preset threshold, the current focus position is determined as the target focus position corresponding to the target object.

After obtaining the relative position information, the relative position information can be analyzed and compared with the preset threshold, and if the relative position information is greater than or equal to the preset threshold, it means that when the image capturing apparatus is used to focus on a target object, the focus part for the same target object is different at different times, and then the current focus position can be adjusted based on the relative position information to obtain the target focus position corresponding to the target object. The target focus position can be adjusted based on the relative position information to obtain the target focus position corresponding to the target object. If the relative position information is less than a preset threshold, it means that the focus area for a target object is basically the same at different times when the image capturing apparatus is used to focus on a target object, and the current focus position can be determined as the target focus position corresponding to the target object.

For example, when the image capturing operation is performed on a person by the image capturing apparatus, at least two frames can be acquired, and after at least two frames are acquired, the historical focus position and the current focus position corresponding to the at least two frames can be determined, and the corresponding historical object part can be determined based on the historical focus position, and the corresponding current object part can be determined based on the current focus position.

Figure 21:
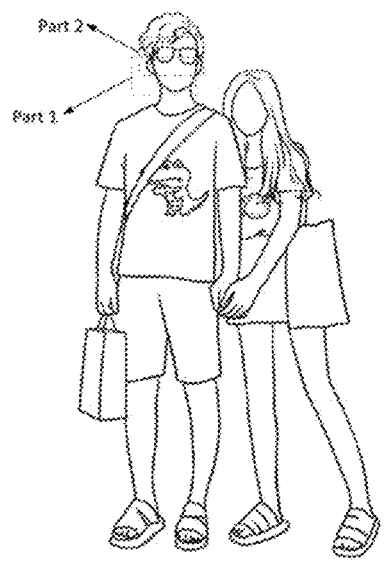
FIG. 21 is a schematic diagram I of a historical object site corresponding to said historical focus position and a current object site corresponding to said current focus position, as provided by embodiments of the present disclosure.

Then, the historical object part and the current object part can be analyzed and processed to determine the target focus position corresponding to the target object. Referring to the attached FIG. 21, when the historical object part is part 1 and the current object part is part 2, the relative position information d1 between part 1 and part 2 can be obtained, and then the relative position information d1 can be analyzed and compared with the preset threshold value, and when the relative position information d1 is less than the preset threshold value, it means that the focus position occurs to a smaller extent when the image capturing apparatus is used to perform the focus operation on the above-mentioned person change, and thus the current focusing position can be determined as the target focusing position corresponding to the target object.

Figure 22:
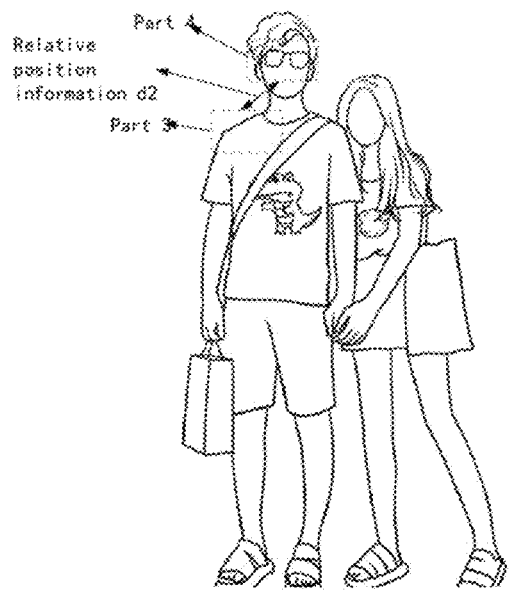
FIG. 22 is a schematic diagram II of a historical object site corresponding to said historical focus position and a current object site corresponding to said current focus position, as provided by embodiments of the present disclosure.

In some other examples, referring to the attached FIG. 22, when the historical object part is part 3 and the current object part is part 4, the relative position information d2 between part 3 and part 4 can be obtained, and then the relative position information d2 is analyzed and compared with a preset threshold, and when the relative position information d2 is greater than the preset threshold, it indicates that during the focusing operation of the above-mentioned person using the image capturing apparatus, the focus position changes significantly, and then the current focus position can be adjusted based on the relative position information to obtain the target focus position corresponding to the target object, i.e., when the target object to be followed has not changed but only the focus position has changed, then the current focus position can be automatically adjusted based on the relative position relationship between various parts in the target object, so that the image can effectively avoid This can effectively prevent the image from jumping.

In some further examples, after obtaining the historical object part and the current object part, the historical object part and the current object part can be analyzed and processed to determine the target focus position corresponding to the target object. Specifically, according to the historical object part and the current object part, determining the target focus position corresponding to the target object may include: updating the composition position based on the current focus position to obtain a first updated composition position when the historical object part and the current object part are different parts of the same target object; and performing a follow operation on the target object based on the first updated composition position.

After obtaining the history object part and the current object part, it can identify whether the history object part and the current object part are different parts of the same target object, and when it is determined that the history object part and the current object part are different parts of the same target object, as shown in FIG. 8, the composition position can be updated based on the current focus position to obtain the first updated composition position. For example, if the preset target composition position is the center of the screen, the preset composition position can be updated based on the current focus position in order to avoid shaking of the image due to the change of the target object, i.e., the current focus position can be determined as the first updated composition position. After obtaining the first updated composition position, the target object can be followed based on the first updated composition position, thus ensuring the quality and efficiency of the target object following operation.

In this embodiment, the historical focus position and the current focus position corresponding to the target object are obtained by the image capturing apparatus, and then the target focus position corresponding to the target object is determined based on the historical focus position and the current focus position, thus effectively ensuring the accuracy and reliability of determining the target focus position, and then facilitating the operation of following the target object based on the target focus position, further improving the practicality of the method. The practicality of the method is further improved.

Figure 23:
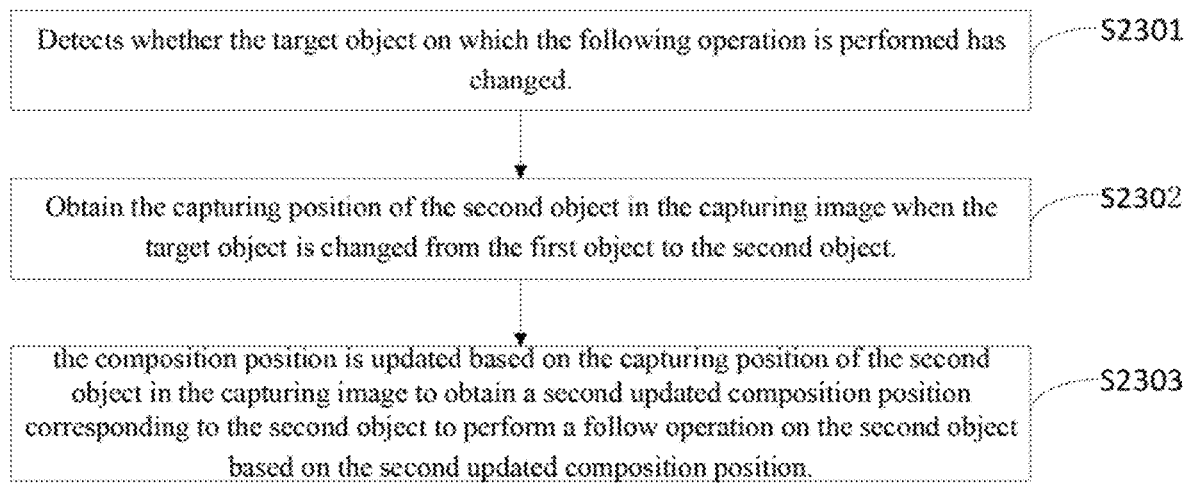
FIG. 23 is a flow diagram of another method of controlling a gimbal provided by an embodiment of the present disclosure.

FIG. 23 is a schematic diagram of the flow of another method of controlling a gimbal provided by an embodiment of the present disclosure; on the basis of the above embodiment, and with continued reference to FIG. 23, the method in this embodiment may further include:

Step S2301: Detects whether the target object on which the following operation is performed has changed.

Step S2302: Obtain the capturing position of the second object in the capturing image when the target object is changed from the first object to the second object.

Step S2303: the composition position is updated based on the capturing position of the second object in the capturing image to obtain a second updated composition position corresponding to the second object to perform a follow operation on the second object based on the second updated composition position.

When following the target object through the image capturing apparatus, in order to avoid the jitter of the gimbal due to the change of the target object of the following operation, it is possible to detect whether the target object of the following operation is changed in real time. Specifically, the historical focus position and the current focus position can be obtained, and the historical target object corresponding to the historical focus position and the current target object corresponding to the current focus position can be identified, and whether the historical target object and the current target object are changed.

Figure 24:
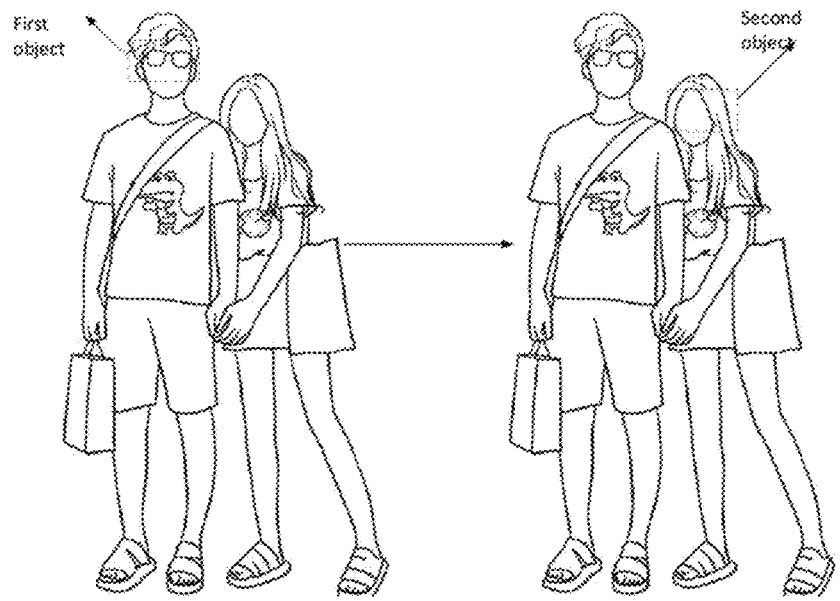
FIG. 24 shows a schematic diagram of a change in the target object provided by an embodiment of the present disclosure.

When the historical target object and the current target object are the same target object, it can be determined that the target object for the following operation has not changed, as shown in FIG. 22; when the historical target object and the current target object are different target objects, as shown in FIG. 24, that is, the target object is changed from the first object to the second object, and then it can be determined that the target object for the following operation has changed. At this time, in order to ensure the quality and effect of the following operation on the second object, the capturing position of the second object in the captured image can be obtained, and then the composition position can be updated based on the capturing position of the second object in the captured image to obtain the second updated composition position corresponding to the second object. Specifically, the capturing position of the second object in the captured image can be determined as a second updated composition position corresponding to the second object, and then the second object can be followed based on the second updated composition position, which can effectively avoid image jitter due to the change of the target object and further improve the quality and efficiency of the control of the gimbal.

FIG. 25 is a schematic diagram of a process for calculating a current position prediction value corresponding to an capturing position provided by an embodiment of the present disclosure; based on the above embodiment, and with continued reference to the accompanying FIG. 25, this embodiment provides an implementation of calculating a current position prediction value corresponding to an capturing position, specifically, calculating a current position prediction value corresponding to an capturing position in this embodiment may include:

Step S2501: Determine the delay time corresponding to the capturing position, the delay time is used to indicate the length of time required for the gimbal to acquire the capturing position via the image capturing apparatus.

Wherein, when the gimbal acquires the capturing position directly through the image capturing apparatus, there is a certain delay time due to the data transmission. Therefore, in order to achieve accurate and reliable capturing of the current position prediction corresponding to the capturing position, a delay time corresponding to the capturing position may be determined, which is used to indicate the length of time information required for the gimbal to acquire the capturing position via the image capturing apparatus. In some examples, determining the delay time corresponding to the capturing position may include: acquiring an exposure time corresponding to the capturing image; determining a current receive time corresponding to the capturing position when the gimbal acquires the capturing position; and determining the time interval between the current receive time and the exposure time as the delay time corresponding to the capturing position.

Optionally, during the image capturing operation using the image capturing apparatus, the exposure time corresponding to the acquired image can be recorded $t_n$. The recorded exposure time corresponding to the captured image to can be stored in a preset area so that the gimbal can obtain the exposure time corresponding to the captured image through the image capturing apparatus. $t_n$. Further, when the image capturing apparatus transmits the capturing position of the target object in the capturing image to the gimbal, the current reception time corresponding to the capturing position can be determined when the gimbal acquires the capturing position $t_{n+1}$. After acquiring the current reception time $t_{n+1}$ and the exposure time to then the time interval between the current receive time and the exposure time is determined as the delay time corresponding to the capturing position, i.e. $\Delta t = t_{n+1} - t_n$.

Step S2502: Based on the delay time and the capturing position, the current position prediction value corresponding to the capturing position is determined.

After the delay time and capturing position are acquired, the delay time and capturing position can then be analyzed and processed to determine a current position prediction value corresponding to the capturing position. In some examples, determining the current position prediction value corresponding to the capturing position based on the delay time and the capturing position may include: determining the previous reception time corresponding to the previous capturing position when the gimbal acquires the target object at the previous capturing position of the previous capturing image; determining the previous position prediction value corresponding to the previous capturing position; and calculating the current position prediction value corresponding to the capturing position based on the capturing position, the exposure time, the delay time, the previous reception time and previous position prediction value.

When the image capturing apparatus acquires a plurality of frames, a plurality of capturing positions corresponding to the target object in the plurality of frames can be determined, and when the plurality of capturing positions are transmitted to the gimbal, the gimbal can acquire a plurality of capturing positions, and the plurality of capturing positions can include: a previous capturing position and a current capturing position. When the gimbal acquires the previous capturing position, it can determine the previous reception time corresponding to the previous capturing position, and it can also determine the previous position prediction value corresponding to the previous capturing position, wherein the specific implementation of the previous position prediction value is similar to the specific implementation of the current position prediction value in the above-mentioned embodiment, which can be referred to the above-mentioned statement, and herein the specific implementation of determining the previous position prediction value is similar to the specific implementation of determining the current position prediction value in the above embodiment.

After the capturing position, exposure time, delay time, previous receive time, and previous position prediction values are acquired, the capturing position, exposure time, delay time, previous receive time, and previous position prediction values can then be analyzed and processed to calculate a current position prediction value corresponding to the capturing position. In some examples, calculating the current position prediction value corresponding to the capturing position based on the capturing position, the exposure time, the delay time, the previous receive time, and the previous position prediction value may include: determining a position adjustment value corresponding to the capturing position based on the capturing position, the exposure time, the delay time, the previous receive time, and the previous position prediction value; determining the sum of the position adjustment value and the capturing position as the current position prediction value corresponding to the capturing position.

wherein, after obtaining the capturing position, exposure time, delay time, previous reception time and previous position prediction value, then the capturing position, exposure time, delay time, previous reception time and previous position prediction value can be analyzed and processed to determine the position adjustment value corresponding to the capturing position $\Delta x$. After obtaining the position adjustment value $\Delta x$, the sum of the position adjustment value and the capturing position can be determined as the current position prediction value corresponding to the capturing position $\hat{x}_{n+1} = x_n + \Delta x$. The accuracy and reliability of determining the current position prediction value corresponding to the capturing position can be effectively improved.

In this embodiment, by determining the delay time corresponding to the capturing position, and then determining the current position prediction value corresponding to the capturing position based on the delay time and the capturing position, the current position prediction value effectively ensures the accuracy and reliability of the determination of the current position prediction value because the current position prediction value takes into account the delay time corresponding to the capturing position; furthermore, when using different image capturing apparatus and/or different. In addition, when using different image capturing apparatus and/or different transmission interfaces to transmit the capturing position, the delay time corresponding to the above-mentioned different image capturing apparatuses and/or different transmission interfaces can be obtained, thus effectively solving the problem of different lengths of the corresponding delay times when different image capturing apparatuses and/or different transmission interfaces are used for data transmission in the related art, realizing the normalization process of the algorithm, and further improving the quality and efficiency of the target object.

FIG. 26 shows a schematic diagram of a process for determining a position adjustment value corresponding to an capturing position based on an capturing position, an exposure time, a delay time, a previous reception time and a previous position prediction value provided by an embodiment of the present disclosure; on the basis of the above embodiment, with continued reference to the attached FIG. 26, in the process of calculating a current position prediction value corresponding to an capturing position, in order to improve the calculation of the current position prediction value accuracy, this embodiment provides an implementation of determining the position adjustment value corresponding to the capturing position, specifically, the determination of the position adjustment value corresponding to the capturing position based on the capturing position, the exposure time, the delay time, the previous reception time, and the previous position prediction value in this embodiment may include.

Step S2601: Based on the capturing position, the previous position prediction, the exposure time and the previous reception time, the movement speed corresponding to the target object is determined.

Therein, after obtaining the capturing position, the previous position prediction, the exposure time and the previous reception time, the capturing position, the previous position prediction, the exposure time and the previous reception time can be analyzed and processed to determine the movement speed corresponding to the target object. Specifically, based on the capturing position, the previous position prediction value, the exposure time and the previous reception time, determining the moving speed corresponding to the target object may include: obtaining the position difference value between the capturing position and the previous position prediction value and the time difference value between the exposure time and the previous reception time; and determining the ratio between the position difference value and the time difference value as the moving speed corresponding to the target object.

With the capturing position as $x_n$ and the predicted value of the previous position is $\hat{x}_{n-1}$, the exposure time is $t_n$, the previous reception time $t_{n-1}$. For example, after obtaining the capturing position $x_n$, the previous position prediction $\hat{x}_{n-1}$, exposure time $t_n$ and the previous receive time $t_{n-1}$, the position difference between the capturing position and the previous position prediction $(x_n-\hat{x}_{n-1})$ and the time difference between the exposure time and the previous reception time $(t_n-t_{n-1})$, the ratio between the position difference and the time difference can be determined as the moving speed corresponding to the target object, i.e. $v_n=(x_n-\hat{x}_{n-1})/(t_n-t_{n-1})$.

Step S2602: The product value between the movement speed and the delay time is determined as the position adjustment value corresponding to the capturing position.

After obtaining the travel speed and delay time, then the product value between the travel speed and the delay time can be obtained, and the above product value is determined as the position adjustment value corresponding to the capturing position, i.e. the position adjustment value $$\Delta x = \frac{x_n - \hat{x}_{n-1}}{t_n - t_{n-1}} \Delta t.$$

In this embodiment, the movement speed corresponding to the target object is determined based on the capturing position, the previous position prediction value, the exposure time and the previous reception time, and the product of the movement speed and the delay time is determined as the position adjustment value corresponding to the capturing position, thus effectively ensuring the accuracy and reliability of the determination of the position adjustment value and further improving the accuracy of calculating the current position prediction value corresponding to the capturing position based on the position adjustment value. The accuracy of the current position prediction value corresponding to the capturing position is further improved.

FIG. 27 shows a schematic diagram I of the process of determining control parameters for performing a follow operation on a target object based on the current position prediction value provided by an embodiment of the present disclosure; based on the above embodiment, and with continued reference to the attached FIG. 27, the present embodiment provides a way of implementing the determination of control parameters for performing a follow operation on a target object, specifically, based on the current position prediction value in the present embodiment, the determination of control parameters for performing the following operation on the target object may include:

Step S2701: Determine the position deviation between the current position prediction value and the target composition position.

Step S2702: Based on the position deviation, determine the control parameters used to perform the following operation on the target object.

Wherein, when the target object is followed, the composition position is pre-configured, and the composition position is the position where the target object is expected to be continuously located in the image during the following operation of the target object, and in general, the composition position can be the center of the image, so that the target object is continuously located in the center of the image, which can ensure the quality and effect of the following operation on the target object.

After obtaining the current position prediction, the position deviation between the current position prediction and the composition position can be determined, and the position deviation can be analyzed to determine the control parameters for following the target object. In some examples, determining the control parameters for following the target object based on the position deviation may include: obtaining a screen field of view corresponding to the acquired image; and determining the control parameters for following the target object based on the screen field of view and the position deviation.

Optionally, obtaining the screen field of view corresponding to the captured image by the image capturing apparatus may include: obtaining the focal length information corresponding to the captured image by the image capturing apparatus; and determining the screen field of view corresponding to the captured image based on the focal length information. After obtaining the screen field of view corresponding to the capturing image, the screen field of view and the position deviation can be analyzed and processed to determine the control parameters for the following operation of the target object.

In some examples, the size of the control parameter is negatively related to the size of the screen field of view, i.e., as the screen field of view increases, the size of the target object located in the image becomes smaller, and the control parameter (e.g., the rotation speed of the gimbal) can decrease as the screen field of view increases. When the field of view decreases, the size of the target object located in the image becomes larger, and the control parameters (e.g., rotation speed of the gimbal) can be increased as the field of view decreases.

In other examples, determining the control parameters for following the target object based on the position deviation may include: obtaining the gimbal attitude corresponding to the capturing position through the inertial measurement unit IMU installed on the gimbal; converting the position deviation to the geodetic coordinate system based on the gimbal attitude and the screen field of view to obtain the control parameters for following the target object, thus achieving accurate and reliable determination of the control parameters.

In this embodiment, by determining the position deviation between the current position prediction value and the composition position, and then determining the control parameters for following the target object based on the position deviation, this not only effectively ensures the accuracy and reliability of the determination of the control parameters, but also further improves the practicality of the method.

FIG. 28 shows a schematic diagram II of the process for determining control parameters for performing a follow operation on a target object based on the current position prediction value provided by an embodiment of the present disclosure; based on the above embodiment, and with continued reference to the attached FIG. 28, this embodiment provides another implementation of determining control parameters for performing a follow operation on a target object, specifically, based on the current position prediction value, in this embodiment, determining the control parameters for performing the following operation on the target object may include:

Step S2801: Get the following mode corresponding to the gimbal, the following mode includes any one of the following: single-axis following mode, two-axis following mode, full following mode.

Step S2802: Based on the current position prediction value and the following mode, determine the control parameters used to perform the following operation on the target object.

There can be different following models corresponding to the gimbal when it performs following operation against the target object. Specifically, the following models corresponding to the gimbal can include one of the following: single-axis following mode, two-axis following mode, full following mode. It can be understood that the control mode of the gimbal can be adjusted by the skilled person in the field based on different application scenarios and application needs, which will not be repeated here.

For example, when the following mode of the gimbal is single axis following mode, the control parameters can correspond to a single axis of the gimbal, for example, the yaw axis can be controlled to move based on the target attitude. When the following mode of the gimbal is two-axis following mode, the control parameters can correspond to two axes of the gimbal, for example: you can control the movement of yaw and pitch axes based on the target attitude. When the following mode of the gimbal is 3-axis following mode, the control parameters can correspond to three axes of the gimbal, for example, the yaw, pitch and roll axes can be controlled based on the target attitude.

Based on the above statement, since the gimbal can correspond to different following modes, and different following modes can correspond to different control parameters, in order to improve the accuracy and reliability of determining the control parameters, after obtaining the following modes, the current position prediction and the following modes can be analyzed to determine the control parameters for following the target object. In some examples, determining the control parameters for following the target object based on the current position prediction and the following pattern may include: determining alternative control parameters for following the target object based on the current position prediction; and, among the alternative control parameters, determining the target control parameters corresponding to the following pattern.

Wherein, after the current position prediction is obtained, the alternative control parameters for following the target object can be determined based on the correspondence between the current position prediction and the control parameters, it is understood that the number of alternative control parameters can be multiple, for example, when the gimbal is a three-axis gimbal, the alternative control parameters can include control parameters corresponding to the yaw, pitch and roll axes corresponding control parameters.

After the alternative control parameters are obtained, then a target control parameter corresponding to the following model may be determined among the alternative control parameters, wherein the target control parameter may be at least a portion of the alternative control parameters. Specifically, among the alternative control parameters, determining the target control parameters corresponding to the following model may include: when the following model is a single-axis following model, a control parameter of a single axis corresponding to the single-axis following model may be determined among the alternative control parameters and the other alternative control parameters are set to zero; when the following model is a dual-axis following model, the control parameters of the two axes corresponding to the two-axis following mode can be determined among the alternative control parameters, and the other alternative control parameters are set to zero; when the following mode is full following mode, the alternative control parameters are determined as the control parameters of the three axes corresponding to the full following mode.

In this implementation, by obtaining the following mode corresponding to the gimbal, and then determining the control parameters for following the target object based on the current position prediction value and the following mode, this not only achieves the accurate reliability of determining the control parameters corresponding to the gimbal with different following modes, but also effectively meets the needs of each application scenario, further improving the flexibility and reliability of using the method.

Figure 29:
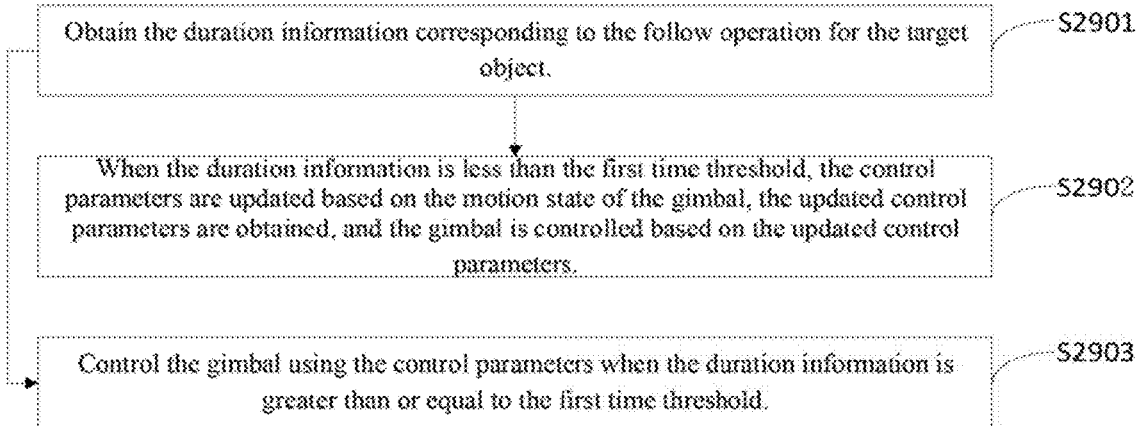
FIG. 29 is a schematic diagram of a process for controlling said gimbal based on the motion state of said gimbal and said control parameters provided by embodiments of the present disclosure.

FIG. 29 is a schematic diagram of a process for controlling the gimbal based on the motion state and control parameters of the gimbal provided by embodiments of the present disclosure; based on the above embodiments, and with continued reference to the accompanying FIG. 29, this embodiment provides a way of implementing control of the gimbal, specifically, the control of the gimbal based on the motion state and control parameters of the gimbal in this embodiment may include:

Step S2901: Obtain the duration information corresponding to the follow operation for the target object.

Among them, the control apparatus of the gimbal can be provided with a timer, which can be used for timing the information of the duration corresponding to the following operation of the target object, so that the information of the duration corresponding to the following operation of the target object can be obtained through the timer.

Step S2902: When the duration information is less than the first time threshold, the control parameters are updated based on the motion state of the gimbal, the updated control parameters are obtained, and the gimbal is controlled based on the updated control parameters.

Therefore, after obtaining the time duration information, the time duration information can be analyzed and compared with the preset first time threshold, and when the time duration information is less than the first time threshold, the control parameters can be updated based on the motion state of the gimbal. Thus, the updated control parameters can be obtained and the gimbal can be controlled based on the updated control parameters.

In some examples, the control parameters are updated based on the motion state of the gimbal, and obtaining the updated control parameters may include: determining an update coefficient corresponding to the control parameters based on the motion state of the gimbal, wherein the update coefficient is less than 1; and determining the value of the product of the update coefficient and the control parameters as the updated control parameters.

Optionally, determining the update coefficient corresponding to the control parameter based on the motion state of the gimbal may comprise: determining the update coefficient corresponding to said control parameter based on the ratio between said duration information and said first time threshold when the motion state of the gimbal is a first specific motion state (meaning that it starts following the target object), such as uniformly accelerated motion, at which point the update coefficient is less than 1. And then the value of the product of the update coefficient and the control parameter can be determined as the updated control parameter, i.e. at the time duration information t<first time threshold T time, then the updated control parameter can be determined based on the formula $$\widehat{E_n} = E_n * \frac{t}{T},$$

where $E_n$ is the control parameter, and the updated control parameter is $\widehat{E_n}$, where the starting moment of this duration information t is the moment when the following of the target object starts.

For example, when the gimbal starts following operation for a target object, when the gimbal gets the control parameter for following operation on the target object, in order to avoid the gimbal suddenly following operation on the target object, when the duration information is less than the first time threshold, the updated control parameter corresponding to the control parameter can be obtained, and the updated control parameter is the transition control parameter from 0 to the control parameter. The transition control parameter between 0 and the control parameter, i.e., when the duration information is less than the first time threshold, the gimbal is controlled based on the updated control parameter, thus realizing the slow start operation, i.e., the gimbal can be controlled to adjust to the control parameter slowly, and thus ensuring the quality and effect of the following operation on the target object.

In other examples, when the motion state of the gimbal is a second specific motion state (meaning that it starts to end following the target object), such as uniform deceleration motion, then an update factor corresponding to said control parameter is determined based on the ratio between said duration information and said first time threshold, where the update factor is less than 1. The value of the product of the update factor and the control parameter can then be determined as the updated control parameter, i.e. at the time when the duration information t<the first time threshold T time, then the updated control parameter can be determined based on the formula $$\widehat{E_n} = E_n * \left(1 - \frac{t}{T}\right),$$

where $E_n$ is the control parameter, and the updated control parameter is $\widehat{E_n}$, where the starting moment of this duration information t is the moment when the end following of the target object begins.

For example, when the gimbal starts to stop following operation for a target object, when the gimbal gets the control parameter for stopping following operation for the target object, in order to avoid the gimbal suddenly stopping following operation for the target object, when the duration information is less than the first time threshold, then the updated control parameter corresponding to the control parameter can be obtained, and the updated control parameter is the transition control parameter from the control parameter to 0, that is, when the duration information is less than the first time threshold, the gimbal is controlled based on the updated control parameter, so as to realize the slow stop operation, that is, the gimbal can be controlled to adjust to 0 slowly, and then ensure the quality and effect of the stop following operation on the target object.

Step S2903: Control the gimbal using the control parameters when the duration information is greater than or equal to the first time threshold.

wherein, when the comparison of the duration information and the first time threshold results in the duration information being greater than or equal to the first time threshold, the gimbal is directly controlled using the control parameters, i.e., when the duration information t≥first time threshold T at the time, the updated control parameters are the same as the control parameters $\widehat{E_n}=E_n$ and then the control parameter can be used to control the gimbal. Wherein, the starting moment of this time duration information t is the moment when the end following of the target object starts.

In other examples, the control parameter may be configured to 0 when the duration information is greater than or equal to a first time threshold, where the starting moment of the duration information t is the moment when the target object is determined to be lost.

In this embodiment, by obtaining the duration information corresponding to the time used to perform the following operation on the target object, when the duration information is less than the first time threshold, the control parameters are updated based on the motion state of the gimbal, the updated control parameters are obtained, and the gimbal is controlled based on the updated control parameters; when the duration information is greater than or equal to the first time threshold, the gimbal is controlled using the control parameters. Thus, the control operation of the gimbal using the slow start strategy is effectively realized, which further ensures the quality and efficiency of the following operation of the target object. Among them, the effect of using the slow stop strategy to control the gimbal is similar and will not be repeated here.

Figure 30:
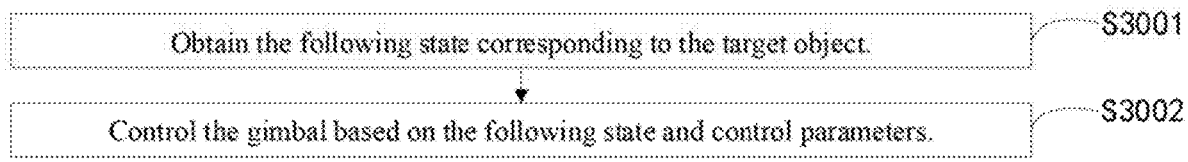
FIG. 30 is a schematic diagram I of a process provided by an embodiment of the present disclosure for controlling said gimbal according to said control parameters.

FIG. 30 is a schematic diagram I of a process for controlling a gimbal according to control parameters provided by an embodiment of the present disclosure; on the basis of any of the above embodiments, and with continued reference to the accompanying FIG. 30, this embodiment provides a way of implementing control of a gimbal according to control parameters, specifically, control of a gimbal according to control parameters in this embodiment may include:

Step S3001: Obtain the following state corresponding to the target object.

Among them, when following operation is performed on the target object, the target object may correspond to having different following states, and in some examples, the following states corresponding to the target object may include at least one of the following: keep following state, lost state. It can be understood that when the target object corresponds to having different following states, the gimbal can be controlled using different control parameters to ensure the safety and reliability of the control of the gimbal.

In addition, this embodiment does not limit the specific implementation of obtaining the following state corresponding to the target object, and the person skilled in the art can obtain the following state corresponding to the target object through the image capturing apparatus in some examples according to the specific application requirements and design needs. Specifically, when the target object is present in the image captured by the image capturing apparatus, the following state corresponding to the target object can be determined as the keep following state; when the target object is not present in the image captured by the image capture apparatus, the following state corresponding to the target object can be determined as the lost state.

In other examples, obtaining the following state corresponding to the target object may include: detecting whether the target object on which the following operation is performed has changed; in the event that the target object changes from a first object to a second object, it may likewise be determined that the first object is a lost state.

Step S3002: Control the gimbal based on the following state and control parameters.

After the following state and control parameters are obtained, the gimbal can be controlled based on the following state and control parameters. In some examples, controlling the gimbal based on the following state and the control parameters may include: obtaining the lost duration information corresponding to the following operation of the target object when the target object is lost; updating the control parameters based on the lost duration information to obtain the updated control parameters; and controlling the gimbal based on the updated control parameters.

Wherein, when the target object is lost, the lost duration information corresponding to the process of following the target object can be obtained by the timer, and then the control parameters can be updated according to the lost duration information to obtain the updated control parameters. In some examples, updating the control parameter based on the lost duration information and obtaining the updated control parameter may include: updating the control parameter to zero when the lost duration information is greater than or equal to the second time threshold; obtaining a ratio between the lost duration information and the second time threshold when the lost duration information is less than the second time threshold, and determining the difference between 1 and the ratio as an update factor corresponding to the control parameter the updated coefficient, and the product value of the updated coefficient and the control parameter is determined as the updated control parameter.

Optionally, after obtaining the lost duration information, the lost duration information can be analyzed and compared with the second time threshold, and when the lost duration information is greater than or equal to the second time threshold, the target object followed is in the lost state for a longer time, and the control parameter can be updated to zero, i.e., when the lost duration information t≥the second time threshold T, then the control parameter $\widehat{E_n}=0$. If the lost duration information is less than the second time threshold, the followed target object is in the lost state for a shorter time, and then the ratio between the lost duration information and the second time threshold can be obtained, and the difference between 1 and the ratio can be determined as the update factor corresponding to the control parameter, and then the product of the update factor and the control parameter can be determined as the updated control parameter, i.e., at the lost duration information t length information t<at the second time threshold T, then the control parameter can be determined as $$\widehat{E_n} = E_n\left(1 - \frac{t}{T}\right).$$

In this embodiment, by obtaining the following state corresponding to the target object, and then controlling the gimbal based on the following state and the control parameters, the accurate and reliable control of the gimbal is effectively ensured.

Figure 31:
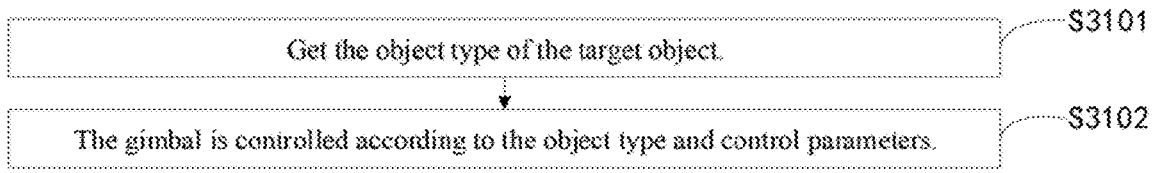
FIG. 31 is a schematic diagram II of the process provided by embodiments of the present disclosure for controlling said gimbal according to said control parameters.

FIG. 31 is a schematic diagram II of the process for controlling the gimbal according to control parameters provided by embodiments of the present disclosure; on the basis of any of the above embodiments, and with continued reference to the accompanying FIG. 31, this embodiment provides another way of implementing control of the gimbal, specifically, control of the gimbal according to control parameters in this embodiment may include.

Step S3101: Get the object type of the target object.
Step S3102: The gimbal is controlled according to the object type and control parameters.

Among them, when using the gimbal to follow the target object, the target object can correspond to different object types, the above-mentioned object types can include one of the following: stationary object, moving object with high height, moving object with low height, etc. And in order to be able to ensure the quality of following operation for different target objects, when following operation for different target objects, it is possible to control the gimbal according to the object type and control parameters for the gimbal. In some examples, the control of the gimbal according to the object type and control parameters can include: adjusting the control parameters according to the object type and obtaining the adjusted parameters; controlling the gimbal based on the adjusted parameters.

Optionally, the control parameters are adjusted according to the object type, and the adjusted parameters may include: when the target object is a stationary object, the control bandwidth corresponding to the gimbal in the yaw direction and the control bandwidth corresponding to the gimbal in the pitch direction is reduced; when the target object is a moving object and the height of the moving object is greater than or equal to a height threshold, the control bandwidth corresponding to the gimbal in the yaw direction is increased and the control bandwidth corresponding to the gimbal in the pitch direction is reduce the control bandwidth corresponding to the gimbal in the pitch direction; when the target object is a moving object and the height of the moving object is less than the height threshold, the control bandwidth corresponding to the gimbal in the yaw direction and the control bandwidth corresponding to the gimbal in the pitch direction are increased.

For example, when the target object is a building, the control bandwidth of the gimbal in the yaw direction (yaw axis) and the control bandwidth of the gimbal in the pitch direction (pitch axis) can be reduced in order to ensure the quality and effectiveness of the following operation on the building, thus reducing the pan following performance and pitch following performance.

When the target object is a moving object and the height of the moving object is greater than or equal to the height threshold, for example, when the target object is a person, in order to ensure the quality and effect of following the person, the control bandwidth of the gimbal in the yaw direction (yaw axis direction) can be increased and the control bandwidth of the gimbal in the pitch direction (pitch axis direction) can be decreased, so that the control bandwidth of the gimbal in the yaw direction (yaw axis direction) can be increased and the control bandwidth of the gimbal in the pitch direction (pitch axis direction) can be decreased. The pan-following performance can be improved and the pitch-following performance can be reduced.

When the target object is a moving object and the height of the moving object is less than the height threshold, for example, when the target object is a pet, in order to ensure the quality and effect of the pet following operation, the control bandwidth of the gimbal in the yaw direction (yaw axis direction) and the control bandwidth of the gimbal in the pitch direction (pitch axis direction) can be increased, so that the pan following performance can be improved and pitch following performance.

In this embodiment, by obtaining the object type of the target object, and then controlling the gimbal according to the object type and control parameters, it effectively realizes that different following control operations can be performed for different types of target objects, thus ensuring the quality and effect of following operations on the target object.

Figure 32:
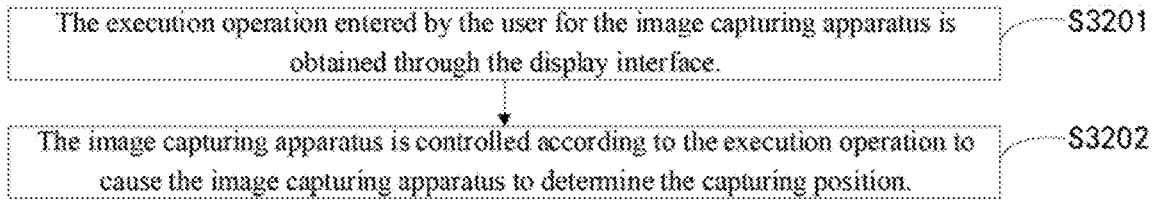
FIG. 32 is a flow diagram of a further method of controlling a gimbal provided by an embodiment of the present disclosure.

FIG. 32 is a schematic diagram of the flow of a further method of controlling a gimbal provided by an embodiment of the present disclosure; on the basis of any of the above embodiments, and with continued reference to FIG. 32, the method in this embodiment may further comprise:

Step S3201: The execution operation entered by the user for the image capturing apparatus is obtained through the display interface.

Step S3202: The image capturing apparatus is controlled according to the execution operation to cause the image capturing apparatus to determine the capturing position.

In particular, the display interface can be a display interface on a control apparatus of the gimbal (such as a remote control of the gimbal, a display apparatus connected to the gimbal such as a cell phone, a tablet, a wearable apparatus, etc., integrated in the handle of the gimbal), or the display interface can be a display interface on an image capturing apparatus. After obtaining the display interface, the display interface can be used to obtain the execution operations entered by the user for the image capturing apparatus (e.g., determining the target object by tapping, boxing, entering features, entering coordinates, etc.), and then the image capturing apparatus can be controlled according to the execution operations so that the image capturing apparatus can determine the capturing position of the target object in the acquired image based on the execution operations.

For example, when the display interface is the display interface on the control apparatus of the gimbal, the control apparatus of the gimbal can be provided with an application APP for controlling the image capturing apparatus, and the above APP can be launched by operating the control apparatus of the gimbal, and the display interface for controlling the image capturing apparatus can be displayed on the monitor. The user can obtain the execution operation inputted by the user for the image capturing apparatus through the display interface, and then the image capturing apparatus can be controlled according to the execution operation to make the image capturing apparatus determine the capturing position, so that the user can control the image capturing apparatus through the control apparatus of the gimbal.

For example, when the display interface is the display interface on the image capturing apparatus, the user can obtain the execution operation inputted by the user for the image capturing apparatus through the display interface, and then the image capturing apparatus can be controlled according to the execution operation to make the image capturing apparatus determine the capturing position, so that the user can control the image capturing apparatus through the image capturing apparatus.

In this embodiment, the display interface acquires the execution operation inputted by the user for the image capturing apparatus, and then controls the image capturing apparatus according to the execution operation to make the image capturing apparatus determine the capturing position, thus effectively realizing the control of the image capturing apparatus and further improving the quality and effect of the following operation for the target object.

Figure 33:
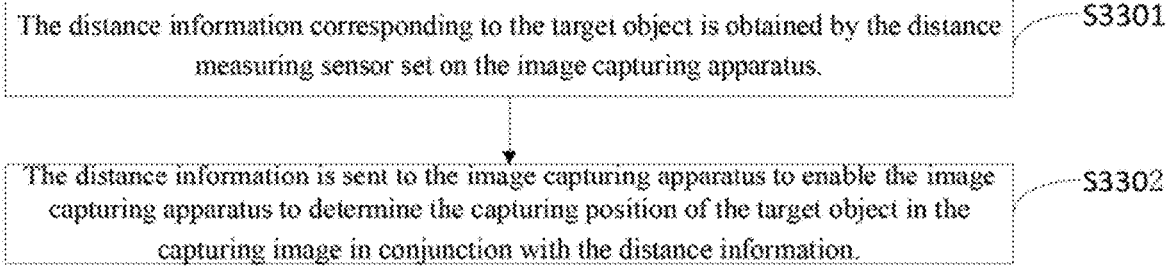
FIG. 33 is a flow diagram of another control method for a gimbal provided by an embodiment of the present disclosure.

FIG. 33 is a schematic flow diagram of another method of controlling a gimbal provided by an embodiment of the present disclosure; on the basis of any of the above embodiments, and with continued reference to FIG. 33, the method in this embodiment may further include:

Step S3301: The distance information corresponding to the target object is obtained by the distance measuring sensor set on the image capturing apparatus.

Step S3302: The distance information is sent to the image capturing apparatus to enable the image capturing apparatus to determine the capturing position of the target object in the capturing image in conjunction with the distance information.

Among them, when the image capturing apparatus obtains the capturing position of the target object in the captured image, in order to improve the accuracy of determining the capturing position of the target object in the captured image, a distance measuring sensor can be provided on the image capturing apparatus, and the distance measuring sensor can be communicatively connected to the image capturing apparatus through the gimbal, and in the specific application, the distance sensor set on the image capturing apparatus can be used to obtain the distance information. After the distance information is obtained by the image capturing apparatus, the distance information can be combined with the distance information to determine the capturing position of the target object in the capturing image, which effectively improves the accuracy and reliability of determining the capturing position of the target object in the captured image. In other words, the capturing position obtained by the image capturing apparatus from the distance information is fused or calibrated with the capturing position obtained based on image recognition.

Figure 34:
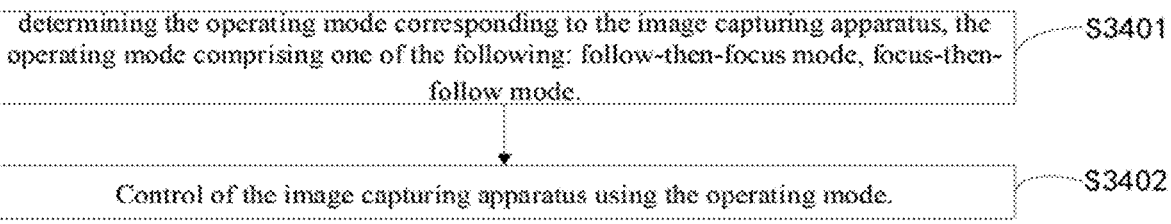
FIG. 34 is a flow diagram of a further method of controlling a gimbal provided by an embodiment of the present disclosure.

FIG. 34 is a flow diagram of yet another method of controlling a gimbal provided by an embodiment of the present disclosure; based on any of the above embodiments, and with continued reference to the accompanying FIG. 34, the method in this embodiment may further include:

Step S3401: determining the operating mode corresponding to the image capturing apparatus, the operating mode comprising one of the following: follow-then-focus mode, focus-then-follow mode.

Step S3402: Control of the image capturing apparatus using the operating mode.

Among them, when following operation is performed based on the image capturing apparatus, the image capturing apparatus may correspond to a different working model, which may include: follow first and then focus mode, focus first and then follow mode, and the above-mentioned follow first and then focus mode means that when the image capture apparatus needs to perform a follow operation and a focus operation, the image capture apparatus may prioritize a follow operation and then a focus operation. Focus first and then follow mode means that when the image capturing apparatus needs to perform the follow operation and the focus operation, the image capturing apparatus can perform the focus operation first and then the follow operation.

For example, when controlling the following operation of the gimbal and the image capturing apparatus, it is possible to obtain the capturing image by the image capturing apparatus, whether to perform the following operation based on the capturing image first or to perform the focusing operation on the target object in the capturing image first; when the operating mode of the image capturing apparatus is the following first and then the focusing mode, it is possible to perform the following operation based on the capturing image first and then to perform the focusing operation on the target object after the framing following operation. When the operating mode of the image capturing apparatus is follow-focus mode, the following operation can be performed based on the captured image first, and then the focusing operation can be performed on the target object after the framing following operation. If the operating mode of the image capturing apparatus is focus first and then follow mode, the target object in the capturing image can be focused first, and then the target object that is focused can be followed.

In the specific application, the operation interface/control for controlling the image capturing apparatus is pre-set, and the operating mode of the image capturing apparatus can be configured/selected through the operation interface/control. After configuring the working mode of the image capturing apparatus, the working mode of the image capturing apparatus can be determined by the working mode logo.

After determining the working mode of the image capturing apparatus, the working mode can be used to control the image capturing apparatus, thus effectively realizing that the image capturing apparatus can meet the needs of different application scenarios and further improving the flexibility and reliability of the control of the image capturing apparatus.

Figure 35:
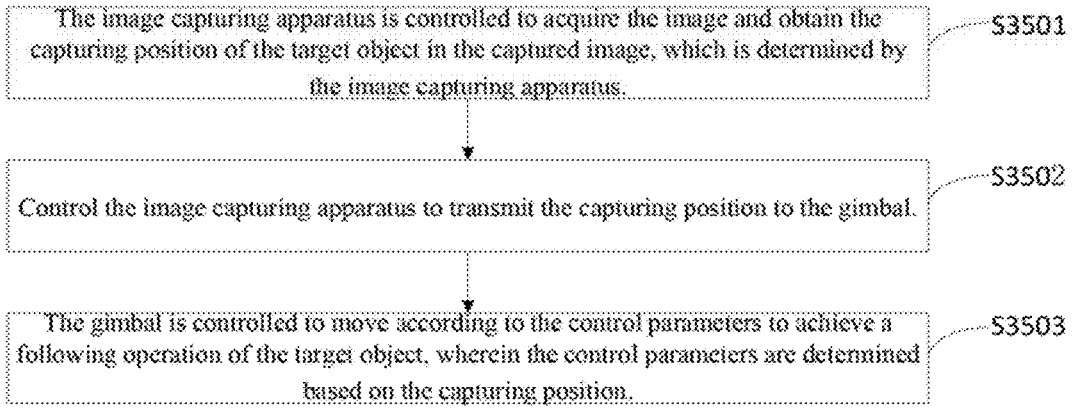
FIG. 35 is a flow diagram of a control method for a gimbal system provided by an embodiment of the present disclosure.

FIG. 35 is a flow diagram of a control method of a gimbal system provided by an embodiment of the present disclosure; Referring to the accompanying FIG. 35, this embodiment provides a control method of a gimbal system, wherein the gimbal system comprises: a gimbal and an image capture apparatus communicatively connected to the gimbal, wherein the image capture apparatus may be a camera having a manual lens or an automatic lens. In some examples, the image capture apparatus may be integrated in the gimbal, when the gimbal and the image capture apparatus provided on the gimbal may be sold or maintained in operation as a whole, when the image capture apparatus and the gimbal may be sold or maintained in operation as a whole. In other examples, the image capture apparatus may be separately provided on the gimbal, when the image capture apparatus and the gimbal may be sold or maintained operation separately.

In addition, an image capturing apparatus is an apparatus having image capturing capability and image processing capability, for example, a camera, a video camera, other apparatuses having image capturing capability, and so on. In some examples, the gimbal is provided with a communication serial bus USB interface, and the USB interface is used for wired communication connection with the image capturing apparatus, i.e., the gimbal is communicatively connected to the image capturing apparatus through the USB interface, and in specific applications, when the gimbal is transmitting data with the image capturing apparatus through the USB interface, the delay time corresponding to the transmitted data is relatively short.

It can be understood that the communication connection between the gimbal and the image capturing apparatus is not limited to the above-limited implementation, but the technical person in the field can also be set according to the specific application needs and application scenarios, such as wireless communication, or can ensure that the corresponding delay time is relatively short when the gimbal and the image capturing apparatus carry out data transmission, which will not be repeated here.

In addition, the execution subject of the control method of the gimbal system may be the control apparatus of the gimbal system, and it is understood that the control apparatus of the gimbal system may be implemented as software, or a combination of software and hardware; furthermore, the control apparatus of the gimbal system may be provided on the gimbal or the image capturing apparatus, and when the control apparatus of the gimbal system is provided on the image capturing apparatus, the gimbal and the image capturing apparatus may be integrated product. When the control apparatus performs the control method of the gimbal system, the problem of poor following effect due to the long delay time generated by the image processing apparatus on the gimbal side to obtain the capturing position can be solved, so that the quality and effect of the following operation on the target object can be ensured. Specifically, the method may include:

Step S3501: The image capturing apparatus is controlled to acquire the image and obtain the capturing position of the target object in the captured image, which is determined by the image capturing apparatus.

Step S3502: Control the image capturing apparatus to transmit the capturing position to the gimbal.

Step S3503: The gimbal is controlled to move according to the control parameters to achieve a following operation of the target object, wherein the control parameters are determined based on the capturing position.

The process of implementing each of these steps is described in detail below.

Step S3501: The image capturing apparatus is controlled to acquire the image and obtain the capturing position of the target object in the image, the capturing position is determined by the image capturing apparatus.

When there is a following demand for a target object, then the image capturing apparatus can be controlled according to the following demand for the image capturing apparatus, and after the image capturing apparatus acquires the image, the image capturing apparatus can analyze and process the image to determine the capturing position of the target object in the image. Specifically, the capturing position of the target object in the image may include: the location of the key point corresponding to the target object in the image, or, the coverage area corresponding to the target object in the image, etc.

Step S3502: Control the image capturing apparatus to transmit the capturing position to the gimbal.

After acquiring the capturing position of the target object in the capturing image, the capturing position of the target object in the capturing image can be actively or passively transmitted to the gimbal through the USB interface, so that the gimbal can acquire the capturing position of the target object in the image.

Step S3503: The gimbal is controlled to move according to the control parameters to achieve a following operation of the target object, wherein the control parameters are determined based on the capturing position.

After the gimbal acquires the capturing position, the capturing position can be analyzed and processed to determine the control parameters used to control the gimbal, and then the gimbal can be controlled to move according to the control parameters to achieve the following operation of the target object.

It is to be noted that the method in this embodiment may also include the method of the embodiment shown in FIGS. 2 to 34 above, and the parts not described in detail in this embodiment may be referred to the relevant description of the embodiment shown in FIGS. 2 to 34. The execution process and technical effects of the technical solution are described in the embodiments shown in FIGS. 2 to 34 and will not be repeated herein.

The control method of the gimbal system provided in this embodiment, by controlling the image capturing apparatus to acquire an image and obtain the capturing position of the target object in the image, and then transmitting the capturing position to the gimbal and controlling the gimbal to move according to the control parameters, wherein the control parameters are determined based on the capturing position, so that the following operation of the target object can be realized, and in addition. In addition, since the capturing position is determined by the image capturing apparatus, and the gimbal can acquire the capturing position directly through the image capturing apparatus, this effectively reduces the delay time corresponding to the capturing position acquired by the gimbal through the image capturing apparatus, thus solving the problem of poor following effect due to the long delay time, further ensuring the quality and effect of the following operation on the target object, and effectively improving the stability and reliability of the use of the method. It further ensures the quality and effectiveness of the following operation on the target object and effectively improves the stability and reliability of the method.

Figure 36:
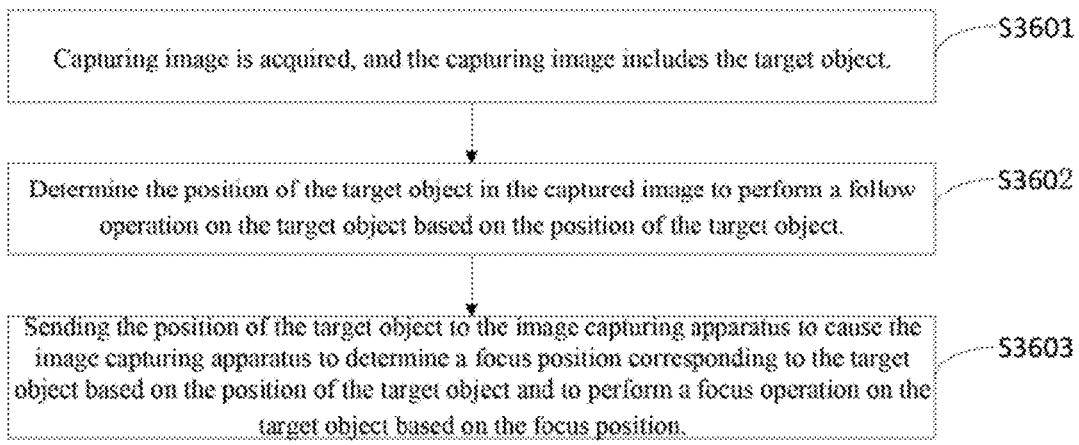
FIG. 36 is a flow diagram of another control method for a gimbal provided by embodiments of the present disclosure.

FIG. 36 is a flow diagram of another control method of a gimbal provided by embodiments of the present disclosure; with reference to the accompanying FIG. 36, this embodiment provides another control method of a gimbal, which is applicable to a gimbal, which is communicatively connected with an image capturing apparatus, and furthermore, the execution subject of the control method of the gimbal can be a control apparatus of the gimbal, which can be understood to be implemented as software, or a combination of software and hardware, specifically, the method may include:

Step S3601: Capturing image is acquired, and the capturing image includes the target object.

Step S3602: Determine the position of the target object in the captured image to perform a follow operation on the target object based on the position of the target object.

Step S3603: sending the position of the target object to the image capturing apparatus to cause the image capturing apparatus to determine a focus position corresponding to the target object based on the position of the target object and to perform a focus operation on the target object based on the focus position.

The process of implementing each of these steps is described in detail below.

Step S3601: Capturing image is acquired, and the capturing image includes the target object.

Wherein, the gimbal is communicatively connected with an image capturing apparatus, and the above image capturing apparatus can carry out an image capturing apparatus for a target object, so that the capturing image can be acquired, and after the image capturing apparatus acquires the captured image, then the captured image can be actively or passively transmitted to the gimbal, so that the gimbal can steadily acquire the captured image.

Step S3602: Determine the position of the target object in the captured image to perform a follow operation on the target object based on the position of the target object.

Among them, after the captured image is obtained, the captured image can be analyzed and processed to determine the position of the target object, and the position of the acquired target object is used to realize the following operation of the target object. Specifically, the captured image can be displayed through the display interface, and then the user can input the execution operation for the captured image through the display interface, and the position of the target object can be determined according to the execution operation, i.e., the user can frame the target object included in the captured image, so that the position of the target object can be determined. Alternatively, after acquiring the captured image, the captured image can be automatically analyzed and processed using a preset image processing algorithm to determine the position of the target object.

Of course, the person skilled in the art can also use other ways to determine the position of the target object in the captured image, as long as the position of the target object can be determined accurately and reliably, and will not be repeated here.

Step S3603: sending the position of the target object to the image capturing apparatus to cause the image capturing apparatus to determine a focus position corresponding to the target object based on the position of the target object and to perform a focus operation on the target object based on the focus position.

Wherein, after obtaining the position of the target object, in order to ensure the quality and effect of the following operation on the target object by the image capturing apparatus, the position of the target object can be sent to the image capturing apparatus, and after the image capturing apparatus obtains the position of the target object, the focus position corresponding to the target object can be determined based on the position of the target object, thereby realizing the following operation on the target object, the following position for the following operation on the target object is the same as the focus position corresponding to the target object. When following the target object, the following position for following the target object is the same as the corresponding focus position of the target object, which effectively avoids the situation of defocusing the target object due to the inconsistency between the focus position and the following position, and further improves the quality and effect of following the target object.

It is to be noted that the method in this embodiment may also include the method of the embodiment shown in FIGS. 2 to 34 above, and the parts not described in detail in this embodiment may be referred to the relevant description of the embodiment shown in FIGS. 2 to 34. The execution process and technical effects of the technical solution are described in the embodiments shown in FIGS. 2 to 34 and will not be repeated herein.

The control method of the gimbal provided in this embodiment, by acquiring an captured image and determining a position of a target object in the captured image to perform a following operation on the target object based on the position of the target object, and then sending the position of the target object to an image capturing apparatus to cause the image capturing apparatus to determine a focusing position corresponding to the target object based on the position of the target object, and to perform a focusing operation on the target object based on the focusing position. This effectively ensures that the following position used for the following operation of the target object is the same as the corresponding focusing position of the target object when the following operation is performed on the target object, thus effectively avoiding the situation of defocusing the target object due to the inconsistency between the focusing position and the following position, thereby effectively improving the quality and effect of the following operation of the target object. The stability and reliability of the method are further improved.

Figure 37:
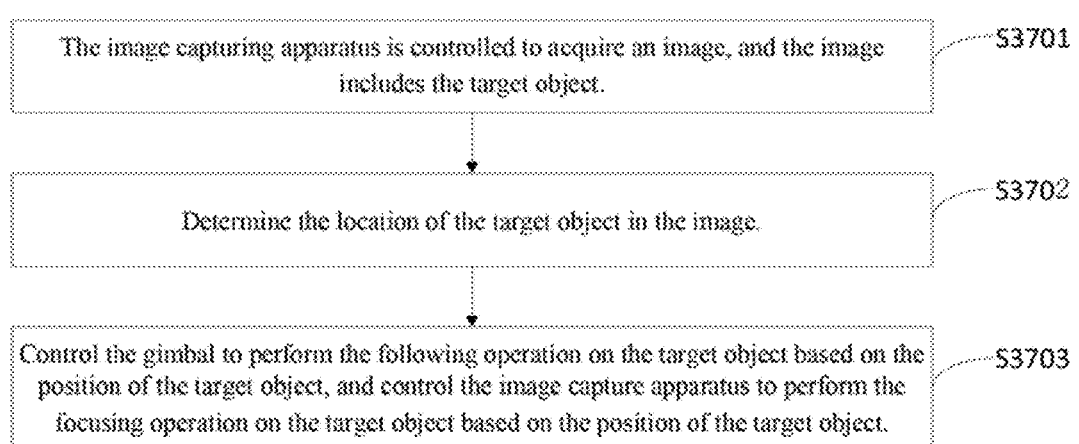
FIG. 37 is a flow diagram of another control method for a gimbal system provided by an embodiment of the present disclosure.

FIG. 37 is a flow diagram of another control method of a gimbal system provided by an embodiment of the present disclosure; with reference to the accompanying FIG. 37, this embodiment provides a control method of a gimbal system, wherein the gimbal system comprises: a gimbal and an image capturing apparatus communicatively connected to the gimbal, and in some examples, the image capturing apparatus may be integrated on the gimbal, when the gimbal and the image capturing apparatus set on the gimbal can be sold or maintained as a whole. In other examples, the image capture apparatus may be separately provided on the gimbal, in which case the image capture apparatus and the gimbal may be sold or maintained separately from each other.

In addition, an image capturing apparatus is an apparatus having image capturing capability and image processing capability, for example, a camera, a video camera, other apparatuses having image capturing capability, and so on. In some examples, the gimbal is provided with a communication serial bus USB interface, and the USB interface is used for wired communication connection with the image capturing apparatus, i.e., the gimbal is communicatively connected to the image capturing apparatus through the USB interface, and in specific applications, when the gimbal transmits the position data of the followed object with the image capturing apparatus through the USB interface, since no additional image processing apparatus is required on the gimbal side, the delay time corresponding to the position data of the followed object transmitted between the gimbal and the image The delay time corresponding to the position data of the followed object transmitted between the gimbal and the image capturing apparatus is relatively short.

It can be understood that the communication connection between the gimbal and the image capturing apparatus is not limited to the above-limited implementation, but the technical person in the field can also set up according to the specific application needs and application scenarios, such as wireless communication, or can ensure that the corresponding delay time is relatively short when the gimbal and the image capturing apparatus carry out data transmission, which will not be repeated here.

In addition, the execution subject of the control method of the gimbal system can be a control apparatus of the gimbal system, and it is understood that the control apparatus of the gimbal system can be implemented as software, or a combination of software and hardware; furthermore, the control apparatus of the gimbal system can be set on the gimbal or the image capturing apparatus. When the control apparatus executes the control method of the gimbal system, it can solve the problem of poor following effect due to the long delay generated by the interface transmission data, so that the quality and effect of the following operation on the target object can be guaranteed. Specifically, the method may include:

Step S3701: The image capturing apparatus is controlled to acquire an image, and the image includes the target object.

Step S3702: Determine the position of the target object in the image.

Step S3703: Control the gimbal to perform the following operation on the target object based on the position of the target object, and control the image capture apparatus to perform the focusing operation on the target object based on the position of the target object.

The process of implementing each of these steps is described in detail below:

Step S3701: The image capturing apparatus is controlled to acquire an image, and the image includes the target object.

When there is a following demand for a target object, the image capturing apparatus can be controlled according to the following demand, and after the image capturing apparatus acquires the image, the image can be actively or passively transmitted to the PTZ, so that the PTZ can acquire the image.

Step S3702: Determine the position of the target object in the image.

After the image is acquired, the image can be analyzed to determine the capturing position of the target object in the image. Specifically, the capturing position of the target object in the image can include: the location of the key point corresponding to the target object in the image, or the coverage area corresponding to the target object in the image, etc. Of course, the determination of the position of the target object in the capturing image can also be achieved by the image capturing apparatus.

Step S3703: Control the gimbal to perform the following operation on the target object based on the position of the target object, and control the image capturing apparatus to perform the focusing operation on the target object based on the position of the target object.

After obtaining the position of the target object, it is possible to control the gimbal to perform the following operation on the target object based on the position of the target object, in addition, after obtaining the position of the target object, it is also possible to determine the focus position corresponding to the target object based on the position of the target object, specifically, the position of the target object can be the same as the focus position corresponding to the target object, so as to achieve the following operation on the target object when the When following the target object, the following position used for following the target object is the same as the corresponding focus position of the target object, which effectively avoids the situation of defocusing the target object due to the inconsistency between the focus position and the following position, and further improves the quality and effect of following the target object.

It is to be noted that the method in this embodiment may also include the method of the embodiment shown in FIGS. 2 to 34 above, and the parts not described in detail in this embodiment may be referred to the relevant description of the embodiment shown in FIGS. 2 to 34. The execution process and technical effects of the technical solution are described in the embodiments shown in FIGS. 2 to 34 and will not be repeated herein.

The control method of the gimbal system provided in this embodiment, by controlling the image capturing apparatus to acquire an image and determine the position of the target object in the image, and then controlling the gimbal to perform a following operation on the target object based on the position of the target object, and controlling the image capturing apparatus to perform a focusing operation on the target object based on the position of the target object, thereby effectively ensuring that the following position used to perform the following operation on the following position of the target object for following operation is the same as the corresponding focusing position of the target object, which effectively avoids the situation of defocusing the target object due to the inconsistency between the focusing position and the following position, thus effectively improving the quality and effect of the following operation on the target object and further improving the stability and reliability of the use of the method.

Figure 38:
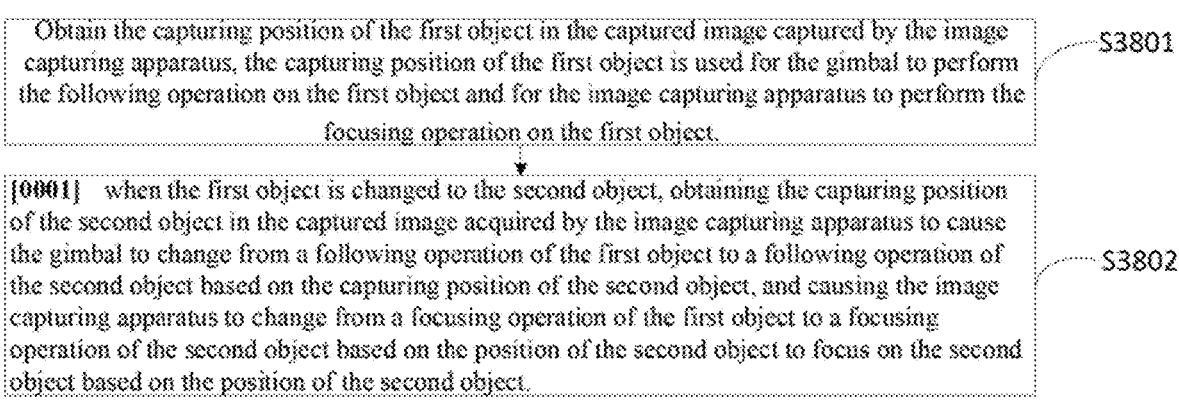
FIG. 38 is a flow diagram of a further control method for a gimbal system provided by embodiments of the present disclosure.

FIG. 38 shows a flow diagram of yet another control method of a gimbal system provided by an embodiment of the present disclosure; with reference to the attached FIG. 38, this embodiment provides yet another control method of a gimbal system, wherein the gimbal system comprises: a gimbal and an image capturing apparatus communicatively connected to the gimbal, and the execution subject of the control method of the gimbal system may be a control apparatus of the gimbal system, and it is understood that the control apparatus may be implemented as software, or a combination of software and hardware; furthermore, the control apparatus of the gimbal system may be set on the gimbal or the image capturing apparatus, and when the control apparatus of the gimbal system is set on the image capturing apparatus, the gimbal and the image capturing apparatus may be integrated products. Specifically, the method in this embodiment may further comprise:

Step S3801: Obtain the capturing position of the first object in the captured image captured by the image capturing apparatus, the capturing position of the first object is used for the gimbal to perform the following operation on the first object and for the image capturing apparatus to perform the focusing operation on the first object.

Step S3802: when the first object is changed to the second object, obtaining the capturing position of the second object in the captured image acquired by the image capturing apparatus to cause the gimbal to change from a following operation of the first object to a following operation of the second object based on the capturing position of the second object, and causing the image capturing apparatus to change from a focusing operation of the first object to a focusing operation of the second object based on the position of the second object to focus on the second object based on the position of the second object.

The process of implementing each of these steps is described in detail below:

Step S3801: Obtain the capturing position of the first object in the captured image captured by the image capturing apparatus, the capturing position of the first object is used for the gimbal to perform the following operation on the first object and for the image capturing apparatus to perform the focusing operation on the first object.

Wherein, when there is a following demand for the first object, an image capturing operation can be performed for the first object by the image capturing apparatus, so that an captured image including the first object can be obtained. After the captured image is obtained, the captured image can be analyzed and processed to determine the capturing position of the first object in the captured image, and the determined capturing position of the first object in the captured image is used for the gimbal to perform the following operation on the first object, and furthermore, the determined capturing position of the first object in the captured image is used for the image capturing apparatus to perform the focusing operation on the first object. In addition, the execution body that analyzes and processes the captured image to determine the capturing position of the first object in the captured image can be an "image capturing apparatus" or a "gimbal".

Step S3802: when the first object is changed to the second object, obtaining the capturing position of the second object in the captured image acquired by the image capturing apparatus to cause the gimbal to change from a following operation of the first object to a following operation of the second object based on the capturing position of the second object, and causing the image capturing apparatus to change from a focusing operation of the first object to a focusing operation of the second object based on the position of the second object to focus on the second object based on the position of the second object.

When following operation is performed on the first object, there may be a situation where the following object is changed, i.e., the first object may change to the second object. When the first object is changed to the second object, the capturing position of the second object in the capturing image can be obtained, and then the gimbal can be controlled based on the capturing position of the second object in the capturing image, thus effectively realizing that the gimbal can be controlled to change from the following operation to the first object to the following operation to the second object based on the capturing position of the second object.

In addition, the acquired capturing position of the second object in the captured image can also be used for the image capturing apparatus to perform the focusing operation, specifically, the image capturing apparatus can be made to change from the focusing operation of the first object to the focusing operation of the second object based on the position of the second object, thereby realizing that the following position used for the following operation of the second object is the same as the corresponding focusing position of the second object when the following operation of the second object is performed. This effectively avoids the situation of defocusing the second object due to the inconsistency between the focusing position and the following position, and further improves the quality and effect of the following operation on the second object.

In addition, the implementation of acquiring the capturing position of the second object in the captured image is similar to the implementation of acquiring the capturing position of the first object in the captured image as described above, which can be referred to the above stated contents and will not be repeated here.

It is to be noted that the method in this embodiment may also include the method of the embodiment shown in FIGS. 2 to 34 above, and the parts not described in detail in this embodiment may be referred to the relevant description of the embodiment shown in FIGS. 2 to 34. The execution process and technical effects of the technical solution are described in the embodiments shown in FIGS. 2 to 34 and will not be repeated herein.

It can be understood that the above method can also update the corresponding objects on the image capturing apparatus side and the gimbal side respectively, for example, on the image capturing apparatus side, when the user changes the object of the focus operation from the first object to the second object by the touch operation, the object of the follow operation can be found from the display on the gimbal side to be changed from the first object to the second object. When the user changes the object of the following operation from the first object to the second object, the object of the focusing operation can be found from the display of the image capturing apparatus side also changed from the first object to the second object. Among them, the specific operation means for changing the object is not limited to the touch operation explained above.

The control method of the gimbal system provided in this embodiment, by acquiring the capturing position of the first object in the capturing image acquired by the image capturing apparatus, when the first object is changed to the second object, then the capturing position of the second object in the capturing image acquired by the image capturing apparatus can be acquired, so that the gimbal changes from a following operation for the first object to a following operation for the second object based on the capturing position of the second object, and so that the image capturing apparatus changes from a following operation for the first object to a focusing operation for the second object based on the position of the second object operation, and to cause the image capturing apparatus to change from a focus operation on the first object to a focus operation on the second object based on the position of the second object, thereby effectively ensuring that when the following object is changed from the first object to the second object, then the following operation can be performed on the second object. This effectively avoids the situation of defocusing the second object due to the inconsistency between the focus position and the following position, thus effectively improving the quality and effect of the following operation on the second object and further improving the stability and reliability of the method.

Figure 39:
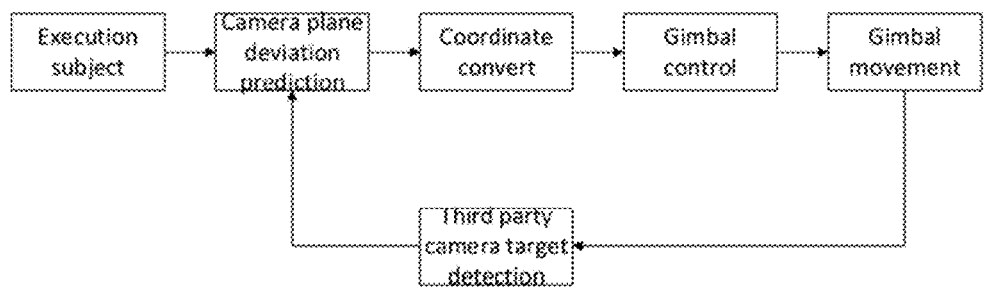
FIG. 39 is a schematic diagram I of a control method for a gimbal provided by an application embodiment of the present disclosure.

In specific application, with reference to the attached FIG. 39, the present disclosure provides an intelligent following method implemented based on a camera (which can be a third party camera set on a gimbal, or a camera integrated on a gimbal), and the execution subject of the method can include: a camera and a gimbal. Specifically, the method in this embodiment includes the steps of:

Step 1: Camera plane deviation prediction.

The camera exposure time stamp of the current image frame is obtained directly through the camera, and the camera exposure time stamp of the current image frame can be to, when the camera sends the detection information of the current image frame (which may include the coordinate information of the target object located in the image frame) to the gimbal, the gimbal receives the detection information of the current image frame with the time stamp of $t_{n+1}$ correspondingly, when the camera sends the detection information of the previous image frame to the gimbal, the gimbal receives the detection information of the previous image frame with a timestamp of $t_{n-1}$.

Considering the link delay and other instabilities corresponding to the link on the communication link constituted by the camera and the gimbal, there is a deviation between the time of the target object target value in the current image frame obtained through the camera and the time of receiving the above detection information by the gimbal. Therefore, in order to ensure the quality and effect of the following operation on the target object, then the influence of the link delay on the intelligent following operation needs to be considered, and the following steps can be performed.

Step 1.1: Get the link delay corresponding to the communication link formed by the camera and the gimbal.

Specifically, the link delay is the time interval between the exposure time of the current image frame and the reception time of the detection information received by the gimbal corresponding to the current image frame, i.e. $\Delta t = t_{n+1} - t_n$.

Step 1.2: Based on the current image frame, get the capturing position of the target object in the current image frame.

Specifically, the camera can analyze and process the current image frame to determine the capturing position of the target object in the current image frame as $(x_n, y_n)$.

Step 1.3: Based on the capturing position of the target object in the current image frame, determine the current position prediction value corresponding to the capturing position $(\hat{x}_{n+1}, \hat{y}_{n+1})$, which can be specifically implemented based on the following equations:

$$\hat{x}_{n+1} = x_n + \frac{x_n - \hat{x}_{n-1}}{t_n - t_{n-1}} \Delta t;$$

$$\hat{y}_{n+1} = y_n + \frac{y_n - \hat{y}_{n-1}}{t_n - t_{n-1}} \Delta t;$$

where $(\hat{x}_{n-1}, \hat{y}_{n-1})$ is the predicted value of the previous position of the target object in the previous image frame, and $(x_n, y_n)$ is the capturing position of the target object in the current image frame, and $(\hat{x}_{n+1}, \hat{y}_{n+1})$ is the predicted value of the current position corresponding to the capturing position, and $\Delta t$ is the link delay corresponding to the communication link formed by the camera and the gimbal, and to is the camera exposure timestamp corresponding to the current image frame, and $t_{n-1}$ is the time stamp of the detection information received by the gimbal from the previous image frame.

Note that at n=1, the predicted value of the previous position of the target object in the previous image frame $(\hat{x}_{n-1}, \hat{y}_{n-1})$ is the same as the capturing position of the target object in the current image frame $(x_n, y_n)$ is the same.

Step 1.4: Based on the predicted value of the current position corresponding to the capturing position $(\hat{x}_{n+1}, \hat{y}_{n+1})$, determine the camera plane deviation.

Specifically, the camera plane deviation is the deviation of the normalized coordinate values, denoted as $e_x$ and $e_y$. In order to obtain the camera plane deviation, the framing target can be obtained, and the framing target can be implemented as $(tgt_x, tgt_y)$. The camera plane deviation is determined based on the composition target and the current position prediction, specifically, the camera plane deviation can be obtained based on the following equations:

$$e_x = tgt_x - \hat{x}_{n+1};$$

$$e_y = tgt_y - \hat{y}_{n+1}.$$

Step 2: Perform a coordinate conversion operation on the camera plane deviation to determine the deviation angle used to perform the following operation on the target object.

Step 2.1: Get the actual screen field-of-view fov information of the camera and the current pose information of the gimbal.

Among them, in order to obtain the actual screen field of view fov information of the camera, you can first obtain the focal length information of the camera, based on the focal length information to determine the actual screen field of view fov information of the camera, it should be noted that the above-mentioned focal length information can be obtained directly through the camera, or can also be obtained by the user based on the specific application scenarios and application requirements for configuration.

Step 2.2: Based on the actual screen field-of-view fov information and current pose information, the camera plane deviation is converted to the geodetic coordinate system NED (North, East and Earth coordinate system), so that the deviation angle can be obtained.

Specifically, the camera coordinate system can be denoted as b system and the NED coordinate system can be denoted as n system.

The angle of deviation in the geodetic coordinate system can be obtained by the following equation.

$$E_x = 0;$$

$$\begin{Bmatrix} E_y \\ E_z \end{Bmatrix} = \begin{bmatrix} FOV_x & \\ & FOV_y \end{bmatrix} \begin{Bmatrix} e_x \\ e_y \end{Bmatrix};$$

Among them, the $e_x$ and $e_y$ are the deviations of the coordinate values after normalization in the camera plane, and $FOV_x$, and $FOV_y$ are the corresponding fov angles of the camera in the lateral (x-axis direction) and vertical (y-axis direction) directions, respectively $E_x$, and $E_y$, and $E_z$ are the deviation angles corresponding to each axis in the camera coordinate system, and their matrices are represented as follows.

$$E_b = \begin{Bmatrix} E_x \\ E_y \\ E_z \end{Bmatrix}.$$

The IMU can measure the attitude of the gimbal and the corresponding rotation matrix $R_b^n$ and the angular deviation in the NED coordinate system can be obtained according to the following equation.

$$E_n = R_b^n E_b$$

where $E_n$ is the angle of deviation corresponding to the geodetic coordinate system NED, and $R_b^n$ is the rotation matrix corresponding to the pose of the gimbal, and $E_b$ is the deviation angle in the camera coordinate system.

In some examples, the gimbal can correspond to different following modes, which can include single-axis following mode, two-axis following mode and three-axis following mode, and the different following modes can correspond to different deviation angles. When the gimbal is in single-axis following mode, the deviation angle obtained can correspond to the single axis of the gimbal, for example: the deviation angle corresponds to the yaw axis, and the deviation angle corresponding to the other two axes is adjusted to zero. When the gimbal is in two-axis following mode, the obtained deviation angle can correspond to two axes of the gimbal, for example: the deviation angle corresponds to the yaw and pitch axes, and the deviation angle corresponding to the other axes is adjusted to zero. When the gimbal is in 3-axis following mode, the obtained deviation angle can correspond to three axes of the gimbal, for example: the deviation angle corresponds to the yaw, pitch and roll axes.

Step 3: Control the gimbal based on the deviation angle to achieve the following operation of the target object.

Figure 40:
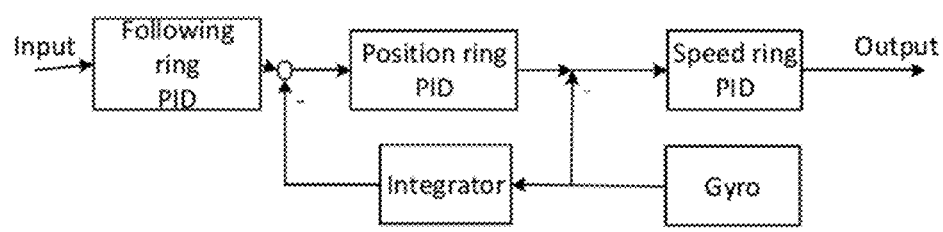
FIG. 40 is a schematic diagram II of a control method for a gimbal provided by an application embodiment of the present disclosure.

Among them, the gimbal can be provided with a gimbal controller, which can include three Proportion Integral Differential (PID) controllers, the specific structure refers to the attached FIG. 40, which can specifically include following ring for PID controller, position ring PID controller and speed ring PID controller.

After obtaining the deviation angle $E_n$ then the deviation angle can be $E_n$ into the PID controller to obtain the control parameters for controlling the rotation of the gimbal motor.

It should be noted that the person skilled in the art can adjust the relevant parameters of the three PID controllers according to different needs. The higher the bandwidth of the PID controller, the better the following performance, but its smoothness decreases, and conversely the lower the bandwidth the worse the following performance and the smoothness increases.

Step 4: Gimbal intelligent following strategy.

Among them, the gimbal intelligent following strategy can include the following three major aspects: slow start-stop strategy for following targets or lost targets, adjusting the gimbal controller for different objects, and determining the focus offset according to the historical focus position, the following three major aspects of the gimbal intelligent following strategy are explained.

Step 4.1: Slow start-stop strategy for following targets and lost targets.

Wherein, the slow start-stop strategy includes a uniform acceleration strategy or a uniform deceleration strategy, and the acceleration/deceleration time threshold is set to T, known as $E_n$ is the deviation angle of each axis in the ned coordinate system, and the actual deviation angle actually output to the gimbal controller $\widehat{E_n}$, specifically, the actual deviation angle output to the gimbal controller $\widehat{E_n}$ and the deviation angle $E_n$ The following relationship exists between (a) Start Following the Target in Uniformly Accelerated Motion.

$$\begin{cases} \widehat{E_n} = E_n * \dfrac{t}{T}, & t < T \\ \widehat{E_n} = E_n, & t \geq T \end{cases}$$

where t is the duration information of starting to follow the target object, and T is the preset time threshold, and the user can set the specific time duration of the preset time threshold according to the specific application scenario and application requirements, and in general T can be 0.5 s or 1 s.

Optionally, at the beginning of the following operation on the target object, in order to avoid abruptly following the target object, when the duration information of the following operation on the target object is less than the preset time threshold, then the deviation angle corresponding to the deviation angle can be obtained $E_n$ corresponding to the actual deviation angle $\widehat{E_n}$ and the actual deviation angle $\widehat{E_n}$ is the transition parameter between 0 and deviation angle $E_n$ The actual deviation angle is the transition parameter between 0 and the deviation angle, so that the following operation of the target object can be started slowly. When the duration information of the following operation is greater than or equal to the preset time threshold, the actual deviation angle $\widehat{E_n}$ is determined as the deviation angle $E_n$ The target object can be followed steadily.

(b) Lost Target Deceleration in Motion.

$$\begin{cases} \widehat{E_n} = 0, & t \geq T \\ \widehat{E_n} = E_n \left(1 - \dfrac{t}{T}\right), & t < T \end{cases}$$

where t is the duration information of the start of the lost target object, and T is the preset time threshold, and the user can set the specific time duration of the preset time threshold according to the specific application scenario and application requirements, and in general T can be is, 1.5 s or 2 s, etc.

Optionally, when starting the following operation on the target object, in order to avoid abruptly ending the following operation on the target object, when the target object is lost, the information of the duration of the target object lost is obtained, and when the information of the duration of the following operation on the target object is less than the preset time threshold T, then the angle of deviation corresponding to the angle of deviation $E_n$ corresponding to the actual deviation angle $\widehat{E_n}$ and the actual deviation angle $\widehat{E_n}$ is the transition parameter between 0 and deviation angle $E_n$ The actual deviation angle is the transition parameter between 0 and the deviation angle, so that the following operation of the target object can be ended slowly. The actual deviation angle can be determined as 0 when the duration information of the following operation on the target object is greater than or equal to the preset time threshold. $\widehat{E_n}$ is determined to be 0, which means that the following operation on the target object can be ended steadily.

Step 4.2: Adjust the gimbal controller according to the following speed of different objects.

Among them, the gimbal can adjust the gimbal controller according to the different types of objects followed, which can specifically include the following categories:

(a) When the target object to be followed is a person, the translation following performance (corresponding to the yaw direction) can be improved and the pitch following performance (corresponding to the pitch direction) can be reduced in order to improve the following quality and effect.
(b) When the target object to be followed is a pet, in order to improve the following quality and effect, then the translation following performance (corresponding to the yaw direction) and the pitch following performance (corresponding to the pitch direction) can be improved.
(c) When the target object to be followed is a building, the translation following performance (corresponding to the yaw direction) and the pitch following performance (corresponding to the pitch direction) can be reduced in order to improve the following quality and effect.
(d) When the target object to be followed is another object, then the control parameters can be kept unchanged.

Among other things, the following performance can be achieved by adjusting the corresponding control bandwidth.

Step 4.3: Determine the focus offset based on the historical focus position.

Wherein, in the process of image capturing operation for a target object using the image capturing apparatus, the historical focus position corresponding to the historical image frame and the current focus position corresponding to the current image frame may be different. At this time, in order to avoid the shaking or jerking of the gimbal due to the focus position offset, when the current focus position and the historical focus position are detected to be different, then the focus offset amount of the current focus position and the historical focus position self-test can be obtained, and the target focus position corresponding to the target object can be determined based on the focus offset amount.

Optionally, when the focus offset is less than or equal to the preset threshold, it means that the distance between the current focus position and the historical focus position is relatively close, and then the current focus position can be determined as the target focus position corresponding to the target object.

When the focus offset is greater than the preset threshold, it means that the distance between the current focus position and the historical focus position is far, and then the current focus position can be adjusted based on the focus offset, so that the target focus position corresponding to the target object can be obtained.

When the focus offset is larger than the preset threshold, which means the distance between the current focus position and the historical focus position is farther, then you can detect whether the target object is changed, and after the target object is changed, you can update the target composition position based on the changed target object, and get the updated target position, so as to control the gimbal based on the updated target position, and realize the change of the target object.

The intelligent following method based on the camera provided by this application embodiment effectively solves the following problems: (1) solves the problem of poor following effect due to the relatively long delay time generated by the HDMI transmission to the image processing apparatus to determine the capturing position; (2) solves the problem of the gimbal to achieve target following, which increases the development cost of additional AI machine learning algorithms and the hardware design cost; (3) to solve the problem of jumping coordinate points due to the change of camera following target type; (4) to solve the problem of non-uniform focus point and following point, and not to have the defocusing situation of the followed target; to further ensure the quality and effect of following operation on the target object, and effectively improve the stability and reliability of the use of the method.

Figure 2:
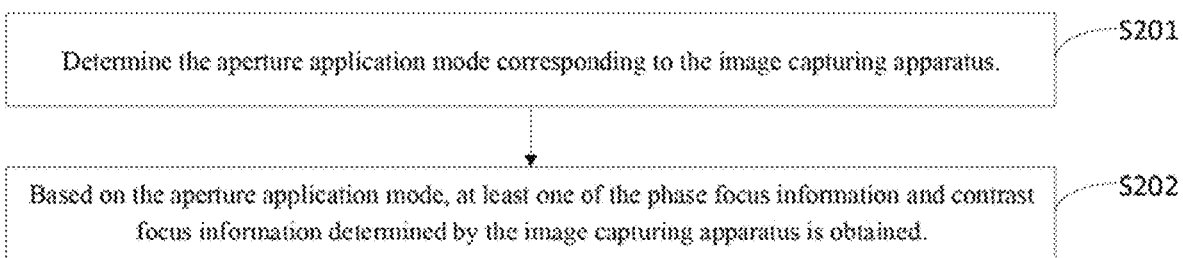
FIG. 2 is a schematic diagram of a process for obtaining focus information determined by said image capturing apparatus provided by an embodiment of the present disclosure.
Figure 41:
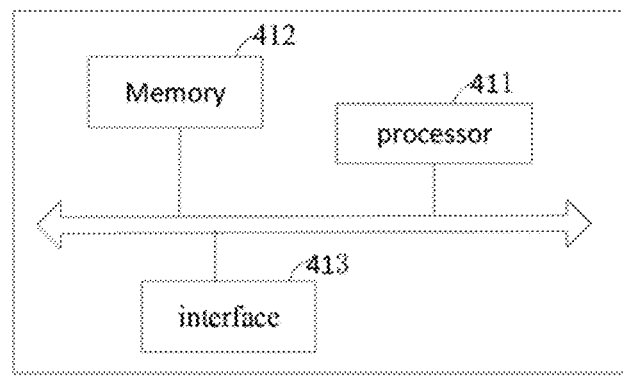
FIG. 41 is a schematic diagram of the structure of a control apparatus for a gimbal provided by an embodiment of the present disclosure.

FIG. 41 is a schematic diagram of a structure of a control apparatus of a gimbal provided by an embodiment of the present disclosure; with reference to the accompanying FIG. 41, this embodiment provides a control apparatus of a gimbal, wherein the gimbal is communicatively connected to an image capturing apparatus, and the control apparatus of the gimbal can perform the control method of the gimbal corresponding to FIG. 2. Specifically, the apparatus in this embodiment may comprise:

a memory 412 for storing computer programs"
a processor 411 for running the computer program stored in memory 412.

In some examples, the gimbal is provided with a communication serial bus USB interface, which is used for wired communication connection to the image capturing apparatus.

The apparatus shown in FIG. 41 can perform the method of the embodiment shown in FIGS. 16 to 34, FIGS. 39 to 40, with reference to the relevant description of the embodiment shown in FIGS. 16 to 34, FIGS. 39 to 40 for the parts of this embodiment not described in detail. The process and technical effect of the execution of the technical solution are described in the embodiments shown in FIGS. 16 to 34, FIGS. 39 to 40, and will not be repeated herein.

Figure 42:
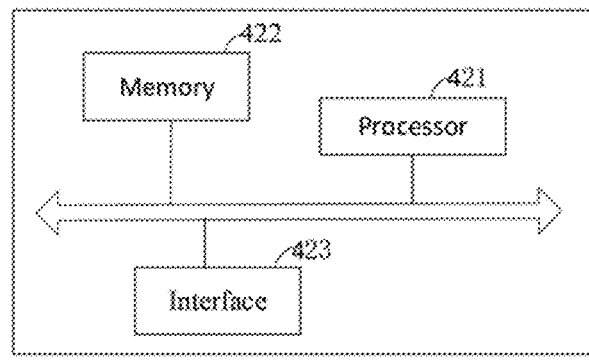
FIG. 42 is a schematic diagram of the structure of a control apparatus for a gimbal system provided by an embodiment of the present disclosure.

FIG. 42 shows a schematic structure of a control apparatus of a gimbal system provided by an embodiment of the present disclosure; with reference to the accompanying FIG. 42, this embodiment provides a control apparatus of a gimbal system, wherein the gimbal system includes a gimbal and an image capturing apparatus communicatively connected to the gimbal, and the control apparatus of the gimbal system can perform the control method of the gimbal system corresponding to FIG. 35. Specifically, the apparatus in this embodiment may include:

Memory 422 for storing computer programs;
Processor 421 for running the computer program stored in memory 422.

Figure 43:
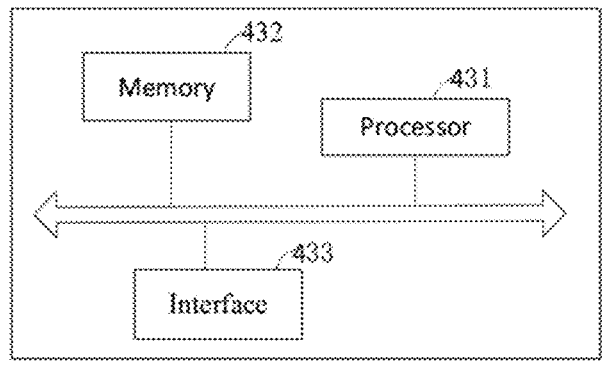
FIG. 43 is a schematic diagram of the structure of the control apparatus of another gimbal provided by an embodiment of the present disclosure.

FIG. 43 is a schematic diagram of the structure of another control apparatus for a gimbal provided by an embodiment of the present disclosure; with reference to the accompanying FIG. 43, this embodiment provides a control apparatus for a gimbal, the gimbal is communicatively connected with an image capturing apparatus, and the control apparatus for the gimbal can perform the control method of the gimbal corresponding to FIG. 36. Specifically, the apparatus in this embodiment may include:

Memory 432 for storing computer programs;
Processor 431 for running a computer program stored in memory 432 to implement:
Capturing of the capturing image, which includes the target object;
Determining the position of the target object in the capturing image in order to perform a follow operation on the target object based on its position.

It will be sent to the image capturing apparatus based on the position of the target object to cause the image capturing apparatus to determine a focus position corresponding to the target object based on the position of the target object and to perform a focus operation on the target object based on the focus position.

Wherein, the structure of the control apparatus of the gimbal may also include a communication interface 433 for the electronic apparatus to communicate with other apparatuses or communication networks.

The apparatus shown in FIG. 43 can perform the method of the embodiment shown in FIG. 36, FIG. 39 to FIG. 40, and the parts of this embodiment not described in detail can be referred to the relevant description of the embodiment shown in FIG. 36, FIG. 39 to FIG. 40. The execution process and technical effect of the technical solution are described in the embodiment shown in FIG. 36, FIG. 39 to FIG. 40 and will not be repeated herein.

Figure 44:
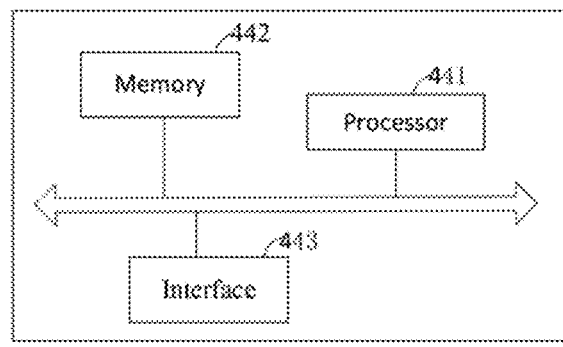
FIG. 44 is a schematic diagram of the structure of a control apparatus of another gimbal system provided by an embodiment of the present disclosure.

FIG. 44 is a schematic diagram of a structure of a control apparatus of another gimbal system provided by an embodiment of the present disclosure; with reference to the accompanying FIG. 44, this embodiment provides a control apparatus of another gimbal system, wherein the gimbal system includes a gimbal and an image capturing apparatus communicatively connected to the gimbal, and the control apparatus of the gimbal system can perform the control method of the gimbal system corresponding to FIG. 37. Specifically, the apparatus in this embodiment may include:

Memory 442 for storing computer programs;

Processor 441 for running a computer program stored in memory 442 to implement:

Controlling the image capturing apparatus to capture images, which include the target object.

Determining the position of the target object in the image.

Based on the position of the target object, the gimbal is controlled to follow the target object, and the image capturing apparatus is controlled to focus on the target object based on the position of the target object.

Wherein, the structure of the control apparatus of the gimbal system may further include a communication interface 443 for the electronic apparatus to communicate with other apparatuses or communication networks.

The apparatus shown in FIG. 44 can perform the method of the embodiment shown in FIG. 37, FIG. 39 to FIG. 40, and the parts of this embodiment not described in detail can be referred to the relevant description of the embodiment shown in FIG. 37, FIG. 39 to FIG. 40. The execution process and technical effect of the technical solution are described in the embodiment shown in FIG. 37, FIG. 39 to FIG. 40, and will not be repeated herein.

Figure 45:
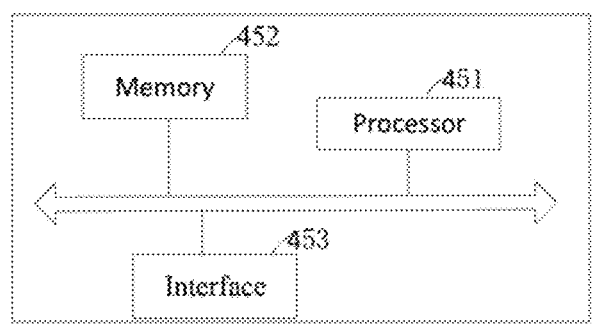
FIG. 45 is a schematic diagram of the structure of a control apparatus of yet another gimbal system provided by an embodiment of the present disclosure.

FIG. 45 shows a schematic structure of a control apparatus of a further gimbal system provided by an embodiment of the present disclosure, and with reference to the accompanying FIG. 45, this embodiment provides a control apparatus of a further gimbal system, wherein the gimbal system includes a gimbal and an image capturing apparatus communicatively connected to the gimbal, and the control apparatus of the gimbal system can perform the control method of the gimbal system corresponding to FIG. 38. Specifically, the apparatus in this embodiment may include.

Memory 452 for storing computer programs;

Processor 451 for running a computer program stored in memory 452 to implement:

obtaining the capturing position of the first object in the capturing image captured by the image capturing apparatus, the capturing position of the first object for the gimbal to perform a follow operation on the first object, and for the image capturing apparatus to perform a focus operation on the first object.

When the first object is changed to the second object, the capturing position of the second object in the capturing image acquired by the image capturing apparatus is acquired to cause the gimbal to change from a following operation of the first object to a following operation of the second object based on the capturing position of the second object, and to cause the image capturing apparatus to change from a focusing operation of the first object to a focusing operation of the second object based on the position of the second object.

Wherein, the structure of the control apparatus of the gimbal system may also include a communication interface 453 for the electronic apparatus to communicate with other apparatuses or communication networks.

The apparatus shown in FIG. 45 can perform the method of the embodiment shown in FIG. 38 to FIG. 40, and the parts of this embodiment not described in detail can be referred to the relevant description of the embodiment shown in FIG. 38 to FIG. 40. The execution process and technical effect of the technical solution are described in the embodiments shown in FIGS. 38 to 40 and will not be repeated herein.

It is understood that the control apparatus of any of the above embodiments may be independent of the PTZ or image capture apparatus or may be integrated with the PTZ or image capture apparatus.

Figure 46:
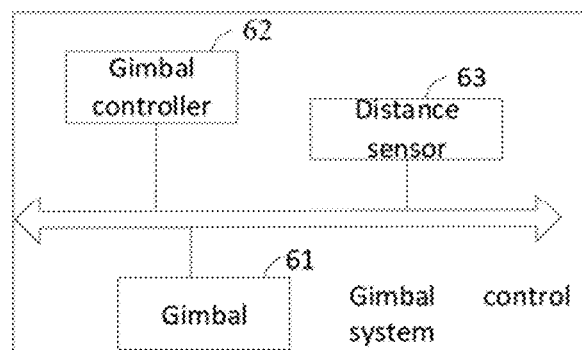
FIG. 46 is a schematic diagram of the structure of a control system for a gimbal provided by an embodiment of the present disclosure.

FIG. 46 is a schematic diagram of the structure of a control system for a gimbal provided by an embodiment of the present disclosure; with reference to the accompanying FIG. 46, this embodiment provides a control system for a gimbal, specifically, the control system may include:

Gimbal 61;

The control apparatus 62 of the gimbal shown in FIG. 41 above is provided on the gimbal 61 and is used to be communicatively connected to the image capturing apparatus and is used to control the gimbal 61 by the image capturing apparatus.

In some examples, the control system in this embodiment may also include:

Distance measuring sensor 63, provided on the image capturing apparatus, for obtaining distance information corresponding to the target object.

Wherein, the control apparatus 62 of the gimbal is communicatively connected to the distance measuring sensor 63 for sending the distance information to the image capturing apparatus to enable the image capturing apparatus to determine the capturing position of the target object in the capturing image in conjunction with the distance information.

The specific implementation principle, implementation process and implementation effect of the control system of the gimbal shown in FIG. 46 are similar to the specific implementation principle, implementation process and implementation effect of the control apparatus of the gimbal shown in FIG. 41, and the parts not described in detail in this embodiment can be referred to the relevant description of the embodiment shown in FIG. 41.

Figure 47:
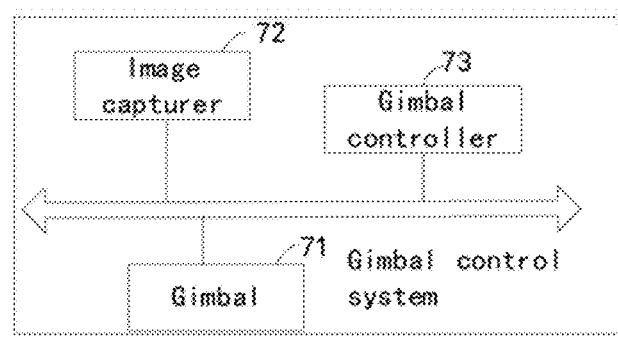
FIG. 47 is a schematic diagram of the structure of a control system for a gimbal provided by an embodiment of the present disclosure.

FIG. 47 is a schematic diagram of the structure of a control system for a gimbal provided by an embodiment of the present disclosure; with reference to the accompanying FIG. 47, this embodiment provides a control system for a gimbal, specifically, the control system for the gimbal may include:

gimbal 71;

The control apparatus 73 of the gimbal system corresponding to FIG. 42 above is provided on the gimbal 71 and is used for communicating with the image capturing apparatus 72 and for controlling the image capturing apparatus 72 and the gimbal 71, respectively.

The specific implementation principle, implementation process and implementation effect of the control system of the gimbal shown in FIG. 47 are similar to the specific implementation principle, implementation process and implementation effect of the control apparatus of the gimbal system shown in FIG. 42, and the parts not described in detail in this embodiment can be referred to the relevant description of the embodiment shown in FIG. 42.

Figure 48:
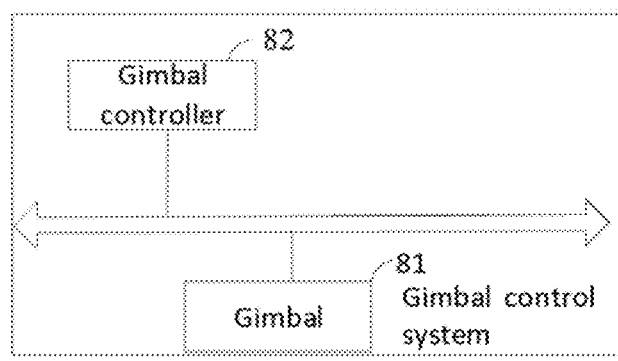
FIG. 48 is a schematic diagram of the structure of the control system of another gimbal provided by an embodiment of the present disclosure.

FIG. 48 is a schematic diagram of the structure of another control system for a gimbal provided by an embodiment of the present disclosure; with reference to the accompanying FIG. 48, this embodiment provides another control system for a gimbal, specifically, the control system for the gimbal may include:

gimbal 81.

The control apparatus 82 of the gimbal of FIG. 43 above is provided on the gimbal 81 and is used to be communicatively connected to the image capturing apparatus and to control the image capturing apparatus through the gimbal 81.

The specific implementation principle, implementation process and implementation effect of the control system of the gimbal shown in FIG. 48 are similar to the specific implementation principle, implementation process and implementation effect of the control apparatus of the gimbal shown in FIG. 43, and the parts not described in detail in this embodiment can be referred to the relevant description of the embodiment shown in FIG. 43.

Figure 49:
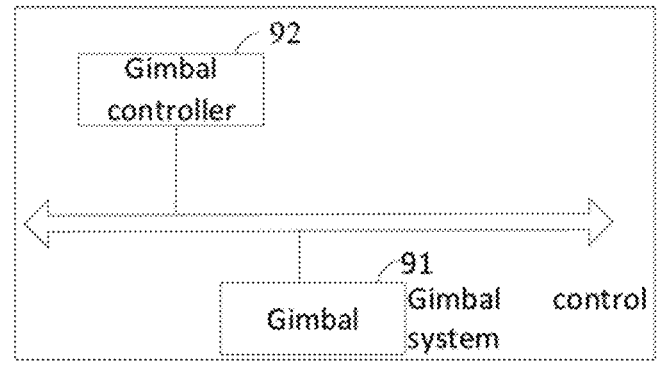
FIG. 49 is a schematic diagram of the structure of a control system of yet another gimbal provided by an embodiment of the present disclosure.

FIG. 49 is a schematic diagram of the structure of a control system of a further gimbal provided by an embodiment of the present disclosure; with reference to the accompanying FIG. 49, this embodiment provides a control system of a further gimbal, specifically, the control system of the gimbal may include:

gimbal 91.

The control apparatus 92 of the gimbal system of FIG. 44 above is provided on the gimbal 91 and is used to communicate with the image capture apparatus and to control the image capturing apparatus as well as the gimbal 91, respectively.

The specific implementation principle, implementation process and implementation effect of the control system of the gimbal shown in FIG. 49 are similar to the specific implementation principle, implementation process and implementation effect of the control apparatus of the gimbal system shown in FIG. 44, and the parts not described in detail in this embodiment can be referred to the relevant description of the embodiment shown in FIG. 44.

Figure 50:
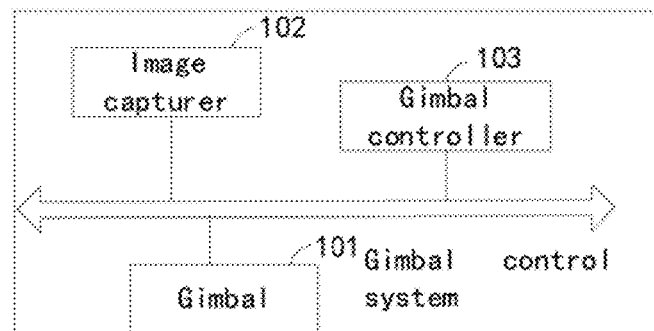
FIG. 50 is a schematic diagram of the structure of the control system of another gimbal provided by an embodiment of the present disclosure.

FIG. 50 is a schematic diagram of the structure of another control system for a gimbal provided by an embodiment of the present disclosure; with reference to the accompanying FIG. 50, this embodiment provides another control system for a gimbal, specifically, the control system for the gimbal may include:

gimbal 101.

The control apparatus 103 of the gimbal system corresponding to FIG. 45 above is provided on the gimbal 101 and is used for communicating with the image capturing apparatus 102 and for controlling the image capturing apparatus 102 and the gimbal 101, respectively.

The specific implementation principle, implementation process and implementation effect of the control system of the gimbal shown in FIG. 50 are similar to the specific implementation principle, implementation process and implementation effect of the control apparatus of the gimbal system shown in FIG. 45, and the parts not described in detail in this embodiment can be referred to the relevant description of the embodiment shown in FIG. 45.

It is understood that the control apparatus in the control system of the gimbal in each of the above embodiments may be integrated in the gimbal, which may further comprise an image capture apparatus, which may be integrated in the gimbal or, alternatively, may be detachably connected to the gimbal.

Figure 51:
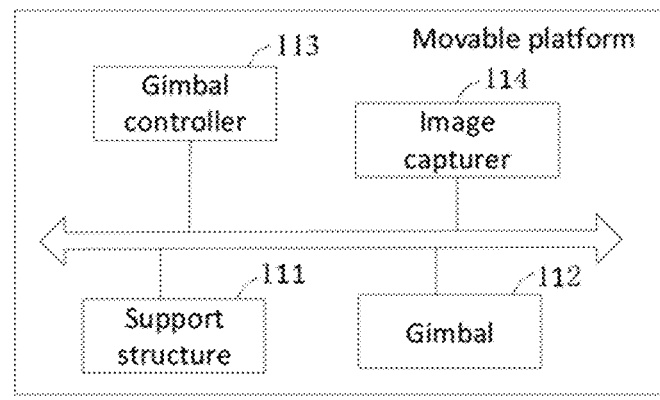
FIG. 51 is a schematic diagram I of the structure of a movable platform provided by embodiments of the present disclosure.

FIG. 51 is a schematic diagram I of the structure of a movable platform provided by an embodiment of the present disclosure; with reference to the accompanying FIG. 51, this embodiment provides a movable platform, specifically, the movable platform may include:

gimbal 112.

A support mechanism 111 for attaching the gimbal 112.

The control apparatus 113 of the gimbal of FIG. 41 above is provided on the gimbal 112 and is used to be communicatively connected to the image capturing apparatus 114 and is used to control the gimbal 112 via the image capturing apparatus 114.

Therein, the support mechanism 111 varies with the type of moveable platform, for example, when the moveable platform is a handheld gimbal, the support mechanism 111 may be a handle, and when the moveable platform is an airborne gimbal, the support mechanism 111 may be a body for carrying the gimbal. It is understood that the movable platform includes, but is not limited to, the types illustrated above.

The specific implementation principle, implementation process and implementation effect of the movable platform shown in FIG. 51 are similar to the specific implementation principle, implementation process and implementation effect of the control apparatus of the gimbal shown in FIG. 41, and the parts not described in detail in this embodiment can be referred to the relevant description of the embodiment shown in FIG. 41.

Figure 52:
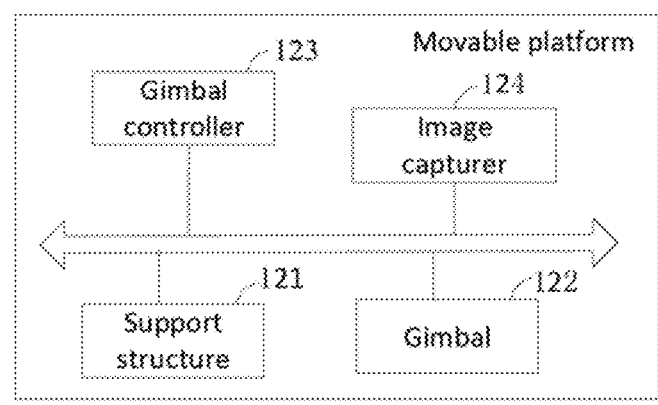
FIG. 52 shows a schematic diagram II of the structure of a movable platform provided by embodiments of the present disclosure.

FIG. 52 shows a schematic diagram II of the structure of a movable platform provided by an embodiment of the present disclosure; with reference to the accompanying FIG. 52, this embodiment provides a movable platform, specifically, the movable platform may include:

gimbal 122.

A support mechanism 121 for attaching the gimbal 122.

The control apparatus 123 of the gimbal system of FIG. 42 above, is provided on the gimbal 122 and is used for communicating with the image capture apparatus 124 and for controlling the image capture apparatus 124 and the gimbal 122, respectively.

Therein, the support mechanism 121 varies with the type of moveable platform, for example, when the moveable platform is a handheld gimbal, the support mechanism 121 may be a handle, and when the moveable platform is an airborne gimbal, the support mechanism 121 may be a body for carrying the gimbal. It is understood that the movable platform includes, but is not limited to, the types illustrated above.

The specific implementation principle, implementation process and implementation effect of the movable platform shown in FIG. 52 are similar to the specific implementation principle, implementation process and implementation effect of the control apparatus of the gimbal system shown in FIG. 42, and the parts not described in detail in this embodiment can be referred to the relevant description of the embodiment shown in FIG. 42.

Figure 53:
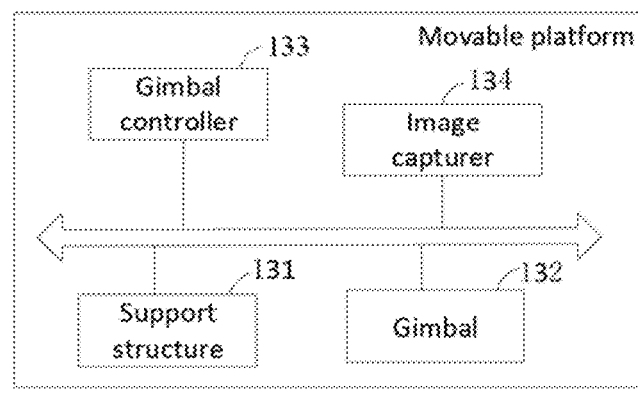
FIG. 53 shows a schematic diagram III of the structure of a movable platform provided by embodiments of the present disclosure.

FIG. 53 shows a schematic diagram III of the structure of a movable platform provided by embodiments of the present disclosure; with reference to the accompanying FIG. 53, this embodiment provides a movable platform, specifically, the movable platform may include:

gimbal 132.

A support mechanism 131 for attaching the gimbal 132.

The control apparatus 133 of the gimbal of FIG. 43 above is provided on the gimbal 132 and is used for communicating with the image capturing apparatus 134 and for controlling the image capturing apparatus 134 through the gimbal 132.

Therein, the support mechanism 131 varies with the type of moveable platform, for example, when the moveable platform is a handheld gimbal, the support mechanism 131 may be a handle, and when the moveable platform is an airborne gimbal, the support mechanism 131 may be a body for carrying the gimbal. It is understood that the movable platform includes, but is not limited to, the types illustrated above.

The specific implementation principle, implementation process and implementation effect of the movable platform shown in FIG. 51 are similar to the specific implementation principle, implementation process and implementation effect of the control apparatus of the gimbal shown in FIG. 43, and the parts not described in detail in this embodiment can be referred to the relevant description of the embodiment shown in FIG. 43.

being used to implement the control method of the gimbal of the present application.

The technical solutions and technical features in each of the above embodiments can be individually, or in combination, in case of conflict with the present, and are equivalent embodiments within the scope of protection of the present application, as long as they are not beyond the knowledge of those skilled in the art.

In the several embodiments provided by the present disclosure, it should be understood that the relevant detection apparatuses and methods disclosed can be implemented in other ways. For example, the above described embodiments of detection apparatuses are only schematic, for example, the division of said modules or units, which is only a logical functional division, can be divided in another way when actually implemented, for example multiple units or components can be combined or can be integrated into another system, or some features can be ignored, or not implemented. On another point, the mutual coupling or direct coupling or communication connection shown or discussed can be an indirect coupling or communication connection through some interface, detection apparatus or unit, which can be electrical, mechanical or otherwise.

Said units illustrated as separate components may or may not be physically separated, and the components displayed as units may or may not be physical units, i.e., they may be located in one place or may be distributed to a plurality of network units. Some or all of these units may be selected according to practical needs to achieve the purpose of this embodiment solution.

Alternatively, each functional unit in each embodiment of the present disclosure may be integrated in a processing unit, or each unit may be physically present separately, or two or more units may be integrated in a single unit. The above integrated units can be implemented either in the form of hardware or in the form of software functional units.

Said integrated unit may be stored in a computer readable storage medium when implemented as a software functional unit and sold or used as a separate product. It is understood that the technical solution of the present disclosure, or that part or all or part of the technical solution that essentially contributes to the prior art, may be embodied in the form of a software product, stored in a storage medium, comprising a number of instructions to cause a computer processor (processor) to perform all or some of the steps of the method described in the various embodiments of the present disclo-sure. The aforementioned storage media includes: USB flash drives, mobile hard drives, read-only memory (ROM, Read-Only Memory), random access memory (RAM, Random Access Memory), disks or CD-ROMs, and other media that can store program code.

The above is only an example of the present disclosure, not to limit the scope of the patent of the present disclosure. Any equivalent structure or equivalent process transformation made by using the specification of the present disclosure and the accompanying drawings, or applied directly or indirectly in other related technical fields, are included in the scope of patent protection of the present disclosure in the same way.

Finally, it should be noted that the above embodiments are only used to illustrate the technical solutions of the disclosure, not to limit them; although the disclosure is described in detail with reference to the preceding embodiments, it should be understood by those of ordinary skill in the art that it is still possible to modify the technical solutions recorded in the preceding embodiments, or to replace some or all of the technical features therein; and these modifications or replacements does not make the essence of the corresponding technical solutions out of the scope of the technical solutions of the embodiments of the present disclosure.

What is claimed is:

1. A method of controlling a gimbal, comprising:
obtaining, from an image capturer through wired/wireless communication connection between the gimbal and the image capturer, a capturing position of a target object in a captured image captured by the image capturer, the capturing position being determined by the image capturer based on the captured image, and the image capturer being a camera having a manual lens or an automatic lens;
determining, based on the capturing position, control parameters for a following operation on the target object; and
controlling the gimbal according to the control parameters to achieve the following operation of the target object.

2. The method according to claim 1, wherein the obtaining the capturing position of the target object in the captured image comprises:
obtaining a target focus position corresponding to the target object by the image capturer; and
determining the target focus position as the capturing position of the target object in the captured image.

3. The method according to claim 1, further comprising:
detecting whether the target object on which the following operation is performed has changed;
obtaining a capturing position of a second object in the captured image when the target object is changed from a first object to the second object;
updating a target composition position based on the capturing position of the second object in the captured image to obtain a second updated target composition position corresponding to the second object; and
performing a follow operation on the second object based on the second updated target composition position.

4. The method according to claim 1, wherein the determining, based on the capturing position, the control parameters for performing the following operation on the target object comprises:
calculating a predicted value of a current position corresponding to the capturing position; and
determining, based on the predicted value of the current position, the control parameters for the following operation on the target object.

5. The method according to claim 4, wherein the calculating the predicted value of the current position corresponding to the capturing position comprises:
   determining a delay time corresponding to the capturing position, the delay time indicating a length of time required for the gimbal to acquire the capturing position from the image capturer; and
   determining, based on the delay time and the capturing position, the predicted value of the current position corresponding to the capturing position.

6. The method according to claim 4, wherein the determining, based on the predicted value of the current position, the control parameters for the following operation on the target object, comprises:
   determining positional deviation between the predicted value of the current position and the target position; and
   determining, based on the positional deviation, the control parameters for following operation on the target object.

7. The method according to claim 6, wherein, the determining, based on the positional deviation, the control parameters for performing the following operation on the target object comprises:
   obtaining a field of view of a screen corresponding to the captured image; and
   determining the control parameters for the following operation on the target object based on the field of view of the screen and the position deviation.

8. The method according to claim 7, wherein a size of one of the control parameters is negatively correlated with a size of the field of view of the screen.

9. The method according to claim 4, wherein the determining, based on the predicted value of the current position, the control parameters for the following operation on the target object, comprises:
   obtaining a following mode of the gimbal, the following mode comprising at least one of a single axis following mode, a dual axis following mode, or a full following mode; and
   determining the control parameters for the following operation on the target object based on the predicted value of the current position and the following mode.

10. The method according to claim 1, wherein the controlling the gimbal according to the control parameters comprises:
    obtaining a motion state of the gimbal corresponding to the target object; and
    controlling the gimbal based on the motion state of the gimbal and the control parameters.

11. The method according to claim 10, wherein the controlling the gimbal based on the motion state of the gimbal and the control parameters comprises:
    obtaining duration information corresponding to the following operation performed on the target object;
    in case that the duration is less than a first time threshold, updating the control parameters based on the motion state of the gimbal, obtaining updated control parameters, and controlling the gimbal based on the updated control parameters; and
    in case that the duration is greater than or equal to the first time threshold, controlling the gimbal using the control parameters.

12. The method according to claim 1, wherein the controlling the gimbal according to the control parameters comprises:
    obtaining a following state corresponding to the target object; and
    controlling the gimbal based on the following state and the control parameters, including:
       in case that the target object is lost, obtaining information on a length of lost time corresponding to a process of the following operation on the target object;
       updating the control parameters based on the lost time to obtain updated control parameters; and
       controlling the gimbal based on the updated control parameters.

13. The method according to claim 1, wherein the controlling the gimbal according to the control parameters comprises:
    obtaining an object type of the target object; and
    controlling the gimbal according to the object type and the control parameters.

14. The method according to claim 13, wherein the controlling the gimbal according to the object type and the control parameters comprises:
    reducing a control bandwidth corresponding to the gimbal in a yaw direction and a control bandwidth corresponding to the gimbal in a pitch direction in case that the target object is a stationary object;
    increasing the control bandwidth corresponding to the gimbal in the yaw direction and decreasing the control bandwidth corresponding to the gimbal in the pitch direction in case that the target object is a moving object and a height of the moving object is greater than or equal to a height threshold; and
    increasing the control bandwidth corresponding to the gimbal in the yaw direction and the control bandwidth corresponding to the gimbal in the pitch direction in case that the target object is the moving object and the height of the moving object is less than the height threshold.

15. The method according to claim 1, further comprising:
    acquiring, through a display interface, an execution operation entered by a user for the image capturer; and
    controlling the image capturer in accordance with the execution operation to cause the image capturer to determine the capturing position.

16. The method according to claim 1, further comprising:
    determining an operating mode corresponding to the image capturer, the operating mode comprising at least one of a follow-then-focus mode or a focus-then-follow mode; and
    controlling the image capturer using the operating mode.

17. A control apparatus for a gimbal, comprising:
    a memory for storing a computer program;
    a processor for running the computer program stored in the memory to implement:
       obtaining, from an image capturer through wired/wireless communication connection between the gimbal and the image capturer, a capturing position of a target object in a captured image captured by the image capturer, the capturing position being determined by the image capturer based on the captured image, and the image capturer being a camera having a manual lens or an automatic lens;
       determining, based on the capturing position, control parameters for a following operation on the target object; and
       controlling the gimbal according to the control parameters to achieve the following operation of the target object.

18. The method according to claim 1, wherein the controlling the gimbal according to the control parameters to achieve the following operation of the target object comprises:

controlling an auxiliary equipment on the gimbal according to the control parameters, the auxiliary equipment being detachably connected to the image capturer.

19. The method according to claim 18, wherein:

the auxiliary equipment includes a follow focus motor; and controlling the auxiliary equipment according to the control parameters includes controlling the follow focus motor to cause the manual lens or the automatic lens to achieve a follow focus operation of the image capturer.

20. A method of controlling a gimbal, comprising:

obtaining a capturing position of a target object in a captured image, the capturing position being determined by means of an image capturer, the image capturer being a camera having a manual lens or an automatic lens, and the image capturer being communicatively connected to the gimbal;

determining, based on the capturing position, control parameters for a following operation on the target object; and controlling the gimbal according to the control parameters to achieve the following operation of the target object, including:

reducing a control bandwidth corresponding to the gimbal in a yaw direction and a control bandwidth corresponding to the gimbal in a pitch direction in case that the target object is a stationary object;

increasing the control bandwidth corresponding to the gimbal in the yaw direction and decreasing the control bandwidth corresponding to the gimbal in the pitch direction in case that the target object is a moving object and a height of the moving object is greater than or equal to a height threshold; and increasing the control bandwidth corresponding to the gimbal in the yaw direction and the control bandwidth corresponding to the gimbal in the pitch direction in case that the target object is the moving object and the height of the moving object is less than the height threshold.

\* \* \* \* \*